(12) United States Patent
Takiguchi et al.

(10) Patent No.: US 8,483,442 B2
(45) Date of Patent: Jul. 9, 2013

(54) MEASUREMENT APPARATUS, MEASUREMENT METHOD, AND FEATURE IDENTIFICATION APPARATUS

(75) Inventors: Junichi Takiguchi, Tokyo (JP); Naoyuki Kajiwara, Tokyo (JP); Yoshihiro Shima, Tokyo (JP); Ryujiro Kurosaki, Tokyo (JP); Takumi Hashizume, Tokyo (JP)

(73) Assignees: Mitsubishi Electric Corporation, Tokyo (JP); Waseda University, Tokyo (JP)

( * ) Notice: Subject to any disclaimer, the term of this patent is extended or adjusted under 35 U.S.C. 154(b) by 736 days.

(21) Appl. No.: 12/527,478

(22) PCT Filed: Feb. 15, 2008

(86) PCT No.: PCT/JP2008/052509
§ 371 (c)(1),
(2), (4) Date: Aug. 17, 2009

(87) PCT Pub. No.: WO2008/099915
PCT Pub. Date: Aug. 21, 2008

(65) Prior Publication Data
US 2010/0034426 A1 Feb. 11, 2010

(30) Foreign Application Priority Data

Feb. 16, 2007 (JP) ................. 2007-035918

(51) Int. Cl.
*G06K 9/00* (2006.01)
(52) U.S. Cl.
USPC .......................................... 382/106; 382/149
(58) Field of Classification Search
None
See application file for complete search history.

(56) References Cited

U.S. PATENT DOCUMENTS 7,180,050 B2 * 2/2007 Imagawa et al. ............. 250/221
7,474,964 B1 * 1/2009 Welty et al. ..................... 702/2
(Continued)

FOREIGN PATENT DOCUMENTS

| JP | 7-262375 | 10/1995 |
|----|----------|---------|
| JP | 10-207351 | 8/1998 |

(Continued)

OTHER PUBLICATIONS

JP2004-348575 Computer generated translation, Dec. 9, 2004.*

(Continued)

*Primary Examiner* — Nancy Bitar
(74) *Attorney, Agent, or Firm* — Oblon, Spivak, McClelland, Maier & Neustadt, L.L.P.

(57) ABSTRACT

It is an object to measure a position of a feature around a road. An image memory unit stores images in which neighborhood of the road is captured. Further, a three-dimensional point cloud model memory unit 709 stores a point cloud showing three-dimensional coordinates obtained by laser measurement which is carried out simultaneously to the image-capturing of the images as a road surface shape model. A model projecting unit 172 projects a point cloud on the image, and an image displaying unit 341 displays the point cloud superimposed with the image on the displaying device. Using an image point inputting unit 342, a pixel on a feature of a measurement target is specified by a user as a measurement image point. A neighborhood extracting unit 171 extracts a point which is located adjacent to the measurement image point and superimposed on the feature for the measurement target from the point cloud. A feature position calculating unit 174 outputs three-dimensional coordinates shown by the extracted point as three-dimensional coordinates of the feature for the measurement target.

7 Claims, 46 Drawing Sheets

U.S. PATENT DOCUMENTS

| | | | |
|---|---|---|---|
| 7,602,963 B2* | 10/2009 | Nightingale et al. | 382/149 |
| 7,689,032 B2* | 3/2010 | Strassenburg-Kleciak | 382/154 |
| 7,728,833 B2 | 6/2010 | Verma et al. | |
| 8,208,689 B2* | 6/2012 | Savolainen et al. | 382/110 |
| 2004/0062418 A1* | 4/2004 | Ishikura et al. | 382/104 |
| 2005/0100220 A1* | 5/2005 | Keaton et al. | 382/191 |
| 2006/0136126 A1* | 6/2006 | Coombes et al. | 701/208 |
| 2008/0260237 A1* | 10/2008 | Savolainen et al. | 382/154 |
| 2008/0319673 A1* | 12/2008 | Welty et al. | 702/5 |
| 2010/0250482 A1 | 9/2010 | Ma | |

FOREIGN PATENT DOCUMENTS

| | | |
|---|---|---|
| JP | 2000-74667 | 3/2000 |
| JP | 2001-118182 | 4/2001 |
| JP | 2002-34055 | 1/2002 |
| JP | 2002-170102 | 6/2002 |
| JP | 2002-303671 | 10/2002 |
| JP | 2003-30792 | 1/2003 |
| JP | 2003-44995 | 2/2003 |
| JP | 2003-84064 | 3/2003 |
| JP | 2004-30226 | 1/2004 |
| JP | 2004-348575 | 12/2004 |
| JP | 2005-77385 | 3/2005 |
| JP | 2005-98853 | 4/2005 |
| JP | 2005-241609 | 9/2005 |
| JP | 2005-337863 | 12/2005 |
| JP | 2006-113645 | 4/2006 |
| JP | 2006-172099 | 6/2006 |
| JP | 2006-234703 | 9/2006 |
| WO | WO 2005/088252 A1 | 9/2005 |

OTHER PUBLICATIONS

Dorota A. Grejner-Brzezinska, et al., "High Accuracy Dynamic Highway Mapping Using a GPS/INS/CCD System with On-The-Fly GPS Ambiguity Resolution", GISS Users Manual Version 2.0, FHWA/OH-2004/013, Sep. 2004, pp. 1-41.

H. Gontran, et al.; "A Mobile Mapping System for Road Data Capture via a Single Camera", [online], retrieved on Feb. 14, 2006. Internet, <URL: http://topo.epfl.ch/personnes/jsk/Papers/3dopt_hg.pdf>, 5 pages.

G. Manzoni, et al., "Mobile Mapping Systems in Cultural Heritages Survey", CIPA 2005 XX International Symposium, Sep. 26-Oct. 1, 2005. 4 pages.

Shingo Ando, et al. "A Study of Autonomous Mobile System in Outdoor Environment", Part 37 Improvement of Range Estimation Accuracy by Baseline Optimization in Motion Stereo Using GPS/INS/ODV), 2 pages, (with English Abstract).

Jun-ichi Takiguchi, et al., "High-Precision Range Estimation from an Omnidirectional Stereo System", vol. 69, No. 680, No. 01-1497, Apr. 2003, pp. 153-160, (with English Abstract).

Office Action issued Nov. 2, 2012 in Canadian Patent Application No. 2,678,156.

Extended European Search Report Issued Nov. 7, 2012 in Patent Application No. 08711339.5.

Visat:Mapping what you see, Ek-sheimy et al XP-002521410, May 2007.

* cited by examiner

MEASUREMENT APPARATUS, MEASUREMENT METHOD, AND FEATURE IDENTIFICATION APPARATUS

TECHNICAL FIELD

The present invention relates to, for example, a road feature measurement apparatus for measuring a feature position located on the road/side of the road, a feature identification apparatus, a road feature measuring method, a road feature measuring program, a measurement apparatus, a measuring method, a measuring program, measurement position data, a measurement terminal device, a measurement server device, a plotting apparatus, a plotting method, a plotting program, and plotting data.

BACKGROUND ART

Recent years, a product combining GIS (Geographical Information System) and GPS (Global Positioning System) represented by a car navigation system, etc. has become remarkably popular. Further, on the other hand, it has been expected that the position information by GIS and GPS is applied to safe driving of an ITS (Intelligent Transport Systems); the position information of features located on the road/side of the road is considered to be effective information.

Further, on the other hand, precision improvement and sophisticating of the road management ledger, which records information of features around roads, is expected. However, in order to generate the road management ledger, which records positions of features located on the road/side of the road such as a kilo post, a sign, a guardrail, a white line, etc. in 1/500 scale, surveying with a high precision is necessary, so that static survey using GPS and total station measuring distance/angle is carried out. Further, on bothways of a 30-kilometer section of national roads, sometimes there exist about 2,000 features to be a measurement target. Therefore, it requires huge cost and time to sophisticate and improve the precision of the road management ledgers across the country.

Then, aiming to reduce time and cost for collecting information, MMS (Mobile Mapping System) has drawn attention and research and development thereof have been made.

For example, for obtaining position information of a white line, stereo view using plural cameras or a method for estimating the position information of the white line from the setting position of a camera based on relation between a camera parameter and a vehicle are used.

Non-patent Document 1: Dorota A. Grejner-Brzezinska and Charles Toth, "High Accuracy Dynamic Highway Mapping Using a GPS/INS/CCD System with On-The-Fly GPS Ambiguity Resolution", Center for Mapping Department of Civil and Environmental Engineering and Geodetic Science The Ohio State University, Ohio Department of Transportation, District 1, September 2004.

Non-patent Document 2: H. Gontran, J, Skaloud, P.-Y. Gilliron, "A MOBILE MAPPING SYSTEM FOR ROAD DATA CAPTURE VIA A SINGLE CAMERA", [online], [retrieved on Feb. 14, 2006], Internet, <URL: http://topo.epfl.ch/personnes/jsk/Papers/3dopt_hg.pdf>

Non-patent Document 3: G. Manzoni, R. G. Rizzo, C. Robiglio, "MOBILE MAPPING SYSTEMS IN CULTURAL HERITAGES SURVEY", CIPA ODOMETRY APPARATUS 2005 XX International Symposium, 26 Sep.-1 Oct. 2005, Torino, Italy.

Patent Document 1: JP2005-098853
Patent Document 2: JP2006-234703

DISCLOSURE OF THE INVENTION

Problems to be Solved by the Invention

The above methods include the following characteristics:
a) Detection of White Line Position by the Stereo View
(1) It is possible to obtain the position of the white line using two cameras
(2) In case of an endless white line, automatic search for a corresponding point is difficult, so that manual search for the corresponding point is necessary.
(3) Effective view angle is narrow.
(4) Absolute precision is low.
b) Estimation of White Line Position by a Camera Parameter
(1) Since the prescribed distance from the camera to the road is fixed and calculated, the precision is bad.
(2) The precision is effected by oscillation of a vehicle.
(3) The precision is largely degraded on an uneven road.
(4) A single camera can obtain the position of a white line.

The present invention aims, for example, to measure a position of a feature located on the road/side of the road other than the white line using MMS.

In particular, the present invention aims to measure a position of a narrow feature such as a kilo post and a specular feature such as glass, for which the measurement data is difficult to obtain by MMS that obtains the measurement data during running, with a high precision.

Further, the present invention aims to aid the user to specify a feature for the measurement target in order to provide measured result of the point desired by the user.

Yet further, the present invention aims to measure the position of the feature with a high precision even if the road is uneven.

Means to Solve the Problems

According to the present invention, a measurement apparatus includes: an image displaying unit for displaying and superimposing an image in which a feature is captured and a point cloud, which corresponds to the image and of which a three-dimensional position is known, on a screen of a displaying device, and for prompting a user to specify a position of the feature for a measurement target within the image; a measurement image point obtaining unit for inputting the position within the image specified by the user as a measurement image point from an inputting device; a corresponding point detecting unit for detecting a corresponding point corresponding to the measurement image point obtained by the measurement image point obtaining unit from the point cloud; and a position calculating unit for discriminating a three-dimensional position of the measurement image point obtained by the measurement image point obtaining unit using a three-dimensional position of the corresponding point detected by the corresponding point detecting unit.

The above measurement apparatus further includes: an image memory unit for storing an image captured by a camera; and a three-dimensional point cloud model memory unit for storing a point cloud which is formed by a point cloud measured by a laser device and of which a three-dimensional position is known as a three-dimensional point cloud model, and the image displaying unit displays and superimposes the image stored in the image memory unit and the three-dimensional point cloud model stored in the three-dimensional point cloud model memory unit on the screen of the displaying device, and prompts the user to specify a point corresponding to the position within the image which the user watches from the point cloud of the three-dimensional point cloud model; the corresponding point detecting unit detects a corresponding point corresponding to the measurement image point obtained by the measurement image point obtaining unit from the point cloud of the three-dimensional point cloud model stored by the three-dimensional point cloud model memory unit; and the position calculating unit discriminates a three-dimensional position of the measurement image point obtained by the measurement image point obtaining unit using the three-dimensional position of the corresponding point detected by the corresponding point detecting unit.

The above measurement apparatus further includes a feature region detecting unit for analyzing the image stored in the image memory unit and detecting an image region in which the feature for the measurement target is captured as a feature image region, and the image displaying unit prompts the user to specify a position of an image for the feature image region detected by the feature region detecting unit.

The above corresponding point detecting unit, when a point of the point cloud displayed within the feature image region detected by the feature region detecting unit exists at the position in the image shown by the measurement image point, detects the point as the corresponding point corresponding to the measurement image point.

The above corresponding point detecting unit, when a point of the point cloud displayed within the feature image region detected by the feature region detecting unit does not exist at the position in the image shown by the measurement image point, detects a point which is closest to the measurement image point as the corresponding point corresponding to the measurement image point.

The above measurement apparatus further includes a result memory unit for assuming the three-dimensional position discriminated by the position calculating unit as a three-dimensional position of the feature for the measurement target, and storing the three-dimensional position by relating to a type of the feature for the measurement target.

According to the present invention, a measurement apparatus includes: an image displaying unit for displaying and superimposing an image in which a feature is captured by a camera and a point cloud, which corresponds to the image and of which a three-dimensional position is known, on a screen of a displaying device, and for prompting a user to specify a position of a feature for a measurement target within the image; a measurement image point obtaining unit for inputting the position within the image specified by the user as a measurement image point from an inputting device; a vector calculating unit for calculating a vector showing direction from a center of the camera to the measurement image point inputted by the measurement image point obtaining unit; a corresponding point detecting unit for detecting a corresponding point corresponding to the measurement image point obtained by the measurement image point obtaining unit from the point cloud; a plane calculating unit for calculating a particular plane including the corresponding point detected by the corresponding point detecting unit; a position calculating unit for obtaining a three-dimensional position of the corresponding point detected by the corresponding point detecting unit as a first candidate showing a three-dimensional position of the measurement image point, and calculating an intersecting point of the particular plane calculated by the plane calculating unit and the vector calculated by the vector calculating unit as a second candidate showing the three-dimensional position of the measurement image point; a position displaying unit for displaying the first candidate and the second candidate obtained by the position calculating unit on the screen of the displaying device and prompting the user to specify one of the first candidate and the second candidate; and a result memory unit for storing one of the first candidate and the second candidate specified by the user as the three-dimensional position of the measurement image point.

According to the present invention, a measurement apparatus includes: an image displaying unit for displaying and superimposing an image in which a feature is captured by a camera and a point cloud, which corresponds to the image and of which a three-dimensional position is known, on a screen of a displaying device, and for prompting a user to specify a position of a feature for a measurement target within the image; a measurement image point obtaining unit for inputting the position within the image specified by the user as a measurement image point from an inputting device; a vector calculating unit for calculating a vector showing direction from a center of the camera to the measurement image point inputted by the measurement image point obtaining unit; a corresponding point detecting unit for detecting a corresponding point corresponding to the measurement image point obtained by the measurement image point obtaining unit from the point cloud; a plane calculating unit for calculating a particular plane including the corresponding point detected by the corresponding point detecting unit; a type inputting unit for making the user specify a type of the feature for the measurement target and inputting the type of the feature specified by the user from an inputting device; and a position calculating unit for discriminating either of the corresponding point detected by the corresponding point detecting unit, and the intersecting point of the particular plane calculated by the plane calculating unit and the vector calculated by the vector calculating unit as a three-dimensional position of the measurement image point based on the type of the feature inputted by the type inputting unit.

According to the present invention, a measuring method includes: by an image displaying unit, performing an image displaying process for displaying and superimposing an image in which a feature is captured and a point cloud, which corresponds to the image and of which a three-dimensional position is known, on a screen of a displaying device, and prompting a user to specify a position of a feature for a measurement target within the image; by a measurement image point obtaining unit, performing a measurement image point obtaining process for inputting the position within the image specified by the user as a measurement image point from an inputting device; by a corresponding point detecting unit, performing a corresponding point detecting process for detecting a corresponding point corresponding to the measurement image point obtained by the measurement image point obtaining unit from the point cloud; and by a position calculating unit, performing a position calculating process for discriminating a three-dimensional position of the measurement image point obtained by the measurement image point obtaining unit using a three-dimensional position of the corresponding point detected by the corresponding point detecting unit, and generating measurement position data showing the three-dimensional position of the measurement image point discriminated.

According to the present invention, a measuring method includes: by an image displaying unit, performing an image displaying process for displaying and superimposing an image in which a feature is captured by a camera and a point cloud, which corresponds to the image and of which a three-dimensional position is known, on a screen of a displaying device, and for prompting a user to specify a position of a feature for a measurement target within the image; by a measurement image point obtaining unit, performing a measurement image point obtaining process for inputting the position within the image specified by the user as a measurement image point from an inputting device; by a vector calculating unit, performing a vector calculating process for calculating a vector showing direction from a center of the camera to the measurement image point inputted by the measurement image point obtaining unit; by a corresponding point detecting unit, performing a corresponding point detecting process for detecting a corresponding point corresponding to the measurement image point obtained by the measurement image point obtaining unit from the point cloud; by a plane calculating unit, performing a plane calculating process for calculating a particular plane including the corresponding point detected by the corresponding point detecting unit; by a position calculating unit, performing a position calculating process for obtaining a three-dimensional position of the corresponding point as a first candidate showing a three-dimensional position of the measurement image point, and for calculating an intersecting point of the particular plane calculated by the plane calculating unit and the vector calculated by the vector calculating unit as a second candidate showing the three-dimensional position of the measurement image point; by a position displaying unit, performing a position displaying process for displaying the first candidate and the second candidate obtained by the position calculating unit on the screen of a displaying device and prompting the user to specify one of the first candidate and the second candidate; and by a result memory unit, performing a result storing process for storing one of the first candidate and the second candidate specified by the user as measurement position data showing the three-dimensional position of the measurement image point.

According to the present invention, a measuring method includes: by an image displaying unit, performing an image displaying process for displaying and superimposing an image in which a feature is captured by a camera and a point cloud, which corresponds to the image and of which a three-dimensional position is known, on a screen of a displaying device, and for prompting a user to specify a position of a feature for a measurement target within the image; by a measurement image point obtaining unit, performing a measurement image point obtaining process for inputting the position within the image specified by the user as a measurement image point from an inputting device; by a vector calculating unit, performing a vector calculating process for calculating a vector showing direction from a center of the camera to the measurement image point inputted by the measurement image point obtaining unit; by a corresponding point detecting unit, performing a corresponding point detecting process for detecting a corresponding point corresponding to the measurement image point obtained by the measurement image point obtaining unit from the point cloud; by a plane calculating unit, performing a plane calculating process for calculating a particular plane including the corresponding point detected by the corresponding point detecting unit; by a type inputting unit, performing a type inputting process for prompting the user to specify a type of the feature for the measurement target and for inputting the type of the feature specified by the user from the inputting device; by a position calculating unit, performing a position calculating process for discriminating either of the corresponding point detected by the corresponding point detecting unit, and an intersecting point of the particular plane calculated by the plane calculating unit and the vector calculated by the vector calculating unit as a three-dimensional position of the measurement image point based on the type of the feature inputted by the type inputting unit, and generating measurement position data showing the three-dimensional position of the measurement image point discriminated.

According to the present invention, a measurement terminal device includes: an image displaying unit for displaying superimposing an image in which a feature is captured and a point cloud, which corresponds to the image and of which a three-dimensional position is known, on a screen of a displaying device, and for prompting a user to specify a position of a feature for a measurement target within the image; a terminal-side measurement image point obtaining unit for inputting the position within the image specified by the user as a measurement image point from an inputting device and sending the measurement image point inputted to a measurement server device calculating a three-dimensional position of the measurement image point; and a result memory unit for receiving the three-dimensional position of the measurement image point from the measurement server device and storing the three-dimensional position of the measurement image point received.

According to the present invention, a measurement server device includes: a server-side measurement image point obtaining unit for receiving from a terminal device a position of a feature for a measurement target within an image in which the feature is captured as a measurement image point; a corresponding point detecting unit for detecting a corresponding point corresponding to the measurement image point obtained by the server-side measurement image point obtaining unit from a point cloud, which corresponds to the image and of which a three-dimensional position is known; and a position calculating unit for discriminating a three-dimensional position of the measurement image point obtained by the server-side measurement image point obtaining unit using a three-dimensional position of the corresponding point detected by the corresponding point detecting unit and sending the three-dimensional position of the measurement image point discriminated to the measurement terminal device.

According to the present invention, a measurement terminal device includes: an image displaying unit for displaying an image in which a feature is captured and prompting a user to specify a position of a feature for a measurement target within the image; a terminal-side measurement image point obtaining unit for inputting the position within the image specified by the user as a measurement image point from an inputting device and sending the measurement image point inputted to a measurement server device calculating a three-dimensional position of the measurement image point; and a result memory unit for receiving from the measurement server the three-dimensional position of the measurement image point and storing the three-dimensional position of the measurement image point received.

According to the present invention, a measurement apparatus includes: a three-dimensional point cloud model memory unit for storing a three-dimensional point cloud model including a point cloud each showing a three-dimensional position; an image displaying unit for displaying an image captured by a camera on a displaying device and prompting a user to specify a position within the image; a measurement image point obtaining unit for inputting the position within the image specified by the user as a measurement image point from an inputting device; a vector calculating unit for calculating a vector showing direction from a center of the camera to the measurement image point inputted by the measurement image point obtaining unit; a neighborhood extracting unit for extracting one neighboring point of the measurement image point from the point cloud of the three-dimensional point cloud model; a neighboring plane calculating unit for calculating a particular plane including the one neighboring point extracted by the neighborhood extracting unit; and a feature position calculating unit for calculating an intersecting point of the particular plane calculated by the neighboring plane calculating unit and the vector calculated by the vector calculating unit as a three-dimensional position of the measurement image point.

The above measurement apparatus further includes: a model projecting unit for projecting the point cloud of the three-dimensional point cloud model on an image-capturing plane of the camera corresponding to the image, and the neighborhood extracting unit extracts one of a closest point from the measurement image point in the image-capturing plane among the point cloud of the three-dimensional point cloud model, a closest point from the measurement image point in direction of a horizontal axis of the image-capturing plane, and a closest point from the measurement image point in direction of a vertical axis of the image-capturing plane as the one neighboring point.

The above neighboring plane calculating unit calculates a horizontal plane including the one neighboring point of the measurement image point as the particular plane.

The above neighboring plane calculating unit calculates a plane including the one neighboring point of the measurement image point and orthogonal to one of an X axis, a Y axis, and a Z axis of an X-Y-Z coordinate system showing a coordinate system used for the three-dimensional point cloud model as the particular plane.

The above measurement apparatus further includes: a type inputting unit for making the user specify a type of a feature which is a position measurement target and inputting the type of the feature specified by the user from the inputting device, and the neighboring plane calculating unit represents a plane formed by the feature represented by a point cloud including the one neighboring point of the measurement image point based on the type of the feature inputted by the type inputting unit and calculates the particular plane.

According to the present invention, a measuring method includes: by an image displaying unit, performing an image displaying process for displaying an image captured by a camera on a displaying device and prompting a user to specify a position within the image; by a measurement image point obtaining unit, performing a measurement image point obtaining process for inputting the position within the image specified by the user as a measurement image point from an inputting device; by a vector calculating unit, performing a vector calculating process for calculating a vector showing direction from a center of the camera to the measurement image point inputted by the measurement image point obtaining unit; by a neighborhood extracting unit, performing a neighborhood extracting process for extracting one neighboring point of the measurement image point from a three-dimensional point cloud model memory unit storing a three-dimensional point cloud model including a point cloud each showing a three-dimensional position; by a neighboring plane calculating unit, performing a neighboring plane calculating process for calculating a particular plane including the one neighboring point extracted by the neighborhood extracting unit; and by a feature position calculating unit, performing a feature position calculating process for calculating an intersecting point of the particular plane calculated by the neighboring plane calculating unit and the vector calculated by the vector calculating unit as a three-dimensional position of the measurement image point, and generating measurement position data showing the three-dimensional position of the measurement image point calculated.

According to the present invention, a measurement apparatus includes: an image memory unit for storing an image captured by a camera; a three-dimensional point cloud model memory unit for storing a three-dimensional point cloud model which is formed by a point cloud obtained by measuring an image-capturing place of the camera by a laser device and of which a position of each point cloud is known; an image displaying unit for displaying an image stored in the image memory unit on a screen of a displaying device and prompting a user to specify a position within the image; a measurement image point obtaining unit for inputting the position within the image specified by the user as a measurement image point from an inputting device; and a position calculating unit for detecting a corresponding point corresponding to the measurement image point obtained by the measurement image point obtaining unit from the point cloud of the three-dimensional point cloud model stored by the three-dimensional point cloud model memory unit, and discriminating a three-dimensional position of the measurement image point obtained by the measurement image point obtaining unit using a position of the corresponding point detected.

The above image displaying unit displays a list of a plurality of images stored in the image memory unit on the screen of the displaying device, prompts the user to specify an image, displays the image specified by the user on the screen of the displaying device, and prompts the user to specify a position within the image.

The above measurement apparatus further includes: a result displaying unit for displaying a three-dimensional position of the measurement image point discriminated by the position calculating unit on the screen of the displaying device on which the image displaying unit displays the image.

The above measurement apparatus further includes: a type inputting unit for making the user specify a type of a feature which is a position measurement target and inputting the type of the feature specified by the user from the inputting device; and a result memory unit for storing the measurement image point obtained by the measurement image point obtaining unit, a three-dimensional position of the measurement image point discriminated by the position calculating unit, and the type of the feature inputted by the type inputting unit in a memory equipment by relating.

According to the present invention, a measuring method, using: an image memory unit for storing images captured by a camera; and a three-dimensional point cloud model memory unit for storing a three-dimensional point cloud model which is formed by a point cloud obtained by measuring an image-capturing place of the camera by a laser device and of which a position of each point cloud is known, the method includes: by an image displaying unit, performing an image displaying process for displaying an image stored in the image memory unit on a screen of a displaying device and prompting a user to specify a position within the image; by a measurement image point obtaining unit, performing a measurement image point obtaining process for inputting the position within the image specified by the user as a measurement image point from an inputting device; and by a position calculating unit, performing a position calculating process for detecting a corresponding point corresponding to the measurement image point obtained by the measurement image point obtaining unit from a point cloud of the three-dimensional point cloud model stored in the three-dimensional point cloud model memory unit, discriminating a three-dimensional position of the measurement image point obtained by the measurement image point obtaining unit using a position of the corresponding point detected, and generating measurement position data showing the three-dimensional position of the measurement image point discriminated.

According to the present invention, a measuring program has a computer execute the above measuring methods.

According to the present invention, measurement position data is characterized to be generated by the above measuring method.

According to the present invention, a plotting apparatus includes: an image memory unit for storing images captured by a camera; a three-dimensional point cloud model memory unit for storing a three-dimensional point cloud model which is formed by a point cloud obtained by measuring an image-capturing place of the camera by a laser device and of which a position of each point cloud is known, an image displaying unit for displaying an image stored in the image memory unit on a screen of a displaying device and prompting a user to specify a position within the image; a measurement image point obtaining unit for inputting the position within the image specified by the user as a measurement image point from an inputting device; a position calculating unit for detecting a corresponding point corresponding to the measurement image point obtained by the measurement image point obtaining unit from a point cloud of the three-dimensional point cloud model stored in the three-dimensional point cloud model memory unit, and discriminating a three-dimensional position of the measurement image point obtained by the measurement image point obtaining unit using a position of the corresponding point detected; a drawing unit for inputting a plotting command showing contents of a figure to be generated from an inputting equipment and drawing the figure including a plurality of elements on the screen of the displaying device based on the plotting command inputted; and a plotting unit for making the user specify one of the plurality of elements included in the figure drawn by the drawing unit, obtaining a three-dimensional position of the measurement image point corresponding to the element specified from the position calculating unit, and generating plotting data representing the figure drawn by the drawing unit and showing the three-dimensional position of the measurement image point discriminated by the position calculating unit as a three-dimensional position of the element specified by the user.

According to the present invention, a plotting method using: an image memory unit for storing images captured by a camera; and a three-dimensional point cloud model memory unit for storing a three-dimensional point cloud model which is formed by a point cloud obtained by measuring an image-capturing place of the camera by a laser device and of which a position of each point cloud is known, the method includes: by an image displaying unit, performing an image displaying process for displaying an image stored in the image memory unit on a screen of a displaying device and prompting a user to specify a position within the image; by a measurement image point obtaining unit, performing a measurement image point obtaining process for inputting the position within the image specified by the user as a measurement image point from an inputting device; by a position calculating unit, performing a position calculating process for detecting a corresponding point corresponding to the measurement image point obtained by the measurement image point obtaining unit from a point cloud of the three-dimensional point cloud model stored in the three-dimensional point cloud model memory unit, and discriminating a three-dimensional position of the measurement image point obtained by the measurement image point obtaining unit using a position of the corresponding point detected; by a drawing unit, performing a drawing process for inputting a plotting command showing contents of a figure to be generated from an inputting equipment and drawing the figure including a plurality of elements on the screen of the displaying device based on the plotting command inputted; and by a plotting unit, performing a plotting process for making the user specify one of the plurality of elements included in the figure drawn by the drawing unit, obtaining a three-dimensional position of the measurement image point corresponding to the element specified from the position calculating unit, and generating plotting data representing the figure drawn by the drawing unit and showing the three-dimensional position of the measurement image point discriminated by the position calculating unit as a three-dimensional position of the element specified by the user.

According to the present invention, a plotting program has a computer execute the above plotting method.

According to the present invention, plotting data is characterized to be generated by the above plotting method.

According to the present invention, a road feature measurement apparatus includes: a motion stereo unit for generating a three-dimensional model of a stationary body for a plurality of images captured by a camera mounted on a running vehicle at different times by a motion stereo process as a stationary body model; a moving body removing unit for removing a difference between road surface shape model which is a three-dimensional point cloud model generated based on distance and orientation data showing distance and orientation for a feature measured from the running vehicle and the stationary body model generated by the motion stereo unit from the road surface shape model, and generating a moving body removed model which is made by removing a moving body region from the road surface shape model; a feature identifying unit for determining a type of the stationary body represented by each point cloud based on a position and a shape shown by a point cloud of the moving body removed model generated by the moving body removing processing unit; a measurement image point obtaining unit for displaying at least one of the image, the moving body removed model, and the type of the stationary body determined by the feature identifying unit on a displaying device, and inputting information of a position on the image specified by the user as a target for position measurement as a measurement image point from an inputting device; a vector calculating unit for calculating a vector showing direction from a center of the camera to the measurement image point inputted by the measurement image point obtaining unit; a three neighboring points extracting unit for extracting three neighboring points of the measurement image point from a point cloud of the road surface shape model; and a feature position calculating unit for calculating a plane formed by the three neighboring points of the measurement image point extracted by the three neighboring points extracting unit, and calculating an intersecting point of the plane calculated and the vector calculated by the vector calculating unit as a position of the measurement image point.

According to the present invention, a road feature measurement apparatus includes: a feature identifying unit for determining a type of a feature represented by each point cloud based on a position and a shape shown by a point cloud of road surface shape model which is a three-dimensional point cloud model generated based on distance and orientation data showing distance and orientation for the feature measured from a running vehicle; a measurement image point obtaining unit for displaying an image and the type of the feature determined by the feature identifying unit on a displaying device, and inputting information of a position on the image, specified by the user as a target for position measurement, as a measurement image point from an inputting device; a vector calculating unit for calculating a vector showing direction from a center of a camera to the measurement image point inputted by the measurement image point obtaining unit; a three neighboring points extracting unit for extracting three neighboring points of the measurement image point from a point cloud of the road surface shape model; and a feature position calculating unit for calculating a plane formed by the three neighboring points of the measurement image point extracted by the three neighboring points extracting unit, and calculating an intersecting point of the plane calculated and the vector calculated by the vector calculating unit as a position of the measurement image point.

According to the present invention, a feature identification apparatus includes: a motion stereo unit for generating a three-dimensional model of a stationary body for a plurality of images captured by a camera mounted on a running vehicle at different times by a motion stereo process as a stationary body model; a moving body removing unit for removing a difference between road surface shape model which is a three-dimensional point cloud model generated based on distance and orientation data showing distance and orientation for a feature measured from the running vehicle and the stationary body model generated by the motion stereo unit from the road surface shape model, and generating a moving body removed model which is made by removing a moving body region from the road surface shape model; and a feature identifying unit for determining a type of the stationary body represented by each point cloud based on a position and a shape shown by a point cloud of the moving body removed model generated by the moving body removing processing unit.

According to the present invention, a feature identification apparatus includes: a labeling processing unit for extracting a point cloud continuing from a position of a point cloud of a road surface shape model which is a three-dimensional point cloud model generated based on distance and orientation data showing distance and orientation for the feature measured from a running vehicle, and for grouping the point cloud of the road surface shape model; an edge determining unit for determining an edge part from a line segment formed by a point cloud for each group grouped by the labeling processing unit, and for grouping the group using the edge part as a border; and a feature identifying unit for determining a type of feature represented by a point cloud of each group based on a position and a shape shown by a point cloud for each group grouped by the edge determining unit.

In the above road feature measurement apparatus, the three neighboring points extracting unit calculates a most neighboring point of the measurement image point, selects a second line segment which places the measurement image point inside between the second line segment and a first line segment including the most neighboring point among line segments formed by a point cloud of the road surface shape model, calculates a straight line connecting the measurement image point and the most neighboring point, calculates a second neighboring point which is closest to the straight line in a left side of the straight line among the point cloud forming the second line segment and a third neighboring point which is closest to the straight line in a right side of the straight line, and the most neighboring point, the second neighboring point, and the third neighboring point are assumed as the three neighboring points of the measurement image point.

According to the present invention, a road feature measuring method includes: by a motion stereo unit, performing a motion stereo process for generating a three-dimensional model of a stationary body for a plurality of images captured by a camera mounted on a running vehicle at different times by a motion stereo process as a stationary body model; by a moving body removing unit, performing a moving body removing process for removing a difference between road surface shape model which is a three-dimensional point cloud model generated based on distance and orientation data showing distance and orientation for a feature measured from the running vehicle and the stationary body model generated by the motion stereo unit from the road surface shape model, and generating a moving body removed model which is made by removing a moving body region from the road surface shape model; by a feature identifying unit, performing a feature identifying process for determining a type of the stationary body represented by each point cloud based on a position and a shape shown by a point cloud of the moving body removed model generated by the moving body removing processing unit; by a measurement image point obtaining unit, performing a measurement image point obtaining process for displaying at least one of the image, the moving body removed model, and the type of the stationary body determined by the feature identifying unit on a displaying device, and inputting information of a position on the image specified by the user as a position measurement target as a measurement image point from an inputting device; by a vector calculating unit, performing a vector calculating process for calculating a vector showing direction from a center of the camera to the measurement image point inputted by the measurement image point obtaining unit; by a three neighboring points extracting unit, performing a three neighboring points extracting process for extracting three neighboring points of the measurement image point from a point cloud of the road surface shape model; and by a feature position calculating unit, performing a feature position calculating process for calculating a plane formed by the three neighboring points of the measurement image point extracted by the three neighboring points extracting unit, and calculating an intersecting point of the plane calculated and the vector calculated by the vector calculating unit as a position of the measurement image point.

According to the present invention, a road feature measuring program has a computer execute the above road feature measuring method.

Effect of the Invention

According to the present invention, for example, using MMS, it is possible to measure a position of a feature located on the road/side of the road other than a white line.

Further, according to the present invention, in the road surface shape model represented by laser point cloud, by measuring the position based on the neighboring three points of the location point, it is possible to measure a position of a narrow feature such as a kilo post and a specular feature such as glass, which may not receive the laser beam in MMS that obtains the measurement data by the laser radar during running, with a high precision.

Further, for example, the present invention enables to measure a position of the feature with a good precision regardless of existence/absence of a moving body on the road or the sidewalk, since when the target feature is hidden by a vehicle running on the road or a pedestrian on a sidewalk, etc., it is possible to remove only a moving body from the road surface shape model.

Further, for example, the present invention enables to aid the user to specify the feature for the measurement target by displaying the three-dimensional model from which the moving body is removed or a type of the feature together with the image.

PREFERRED EMBODIMENTS FOR CARRYING OUT THE INVENTION

Embodiment 1

FIG. 1 shows a system configuration of a road feature measurement system 101 and a functional configuration of a road feature measurement apparatus 100 according to the first embodiment.

The road feature measurement system 101 in the first embodiment includes an odometry apparatus 200, three gyros 210 (a part of a positioning unit, a posture detecting unit, and a GPS gyro), three GPSs 220 (a part of the positioning unit, the posture detecting unit, and the GPS gyro), a camera 230 (an imaging unit), a laser radar 240 (an optical scanning unit, a laser scanner, and a LRF [Laser Range Finder]), and a road feature measurement apparatus 100 (a computer).

The odometry apparatus 200, the three gyros 210, the three GPSs 220, the camera 230, and the laser radar 240 (examples of a measurement sensor, respectively) are mounted on a top board 103 (base) (refer to FIG. 4) of a measuring carriage 102 (a vehicle, hereinafter). Here, a positive direction of the Z axis of FIG. 5 corresponds to the forward direction of the measuring carriage 102. Further, the setting position of the laser radar 240 can be located ahead of the vehicle as well as the camera 230.

The odometry apparatus 200 performs the odometry method to calculate distance data showing the running distance of the vehicle.

The three gyros 210 calculate angle velocity data showing tilting of the vehicle in the three axial directions (a pitch angle, a roll angle, and a yaw angle).

The three GPSs 220 calculate positioning data showing the running position (coordinates) of the vehicle.

The odometry apparatus 200, the gyro 210, and the GPS 220 measure the position and posture of the vehicle by the GPS/dead reckoning compound operation.

The camera 230 captures images and outputs image data of time series.

The laser radar 240 is provided ahead or back of the vehicle, with swinging an optical axis, irradiates laser obliquely downwardly, and calculates orientation/distance data showing distance to the road surface in each direction (LRF data, hereinafter).

The road feature measurement apparatus 100 calculates the position of the feature specified by the user based on the distance data, the angle velocity data, the positioning data, the image data, and the orientation/distance data.

The road feature measurement apparatus 100 includes a vehicle position and posture (3-axis) computing unit 110, a camera position and posture computing unit 130, a camera LOS computing unit 140, a road surface shape model generating unit 150, a laser radar position and posture computing unit 160, a road surface model corresponding point searching unit 170, a feature identification apparatus 300, an observation data inputting unit 191, and an observation data memory unit 199.

The vehicle position and posture (3-axis) computing unit 110 calculates the position and posture of the vehicle (vehicle position and posture) based on the distance data, the angle velocity data, and the positioning data.

The feature identification apparatus 300 generates three-dimensional model of a stationary body based on the image data, and by comparing the three-dimensional model of the stationary body with a road surface shape model based on the LRF data, which will be described later, generates a road surface shape model of the stationary body. Further, the feature identification apparatus 300 classifies a laser measured point cloud which forms the road surface shape model into groups, and identifies a type of the feature shown by each group based on the shape which the laser measured point cloud forms. Further, the feature identification apparatus 300 displays the road surface shape model of the stationary body and the type of the feature superimposed with the image to provide to the user. Then, the feature identification apparatus 300 inputs the position of the feature specified by the user on the image as the measurement image point.

The camera position and posture computing unit 130 calculates the position and the posture of the camera 230 (camera position and posture) based on the vehicle position and posture and a camera attachment offset. The camera attachment offset shows quantity of displacement formed by an axis of attachment of the camera 230 against a vehicle axis (orthogonal coordinate). The camera attachment offset is a value corresponding to the relation between the camera 230 and the top board 103 in FIG. 4.

The camera LOS computing unit 140 (an example of a vector calculating unit) calculates an angle (LOS vector) in LOS (Line Of Sight), which is a direction of sight from the camera to the measurement image point, based on the measurement image point specified by the user on the image and the camera position and posture.

The laser radar position and posture computing unit 160 calculates the position and posture of the laser radar 240 (laser radar position and posture) based on the vehicle position and posture and a laser radar attachment offset. The laser radar attachment offset shows quantity of displacement formed by an axis of attachment of the laser radar 240 against a vehicle axis (orthogonal coordinates). The laser radar attachment offset is a value corresponding to the relation between the laser radar 240 and the top board 103 in FIG. 4.

The road surface shape model generating unit 150 generates a road surface shape model (a three-dimensional point cloud model) showing a shape (curve, slope, irregularity, etc.) of an uneven road on which the vehicle runs based on the orientation/distance data and the laser radar position and posture.

The road surface model corresponding point searching unit 170 (an example of the feature position calculating unit) calculates the position of the feature specified by the user based on the LOS vector and the road surface shape model for the measurement image point. The road surface model corresponding point searching unit 170 can calculate the feature position with high precision by considering the curve, slope, irregularities, etc. of the road surface The distance data, the angle velocity data, the positioning data, the image data, and the orientation/distance data are called as observation data.

The observation data inputting unit 191 inputs the observation data obtained by the measuring carriage 102 and stores in the observation data memory unit 199.

The observation data memory unit 199 stores the observation data obtained by the measuring carriage 102, the laser radar attachment offset, the camera attachment offset, and various kinds of data generated based on the observation data. Each unit included in the road feature measurement apparatus 100 and each unit included in the feature identification apparatus 300 input data to be used from the observation data memory unit 199, perform various kinds of processes, and store generated data in the observation data memory unit 199.

In the first embodiment, "road" means not only "on the road" but also "side of the road" and "around the road" within the image-capturing range. Further, "side of the road" and "around the road" includes a road shoulder, an edge stone, a sidewalk, etc.

FIG. 2 shows an example of hardware resource for the road feature measurement apparatus 100 and the feature identification apparatus 300 according to the first embodiment.

In FIG. 2, the road feature measurement apparatus 100 and the feature identification apparatus 300 include a CPU 911 (Central Processing Unit; also called as a processing device, an operation device, a microprocessor, a microcomputer, and a processor) which executes programs. The CPU 911 is connected to a ROM 913, a RAM 914, a communication board 915, a displaying device 901, a keyboard 902, a mouse 903, an FDD 904 (Flexible Disk Drive), a CDD 905 (Compact Disk Drive), a printer device 906, a scanner device 907, a microphone 908, a speaker 909, and a magnetic disk drive 920 via a bus 912, and controls these hardware devices. Instead of the magnetic disk drive 920, a storage device such as an optical disk drive, a memory card reader/writer device, etc. can be used.

The RAM 914 is an example of a volatile memory. Storage medium of the ROM 913, the FDD 904, the CDD 905, and the magnetic disk drive 920 are examples of a nonvolatile memory These are examples of memory equipment, a memory device, or a memory unit.

The communication board 915, the keyboard 902, the scanner device 907, the FDD 904, etc. are examples of an inputting equipment, an inputting device, or an inputting unit.

Further, the communication board 915, the displaying device 901, the printer device 906, etc. are examples of an outputting equipment, an outputting device, or an outputting unit.

The communication board 915 is connected wiredly or wirelessly to communication network such as LAN (Local Area Network), the Internet, WAN (Wide Area Network) such as ISDN, etc., telephone lines, and so on.

An OS 921 (Operating System), a window system 922, a group of programs 923, a group of files 924 are stored in the magnetic disk drive 920. Programs of the group of programs 923 are executed by the CPU 911, the OS 921, or the window system 922.

In the group of programs 923, programs performing functions that will be explained in the embodiments as "-- unit" and "-- means" are stored. The programs are read and executed by the CPU 911.

In the group of files 924, result data such as "determined result of --", "calculated result of --", "processed result of --", etc. when functions that will be explained in the embodiments as "-- unit" or "-- means" are performed, data to be received/transmitted between programs performing functions of "-- unit" or "-- means", and other information, data, signal values, variable values, parameters are stored as each item of "-- file" or "-- database". "-- file" or "-- database" is stored in the recording medium such as disks or memories. Information, data, signal values, variable values, and parameters stored in the storage medium such as disks or memories are read by the CPU 911 to a main memory or a cache memory via a reading/writing circuit, and used for operations of the CPU such as extraction, search, reference, comparison, computation, calculation, processing, output, print, display, etc. During the operations of the CPU such as extraction, search, reference, comparison, computation, calculation, processing, output, print, display, and extraction, information, data, signal values, variable values, and parameters are temporarily stored in the main memory, the cache memory, or a buffer memory.

Further, arrows in flowcharts which will be explained in the embodiments mainly show inputting/outputting of data or signals, and the data or the signal values are recorded in the recording medium such as a memory of the RAM 914, a flexible disk of the FDD 904, a compact disk of the CDD 905, a magnetic disk of the magnetic disk drive 920, other optical disk, a mini disk, a DVD (digital Versatile Disc), etc. Further, the data or the signal values are transmitted online by transmission medium such as the bus 912, signal lines, cables, and others.

Further, "-- unit" or "-- means" which will be explained in the embodiments can be "-- circuit", "-- device", "-- equipment", or "means", and also can be "-- step", "-- procedure", and "-- process". Namely, "-- unit" and "-- means" which will be explained can be implemented by firmware stored in the ROM 913. Or it can be implemented by only software, only hardware such as elements, devices, boards, wirings, etc., or it can be also implemented by a combination of software and hardware, or further a combination with firmware. Firmware and software are stored as programs in the recording medium such as the magnetic disk, the flexible disk, the optical disk, the compact disk, the mini disk, the DVD, etc. The programs are read by the CPU 911 and executed by the CPU 911. That is, the programs are to function the computer to perform "-- unit" and "-- means". Or the programs are to have the computer perform a procedure or a method of "-- unit" and "-- means".

"-- unit" and "-- apparatus" which form the road feature measurement system 101 are executed by performing each process which will be explained later using the CPU.

FIG. 3 is a flowchart showing a flow of road feature position measuring process of the road feature measurement system 101 according to the first embodiment.

The flow of road feature position measuring process of the road feature measurement system 101 according to the first embodiment will be explained in the following with reference to FIG. 3.

<S101: Measurement Running>

First, by running a road of which features are to be measured with a vehicle, the odometry apparatus 200, the gyro 210, and the GPS 220 respectively perform measurement during the running, and distance data, angle velocity data, and positioning data (GPS/IMU (Inertial Measurement Unit) data, hereinafter) are obtained in time series. Further, the camera 230 captures images during the running and obtains time series image data and time of image data showing an image-capturing time of each image. Further, the laser radar 240 irradiates laser during the running, with swinging in a transverse direction to the vehicle, and obtains distance/orientation data (LRF data) showing the distance and the orientation of the feature located on the road/side of the road (around the road) in time series.

For example, the LRF data shows the distance/orientation to the feature in binary format, the image data shows RAW image in Bayer pattern, and the time of image data shows an identification number of the image and imaging time by relating in CSV (Comma Separated Values) format.

<S102: Observation Data Storing Process>

Next, in the road feature measurement apparatus 100, the observation data inputting unit 191 inputs the GPS/IMU data (the distance data, the angle velocity data, and the positioning data) obtained by each measuring sensor of the vehicle, the image data, the time of image data, and the LRF data (orientation/distance data). Then, the observation data inputting unit 191 decodes the compressed data (the GPS/IMU data, the LRF data, for example) (S102a: data decoding process), and further, copies particular data (the image data, the time of image data, for example) (S102b: image data copying process) if necessary, and stores each data in the observation data memory unit 199.

For example, the LRF data is converted from the binary format to the text format by the data decoding process (S102a).

Further, for example, by the image data copying process (S102b), the image data of 24-bit BMP (bitmap) format is generated.

Further, the observation data inputting unit 191 stores the camera attachment offset to the top board 103 of the vehicle on which the camera 230 is mounted, and the laser radar attachment offset to the top board 103 of the vehicle on which the laser radar 240 is mounted in the observation data memory unit 199.

<S103: Positioning/Compounding Process>

Next, in the road feature measurement apparatus 100, the vehicle position and posture (3-axis) computing unit 110 calculates the position and posture of the vehicle in the ENU coordinate system based on the GPS/IMU data. Hereinafter, data showing the position and posture of the vehicle in time series in the ENU coordinate system is called as the vehicle position and posture data.

For example, the vehicle position and posture data shows the ENU coordinate, an angle of rotation (roll), an angle of elevation (pitch), and an angle of orientation (yaw) of the vehicle in CSV format.

<S104: Digitizing Process>

Further, the feature identification apparatus 300 identifies the features captured on the image by classifying into a moving body (a vehicle, a pedestrian, for example) and a stationary body (street, sidewalk, wall, other (a kilo-post, a sign, for example)) based on the image data and the LRF data, and displays a type of each of the features captured in the image together with the image on the displaying device.

Then, the feature identification apparatus 300 inputs a position of a position measurement target specified by the user on the image (a measurement image point, hereinafter), a type of a feature captured in the measurement image point (a feature type ID (Identifier), hereinafter), and an identification number of the image in which the measurement image point is specified (a specified image number, hereinafter) from the inputting equipment such as the keyboard 902, the mouse 903, the touch panel, etc.

For example, the measurement image point shows a two-dimensional position (u,v) on the image specified by the user.

A detail of the digitizing process (S104) will be discussed later.

<S105: 3D Modeling Process>

Next, in the road feature measurement apparatus 100, the road surface shape model generating unit 150 generates three-dimensional road surface shape model which represents in the ENU coordinates each laser measured point of the LRF data corresponding to the image in which the measurement image point is specified based on the vehicle position and posture data, the LRF data, the time of image data, the specified image number, and the laser radar position and posture data.

A detail of the 3D modeling process (S105) will be discussed later.

<S106: Feature Position Locating Process>

Next, in the road feature measurement apparatus 100, the camera LOS computing unit 140 calculates a LOS vector from the center of the camera to the measurement image point in the ENU coordinate system based on the vehicle position and posture data, the image data, the time of image data, the specified image number, the camera position and posture data, and the measurement image point.

Then, the road surface model corresponding point searching unit 170 extracts three neighboring points of the measurement image point out of the laser measured point cloud of the road surface shape model, and calculates an ENU coordinate of an intersecting point of the LOS vector to the measurement image point and a plane formed by the three neighboring points of the measurement image point as the position of the feature specified by the user.

A detail of the feature position locating process (S106) will be discussed later.

In the following, a detail of the digitizing process (S104), the 3D modeling process (S105), and the feature position locating process (S106) will be explained.

First, the digitizing process (S104) will be explained, which removes data of the moving body from the LRF data (orientation/distance data to the feature), identifies a type of the remaining stationary body, and displays the type of each feature and the road surface shape model of the stationary body superimposed with the image on the displaying device.

The feature identification apparatus 300 aids the user to specify the feature to be measured by digitizing process (S104).

FIG. 11 shows a configuration of the feature identification apparatus 300 according to the first embodiment.

The functional configuration of the feature identification apparatus 300 performing the digitizing process (S104) will be explained in the following with reference to FIG. 11.

The feature identification apparatus 300 includes a motion stereo unit 310, a moving body removing unit 320, a feature identifying unit 330, and a measurement image point obtaining unit 340.

Further, it is assumed that the feature identification apparatus 300 can access the observation data memory unit 199 to obtain the observation data. However, the feature identification apparatus 300 can also include a memory unit corresponding to the observation data memory unit 199.

Further, it is assumed that the feature identification apparatus 300 can obtain the road surface shape model based on the LRF data from the road surface shape model generating unit 150. However, the feature identification apparatus 300 can also include a processing unit corresponding to the road surface shape model generating unit 150.

The motion stereo unit 310 includes a stationary body discriminating unit 311 and a stationary body model generating unit 312, and generates a three-dimensional model of the stationary body captured in the image based on the image data (a stationary body model, hereinafter).

The stationary body discriminating unit 311 discriminates a part of the image in which the stationary body is captured.

The stationary body model generating unit 312 generates the three-dimensional model of the stationary body captured in the image.

The moving body removing unit 320 includes a moving body discriminating unit 321 and a moving body removed model generating unit 322, and generates a road surface shape model by removing a laser measured point cloud for the moving body from the LRF data.

The moving body discriminating unit 321 discriminates the laser measured point cloud for the moving body in the road surface shape model.

The moving body removed model generating unit 322 removes the laser measured point cloud for the moving body and generates the road surface shape model.

The feature identifying unit 330 includes a labeling unit 331, an edge determining unit 332, and a feature determining unit 333, and discriminates a type of a feature located at each laser measured point shown by the road surface shape model.

The labeling unit 331 classifies each laser measured point cloud of the road surface shape model into groups.

The edge determining unit 332 discriminates an edge part being a border for segmentalizing the laser measured point cloud.

The feature determining unit 333 discriminates a type of the feature for each group of the laser measured points. The type of the feature is identified as, for example, "road" for the group in which the user's vehicle is running, and "outside of road" for the group next to it.

The measurement image point obtaining unit 340 includes an image displaying unit 341 and an image point inputting unit 342, and obtains the measurement image point showing the position on the image specified by the user.

The image displaying unit 341 displays the road surface shape model and the type of the feature captured in the image superimposed with the image on the displaying device.

The image point inputting unit 342 inputs the measurement image point showing the position on the image specified by the user from the inputting device.

FIG. 12 is a flowchart showing a flow of the digitizing process (S104) of the feature identification apparatus 300 according to the first embodiment.

The flow of the digitizing process (S104) performed by the feature identification apparatus 300 according to the first embodiment will be explained with reference to FIG. 12. Here, a detail of each of processes, which form the digitizing process (S104) that will be explained below, will be discussed later separately.

<S201: Motion Stereo Process>

First, the motion stereo unit 310 discriminates the part of the image in which the stationary body is captured by stereo view of a plurality of images of the road ahead of the vehicle captured by a single camera from the running vehicle (S201a: stationary body discriminating process), and generates a three-dimensional model of the stationary body captured in the image (a stationary body model, hereinafter) by projecting the discriminated part of the image on the ENU coordinate system (S201b: stationary body model generating process).

<S202: Moving Body Removing Process>

Next, the moving body removing unit 320 compares the stationary body model based on the image generated by the motion stereo unit 310 and the road surface shape model based on the LRF data generated by the road surface shape model generating unit 150, discriminates the laser measured point cloud for the moving body (S202a: moving body discriminating process), removes the laser measured point cloud for the moving body, and generates the stationary body model (S202b: moving body removed model generating process).

<S203: Feature Identifying Process>

Next, the feature identifying unit 330 classifies the laser measured point cloud shown by the road surface shape model generated by the moving body removing unit 320, from which the moving body is removed into groups (S203a: labeling process), discriminates the edge part of a line segment represented by the laser measured point cloud (S203b: edge determining process), segmentalizes the laser measured point cloud into groups having the edge as a border, and discriminates a type of the feature located at each of the laser measured point for each group (S203c: feature determining process).

<S204: Measurement Image Point Obtaining Process>

Next, the measurement image point obtaining unit 340 projects the road surface shape model generated by the moving body removing unit 320, from which the moving body is removed, on the image-capturing plane of the camera 230, and displays the road surface shape model, from which the moving body is removed, and the type of feature identified by the feature identifying unit 330 superimposed with the image on the displaying device (S204a: image displaying process).

Then, the measurement image point obtaining unit 340 inputs the position on the image specified by the user (the measurement image point), the type of feature captured at the measurement image point (feature type ID), and the identification number of the image in which the measurement image point is specified (specified image number) from the inputting equipment such as the keyboard 902, the mouse 903, the touch panel, etc. (S204b: image point inputting process).

Here, a detail of the motion stereo process (S201) performed by the motion stereo unit 310 will be explained in the following.

Three-dimensional data based on the LRF data (orientation/distance data) obtained by the LRF (the laser radar 240) shows the road surface shape model with high density and high precision, and the road feature measurement apparatus 100 measures the position of feature using this road surface shape model with high precision. However, since there normally exist many moving bodies such as a pedestrian, an oncoming vehicle, etc., the road surface shape model includes many laser measured points of the moving body which hides the stationary body. Therefore, when the stationary body is desired to be a target for location survey, the existence of the moving body which hides the stationary body causes erroneous extraction of the laser measured point used for the measurement and decrease of the precision of measured result.

FIG. 13 shows a road surface shape model when a truck does not hide a pole.

FIG. 14 shows a road surface shape model when the truck hides the pole.

FIGS. 13 and 14 are the LRF data of the same truck and pole from different viewpoints projected in three-dimensional models. In FIG. 13, it is possible to determine the laser measured point cloud of the pole since the truck and the pole are captured separately; however, in FIG. 14, the point cloud of the pole is hidden by the truck. Therefore, when the position of the pole is measured under the status of FIG. 14, it is impossible to correctly select the point cloud of the pole from the road surface shape model, which may generate a large measurement error.

Here, the feature identification apparatus 300, in the motion stereo process (S201), generates a three-dimensional model of the stationary body by the motion stereo method using a plurality of time series of images captured by the single camera 230. Then, the feature identification apparatus 300, in the moving body removing process (S202), extracts and removes the laser measured point cloud of the moving body region from the road surface shape model based on the LRF data by comparing with the stationary model based on the image.

Motion stereo method using a plurality of time series of images captured by the single camera 230 is an operating principle based on the assumption that the movement of the camera 230 is known and the image-capturing target remain stationary. Because of this, the feature identification apparatus 300 can generate the three-dimensional model only representing the stationary body based on the image by using the motion stereo method.

Then, it is possible to remove only the laser measured point cloud for the moving body from the laser measured point cloud for the road surface shape model based on the LRF data using the stationary body model obtained by the motion stereo method.

Shingo Ando et al., "A Study of Autonomous Mobile System in Outdoor Environment" (Part 37 Improvement of Range Estimation Accuracy by Baseline Optimization in Motion Stereo Using GPS/INS/ODV), Robotics and Mechatronics Conference (Kobe), 2005 is a document related to an algorithm of the motion stereo method.

FIG. 15 is a flowchart showing a flow of the motion stereo process (S201).

The motion stereo process (S201) performed by the motion stereo unit 310 in the feature identification apparatus 300 will be explained in the following with reference to FIG. 15.

From a first epipolar line calculating process (S301) through a bi-directional matching process (S303) correspond to the stationary body discriminating process (S201a) for discriminating the stationary body captured in the image, and a distance image three-dimensional reconstructing process (S304) through a voxel deleting process of volume intersection (S306) correspond to the stationary body model generating process (S201b) for generating a stationary body model based on the image.

<S301: First Epipolar Line Calculating Process>

First, the stationary body discriminating unit 311 calculates an epipolar line for an arbitrary point on the image based on the camera position and posture by the camera position and posture computing unit 130.

FIG. 16 shows a calculating method of an epipolar line $L_1$ according to the first embodiment.

The calculating method of the epipolar line $L_1$ used by the stationary body discriminating unit 311 will be explained in the following with reference to FIG. 16.

First, the stationary body discriminating unit 311 inputs an image A captured at a time $T_1$ and an image B captured at a time $T_2$ from the observation data memory unit 199 (S301a).

Next, the stationary body discriminating unit 311 sets a three-dimensional space to form a triangular pyramid by a center of the camera at the time of image-capturing and an image showing an image-capturing plane being away from the center of the camera with a focal distance (image plane) for each image (S301b).

Next, the stationary body discriminating unit 311 calculates an epipolar plane $D_1$ as a plane including a plane $d_1$ formed by the center $C_1$ of the camera of the image plane A, a feature point $P_1$ on the image plane A and the center $C_2$ of the camera of the image plane B (S301c).

The epipolar plane $D_1$ is represented by the following expression 20.

Here, it is assumed that the coordinates of the center of the camera $C_1$ are $(E_1, N_1, U_1)$, the coordinates of the feature point $P_1$ of the set three-dimensional space (three-dimensional real space coordinates, hereinafter) are $(E_{p1}, N_{p1}, U_{p1})$, and the coordinates of the center of the camera $C_2$ are $(E_2, N_2, U_2)$.

$$\begin{vmatrix} x & y & z & 1 \\ E_2 & N_2 & U_2 & 1 \\ E_{p1} & N_{p1} & U_{p1} & 1 \\ E_1 & N_1 & U_1 & 1 \end{vmatrix} = 0 \quad \text{(expression 20)}$$

Then, the stationary body discriminating unit 311 calculates the epipolar line $L_1$ as a line including an intersecting line of the epipolar plane $D_1$ and the image plane B (S302d).

Here, in FIG. 16, when a measurement target point $P_{out}$ which is captured on the image plane A as the feature point $P_1$ is stationary, the measurement target point $P_{out}$ always exists on the epipolar plane $D_1$, and a corresponding point $P_2$ which is the image-capturing point on the image plane B of the measurement target point $P_{out}$ exists on the epipolar line $L_1$.

FIG. 17 shows that the corresponding point $P_2$ of a measurement target point $P_{T2}$ after moving does not exist on the epipolar line $L_1$.

On the other hand, if both the camera and the measurement target point P move, as shown in FIG. 17, the corresponding point $P_2$ corresponding to the measurement target point $P_{T2}$ on the image plane B after moving (time $T_2$) does not exist on the epipolar line $L_1$ which is set based on the feature point $P_1$ showing the measurement target point $P_{T1}$ on the image plane A before moving (time $T_1$). As shown in FIG. 17, if the measurement target point P does not move, the corresponding point $P_1$ corresponding to the measurement target point $P_{T1}$ on the image plane B exists on the epipolar line $L_1$.

Namely, since the moving body is not on the epipolar line, if the corresponding point exists on the epipolar line, the measurement target point shows the stationary body, so that it is possible to extract only the stationary body by searching the corresponding point on the epipolar line.

The first corresponding point searching process (S302) will be explained in FIG. 15.

<S302: First Corresponding Point Searching Process>

The stationary body discriminating unit 311 searches on the epipolar line to find the corresponding point $P_2$, corresponding to the feature point $P_1$ on the image plane A, on the image plane B as will be discussed in the following.

First, the stationary body discriminating unit 311 compares color information of pixels of the feature point $P_1$ on the image A with color information of each pixel on the epipolar line $L_1$ on the image B (S302a).

Then, the stationary body discriminating unit 311 discriminates the pixel, of which color information corresponds to the pixel of the feature point $P_1$, on the epipolar line $L_1$ as a corresponding point $P_2$ (S302b).

At this time, the stationary body discriminating unit 311 discriminates the corresponding point $P_2$ of which a differential value or RGB value of color edge is matched with or similar to (a difference of values is within a particular range) the feature point $P_1$. Further, the stationary body discriminating unit 311 discriminates the corresponding point $P_2$ by a window matching.

<S303: Bi-Directional Matching Process>

Next, the stationary body discriminating unit 311 sets an epipolar line $L_2$ on the image plane A based on the corresponding point $P_2$ on the image plane B, discriminates the corresponding point $P_3$ on the epipolar line $L_2$ corresponding to the corresponding point $P_2$ on the image plane B, and discriminates the corresponding point $P_2$ based on the positional relation between the feature point $P_1$ and the corresponding point $P_3$ on the image plane A.

The stationary body discriminating unit 311, not only one directional matching which only performs search for the corresponding point $P_2$ on the image plane B corresponding to the feature point $P_1$ on the image plane A, but also performs bi-directional matching for determining properness of the corresponding point $P_2$ by searching for the corresponding point $P_3$ on the image plane A corresponding to the corresponding point $P_2$ searched on the image plane B and comparing the feature point $P_1$ and the corresponding point $P_3$, which tries to improve search precision of the corresponding point $P_2$. Here, Jun-ichi Takiguchi, "High-Precision Range Estimation from an Omnidirectional Stereo System" Transactions of the Japan Society of Mechanical Engineers (C), Vol. 69, No. 680 (2003-4) is a document related to the bi-directional matching process.

Then, the stationary body discriminating unit 311, as well as the first epipolar line calculating process (S301), calculates an epipolar plane $D_2$ as a plane including a plane $d_2$ formed by the center of the camera $C_2$ on the image plane B, the corresponding point $P_2$ on the image plane B, and the center of the camera $C_1$ on the image plane A, and calculates the epipolar line $L_2$ as a line including an intersecting line of the epipolar plane $D_2$ and the image plane A (S303a).

Next, the stationary body discriminating unit 311, as well as the first corresponding point searching process (S302), compares the color information of pixels of the corresponding point $P_2$ on the image plane B and the color information of each pixel on the epipolar line $L_2$ in the image A, and discriminates a pixel, corresponding to color information of the corresponding point $P_2$, on the epipolar line $L_2$ as the corresponding point $P_3$ (S303b).

Then, the stationary body discriminating unit 311 compares the position of the feature point $P_1$ on the image plane A and the position of the corresponding point $P_3$, decides the corresponding point $P_2$ as a correct corresponding point for the feature point $P_1$ if a distance between the feature point $P_1$ and the corresponding point $P_3$ is within a predetermined range, and deletes the corresponding point $P_2$ if the distance between the feature point $P_1$ and the corresponding point $P_3$ is not within the predetermined range (S303c).

In FIG. 15, the image three-dimensional reconstructing process (S304) will be explained.

<S304: Image Three-Dimensional Reconstructing Process>

Next, the stationary body model generating unit 312 generates a three-dimensional model of the stationary body captured in the image A by calculating three-dimensional coordinates of the measurement target point $P_{out}$ captured in the image A as the feature point $P_1$ in the following manner.

First, the stationary body model generating unit 312 calculates a LOS vector $V_1$ showing a direction from the center of the camera $C_1$ to the feature point $P_1$ on the image plane A and a LOS vector $V_2$ showing a direction from the center of the camera $C_2$ to the corresponding point $P_2$ on the image plane B (S304a).

Then, the stationary body model generating unit 312 calculates three-dimensional coordinates shown by an intersecting point of the LOS vector $V_1$ and the LOS vector $V_2$ as the three-dimensional coordinates of the measurement target point $P_{out}$ (S304b).

Further, the stationary body model generating unit 312 sets the color information of the pixels of the feature point $P_1$ on the image plane A as color information of the measurement target point $P_{out}$ (S304c).

The three-dimensional coordinates of the measurement target point $P_{out}$ calculated here is coordinate values in a three-dimensional real space which is set so that the center of the camera $C_1$ and the image plane A should form a triangular pyramid.

Here, the first epipolar line calculating process (S301) through the image three-dimensional reconstructing process (S304) are performed for each combination of images by using each pixel as the feature point.

Namely, by the above process, for all pixels of all images, it is determined to be the stationary body or the moving body, and for the pixels showing the stationary body, the three-dimensional coordinates and the color information are decided. Further, for all images, the stationary body model represented by the point cloud data showing the three-dimensional coordinates and the color information is generated. This stationary body model is a model on the three-dimensional real space.

In FIG. 15, a voxel space voting process (S305) will be explained.

<S305: Voxel Space Voting Process>

Next, the stationary body model generating unit 312 votes the stationary body model to the voxel space, and deletes the part of the moving body which has been erroneously extracted.

First, the stationary body model generating unit 312 sets a voxel space composed of plural voxels on the three-dimensional real space (S305a).

Next, the stationary body model generating unit 312 discriminates a voxel in which each point that forms the stationary body model is located based on the three-dimensional coordinates for each point, and votes to the voxel discriminated (S305b).

Next, the stationary body model generating unit 312 calculates point density of each voxel, and deletes a voxel of which the calculated point density is smaller than the threshold value from the voxel space (S305c).

FIG. 18 is an image drawing of the voxel space voting process (S305) according to the first embodiment.

FIG. 18 shows (1) a preset voxel space, (2) the voxel space after voting the stationary body model, and (3) the voxel space after processing which is composed of only high-density voxels after removing low-density voxels.

There may be a case, in which the stationary body model generated by the image three-dimensional reconstructing process (S304) includes the corresponding point for the moving body which has been erroneously discriminated (error point, hereinafter) because of influence by the color precision of the image, properness of the threshold value of the color information used for determination of the corresponding point in the first corresponding point searching process (S302), and properness of the threshold value of the distance used for determination of the corresponding point in the bi-directional matching process (S303).

Then, the stationary body model generating unit 312 removes the error point from the stationary body model by the voxel space voting process (S305). At the time of voxel space voting, since the point density of the voxel where the moving body is located is reduced, such voxel is removed.

In FIG. 15, voxel deleting process of volume intersection (S306) will be explained.

<S306: Voxel Deleting Process of Volume Intersection>

The stationary body model generating unit 312 deletes the error part from the stationary body model by the volume intersection method.

In the above process, the stationary body model obtained by the stereo view of the image includes errors because of influence by mismatching in the stereo computation process or occlusion. Although a model error because of minute mismatching of the corresponding point is reduced by deleting the low-density voxel in the voxel space voting process (S305), there may a case, in which the errors cannot be deleted by the voxel space voting process (S305) such as when error points are concentrated and density in the voxel becomes high.

Then, the stationary body model generating unit 312 deletes the erroneous part in the voxel space by applying the volume intersection method to the voxel space obtained by the voxel space voting process (S305) as follows:

First, for each voxel which forms the voxel space obtained by the voxel space voting process (S305), the stationary body model generating unit 312 projects the corresponding voxel on plural image planes (S306a).

Next, the stationary body model generating unit 312 compares color information of the voxel with color information of a pixel to which the corresponding voxel is projected (S306b).

Here, the color information of the voxel means the color information of points of the stationary body model included in the voxel.

Then, the stationary body model generating unit 312 deletes the corresponding voxel from the voxel space if the color information does not match (S306c).

Namely, the volume intersection method is a method, when each point of the three-dimensional space is projected on each image plane, to keep points projected inside of all silhouette as points within a range of the target, and remove the other points as points being outside of the range of the target.

FIG. 19 shows the volume intersection method used in the first embodiment.

In FIG. 19, there exists a set of voxels (voxel space) representing a stationary body model.

In the volume intersection method, the following processing will be done:
(1) when a voxel A is projected on an image A, obtain color information of a pixel A;
(2) compare color information of the voxel A with the color information of the pixel A, if the color information are matched or similar, assume there exists the voxel A;
(3) further, when the voxel A is projected on another image B having a different view point from the image A, obtain color information of a pixel B; and
(4) compare the color information of the voxel A with the color information of the pixel B, if the color information are dissimilar, delete the voxel A as not existing on the real environment.

The above processes are performed among a plurality of images in time series.

Here, in FIG. 12, the moving body removing process (S202) performed by the moving body removing unit 320 will be explained.

As discussed above, in the three-dimensional model obtained by the image data using the motion stereo method, only the stationary body is three-dimensionalized.

Then, the moving body discriminating unit 321 inputs the three-dimensional model obtained based on the image data (the stationary body model) and the three-dimensional model obtained based on the LRF data (the road surface shape model), compares, and extracts the difference, so that the difference region is extracted from the road surface shape model as a region of the moving body (S202a: the moving body discriminating process).

Then, the moving body removed model generating unit 322 generates the road surface shape model representing the stationary body by removing the region extracted by the moving body discriminating unit 321 from the road surface shape model.

In the moving body discriminating process (S202a), the difference of the three-dimensional models can be compared for each point which forms each three-dimensional model, or in order to reduce the computation time, the difference can be compared by a unit of voxel with voting each point which forms each three-dimensional model.

Next, in FIG. 12, the feature identifying process (S203) performed by the feature identifying unit 330 will be explained.

In the road feature measurement apparatus 100, three neighboring points of an arbitrary point (a measurement image point) specified on the image by the user are selected from the laser measured point cloud of the road surface shape model, and a coordinate of an intersecting point of a plane formed by the three points and a LOS vector for the measurement image point is outputted as the position measured result.

FIG. 20 is an image showing a place where a feature specified by the user is easily misrecognized.

For example, when the user specifies a measurement image point for the image such as FIG. 20, the road feature measurement apparatus 100 sometimes selects three points of the road surface shape model for a point different from the measurement image point which the user intends.

For example, in FIG. 20, when the user specifies a pole part which is backward of a guardrail, there is possibility that the road feature measurement apparatus 100 erroneously selects the laser measured point cloud of the guardrail part.

Then, the feature identifying unit 330 identifies a type of each feature shown by the road surface shape model in order to show the user. By this operation, the user can specify correctly the feature part which the user desires to measure as the measurement image point, and the road feature measurement apparatus 100 can select correct three neighboring points from the road surface shape model based on the measurement image point specified correctly, and can output the measured result with high precision.

Further, the road feature measurement apparatus 100 can output the measured result with high precision when a point of the road surface is specified as the measurement image point. Therefore, by showing a type of the feature, it is possible to make the user determine whether a point which the user intends to specify is on the road surface or above the road surface, which enables the road feature measurement apparatus 100 to output the measured result with high precision.

FIG. 21 shows the feature identifying process (S203) according to the first embodiment.

The feature identifying process (S203) performed by the feature identifying unit 330 will be explained in the following with reference to FIG. 21.

FIG. 21 shows an example of the road surface shape model based on the LRF data obtained by swinging the laser radar 240 once in the transverse direction from the vehicle. This corresponds to a cross section of the road when the road is cut vertically to the direction of running. In this example, the first group A is a street where the user's car is running, and an edge position is a road shoulder which is a border of a road and a sidewalk; the first group B is the sidewalk; the first group C is a wall surface; and the second group is a pole, etc.

In the feature identifying unit 330, a labeling unit 331 classifies the laser measured point cloud shown by the road surface shape model which is generated by the moving body removing unit 320 with removing the moving body (a moving body removed model, hereinafter) into groups (S203a: labeling process).

At this time, the labeling unit 331 assumes that a laser measured point having three-dimensional coordinates of the position of the running vehicle and a laser measured point cloud of which three-dimensional coordinate values are continuous from the laser measured point are the first group and the laser measured point cloud other than the above is the second group.

Next, an edge determining unit 332 discriminates a part of which a change of angle in the line represented by the laser measured point cloud of the first group exceeds the threshold value as the edge part (S203b: an edge determining process).

Then, the feature determining unit 333 segmentalizes the laser measured point cloud of the first group into plural groups using the edge part as a border, and decides a type of the feature located at each laser measured point for each group (S203c: a feature determining process).

At this time, the feature determining unit 333 classifies the laser measured point cloud of the first group into the first group A corresponding to the position of the running vehicle, the first group B located at a height from the first group A within a specific range and being continuous in the vertical and horizontal directions, and the first group C being continuous in the vertical direction.

Further, the feature determining unit 333 identifies the first group A as "street", the first group B as "sidewalk", the first group C as "wall surface", and the second group as "others (a pole, a kilo-post, a sign, etc.)".

As for another form of the digitizing process (S104) shown in FIG. 12 which has been explained above, the feature identification apparatus 300 can be formed not to remove the moving body from the road surface shape model. Namely, in the digitizing process (S104), the motion stereo process (S201) and the moving body removing process (S202) can remain unperformed.

In this case, the feature identifying unit 330 performs the feature identifying process (S203) with, for example, an algorithm shown in FIG. 22.

Further, in this case, the feature identifying unit 330 includes a processing unit corresponding to the road surface shape model generating unit 150. Here, the processing unit corresponding to the road surface shape model generating unit 150 is a 3D model generating unit 334 (illustration omitted).

FIG. 22 is a flowchart showing a flow of the feature identifying process (S203) according to the first embodiment.

In FIG. 22, the labeling unit 331 inputs the LRF data from the observation data memory unit 199, performs labeling for two-dimensional distance information obtained from the distance/orientation shown by the LRF data, and classifies the LRF data into the first group showing a part continuous to the street and the second group representing other features (S203a: a labeling process).

At this time, the labeling unit 331 classifies the LRF data into the first group of the point cloud showing the part continuous to the street and the second group of others using the fact that the laser measured point located directly below the vehicle is always the street. Here, the laser measured point located directly below the vehicle is distance data of which the orientation is 90 [deg] corresponding to the direction of running of the vehicle.

Next, the edge determining unit 332 extracts the edge from the first group which is a point cloud showing the part continuous to the street (S203b: an edge determining process).

Next, the feature determining unit 333 classifies the first group into a sidewalk, a street, and a wall surface based on the edge (S203c: a feature determining process).

Then, a 3D model generating unit 334 inputs the vehicle position and posture data and the laser radar position and posture data from the observation data memory unit 199, performs the three-dimensional Affine transformation of the LRF data based on the position and posture of the vehicle and the position and posture of the laser radar 240, and generates the road surface shape model represented by the three-dimensional point cloud (S203d: 3D model generating process).

Next, in FIG. 12, the measurement image point obtaining process (S204) performed by the measurement image point obtaining unit 340 will be explained.

The measurement image point obtaining unit 340 notifies the user of the types including the street surface, the sidewalk surface, the wall surface, and other features identified by the feature identifying unit 330 (S204a: an image displaying process), and inputs the measurement image point specified by the user (204b: an image point inputting process).

As a concrete notification method for notifying the user of types of the features, there is a method to display an attribute including "street", "sidewalk", "wall surface", "other feature" for the selected region specified by the user.

Or, the moving body removed model generated by the moving body removing unit 320 or the road surface shape model is projected on the image-capturing plane of the camera 230 and the moving body removed model (or the road surface shape model), and the type of feature can be superimposed with the image and displayed on the displaying device. Further, either of the moving body removed model (or the road surface shape model) and the type of feature can be superimposed with the image and displayed. Further, the display is not limited to superimposing, but can be also done by arranging the information vertically/horizontally. Since the type of feature corresponds to the laser measured point cloud of the moving body removed model (or the road surface shape model), the type of feature can be superimposed with the image by displaying at the position corresponding to the moving body removed model (or the road surface shape model). Further, for the moving body region removed, at least one of the road surface shape model and the type of feature (the moving body) can be superimposed with the image.

Yet further, the moving body removed model can be separately colored and displayed according to the type of feature.

A method for projecting the moving body removed model on the image-capturing plane of the camera 230 and superimposing the moving body removed model with the image to display is the same as the processing method in the 3D modeling process (S105), which will be discussed later.

Here, the 3D modeling process (S105) in FIG. 3 will be explained in the following with reference to FIG. 23.

FIG. 23 is a flowchart showing a flow of the 3D modeling process (S105) according to the first embodiment.

<S401: Vehicle-Laser Synchronous Data Generating Process>

First, the road surface shape model generating unit 150 generates vehicle-laser synchronous data by synchronizing the vehicle position and posture data and the LRF data (orientation/distance data).

<S402: Laser-Camera Synchronous Data Generating Process>

Further, the road surface shape model generating unit 150 generates laser-camera synchronous data by synchronizing the LRF data and the time of image data.

<S403: Corresponding LRF Data Extracting Process>

Next, the road surface shape model generating unit 150 extracts the LRF data which is synchronized with the specified image from the laser-camera synchronous data (the corresponding LRF data, hereinafter) based on the specified image number which identifies the image of which the measurement image point is specified by the user (the specified image, hereinafter).

<S404: Three-Dimensional Affine Transformation Process>

Then, the road surface shape model generating unit 150 extracts the position and posture of the vehicle which is synchronized with the corresponding LRF data from the vehicle/laser synchronous data, and performs three-dimensional Affine transformation of the corresponding LRF data based on the position and posture of the vehicle and the position and posture of the laser radar. By the three-dimensional Affine transformation, the road surface shape model generating unit 150 generates the road surface shape model representing with the ENU coordinates the laser measured point cloud corresponding to the image in which the measurement image point is specified.

Here, a detail of the three-dimensional Affine transformation process (S404) will be explained.

When the three-dimensional coordinates of the laser measured point obtained from the LRF data is ($x_0$, $y_0$, $z_0$), the laser measured point cloud of the LRF data is converted into the three-dimensional coordinates ($x_2$, $y_2$, $z_2$) for the position of the vehicle with the following equations 1 and 2. Further, FIGS. 4 and 5 show positional relation between the top board 103 mounted on the vehicle, the LRF (the laser radar 240), and the camera 230.

[Expression 2]

$$\begin{bmatrix} x_2 \\ y_2 \\ z_2 \end{bmatrix} = \begin{bmatrix} x_1 + \Delta x_{lrf} \\ y_1 + \Delta y_{lrf} \\ z_1 + \Delta z_{lrf} \end{bmatrix} \quad \text{(equation 1)}$$

However, $$\begin{bmatrix} x_1 \\ y_1 \\ z_1 \end{bmatrix} = \begin{bmatrix} \cos\psi_{lrf} & 0 & \sin\psi_{lrf} \\ 0 & 1 & 0 \\ -\sin\psi_{lrf} & 0 & \cos\psi_{lrf} \end{bmatrix} \begin{bmatrix} 1 & 0 & 0 \\ 0 & \cos\theta_{lrf} & -\sin\theta_{lrf} \\ 0 & \sin\theta_{lrf} & \cos\theta_{lrf} \end{bmatrix} \quad \text{(equation 2)}$$

$$\begin{bmatrix} \cos\phi_{lrf} & -\sin\phi_{lrf} & 0 \\ \sin\phi_{lrf} & \cos\phi_{lrf} & 0 \\ 0 & 0 & 1 \end{bmatrix} \begin{bmatrix} x_0 \\ y_0 \\ z_0 \end{bmatrix}$$

where $\Delta x_{lrf}$: distance in transverse direction from the position of vehicle; $\Delta y_{lrf}$: distance in height direction from the position of vehicle; $\Delta z_{lrf}$: distance in depth direction from the position of vehicle; $\phi_{lrf}$: an attachment roll angle to the top plate; $\theta_{lrf}$: an attachment pitch angle to the top plate; and $\psi_{lrf}$: an attachment yaw angle to the top plate.

"$z_0$" is a height of the laser scanning plane of the laser radar 240, and is 0 here, since the reference of the laser radar 240 is set on the scanning plane.

Next, with considering the position and posture of the vehicle, the road surface shape model of the ENU coordinate system by transformation using the equations 3 and 4. Here, points on the road surface shape model are assumed to be ($N_{lrf}$, $U_{lrf}$, $E_{lrf}$).

[Expression 3]

$$\begin{bmatrix} E_{lrf} \\ U_{lrf} \\ N_{lrf} \end{bmatrix} = \begin{bmatrix} x_{lrf} + E_{lrf} \\ y_{lrf} + U_{lrf} \\ z_{lrf} + N_{lrf} \end{bmatrix} \quad \text{(equation 3)}$$

However, $$\begin{bmatrix} x_{lrf} \\ y_{lrf} \\ z_{lrf} \end{bmatrix} = \begin{bmatrix} \cos\psi_v & 0 & \sin\psi_v \\ 0 & 1 & 0 \\ -\sin\psi_v & 0 & \cos\psi_v \end{bmatrix} \begin{bmatrix} 1 & 0 & 0 \\ 0 & \cos\theta_v & -\sin\theta_v \\ 0 & \sin\theta_v & \cos\theta_v \end{bmatrix} \quad \text{(equation 4)}$$

$$\begin{bmatrix} \cos\phi_v & -\sin\phi_v & 0 \\ \sin\phi_v & \cos\phi_v & 0 \\ 0 & 0 & 1 \end{bmatrix} \begin{bmatrix} x_2 \\ y_2 \\ z_2 \end{bmatrix}$$

where $E_v$: east direction from the position of vehicle; $N_v$: north direction from the position of vehicle; $U_v$: height direction from the position of vehicle; $\phi_v$: a roll angle of the vehicle; $\theta_v$: a pitch angle of the vehicle; and $\psi_v$: a yaw angle of the vehicle; and the coordinate system is a right-handed coordinate system where y is an upper direction.

FIGS. 6, 7, and 8 show the road surface shape model represented by a point cloudpoint cloud of the ENU coordinates generated by the above.

For example, in FIG. 7, a border of the sidewalk located in the left side (a step part) and the road in the right side can be observed in the three-dimensional point cloud data (road shoulder) of the road surface shape model.

Further, in FIG. 8, which shows the optical image shown in FIG. 9 by the three-dimensional point cloud data, a slope form along the road (a cross section shape of the road) can be observed.

Next, the feature position locating process (S106) in FIG. 3 will be explained.

FIG. 24 shows a calculating method of feature position in the feature position locating process (S106) according to the first embodiment.

An outline of the calculating method of feature position according to the first embodiment will be explained in the following with reference to FIG. 24.

In the feature position locating process (S106), the ENU coordinate of an intersecting point of a LOS vector from the center of camera to the measurement image point on the image plane and a plane formed by three points (P1, P2, P3) before projecting corresponding to three neighboring points (P1', P2', P3') of the measurement image point on projecting the road surface shape model on the image plane is calculated as the feature position.

FIG. 25 is a flowchart showing a flow of the feature position locating process (S106) according to the first embodiment.

<S501: Vehicle-Camera Synchronous Data Generating Process>

First, the camera LOS computing unit 140 generates the vehicle-camera synchronous data by synchronizing the vehicle position and posture data with the time of image data.

<S502: 3D Model Projecting Process>

Next, the model projecting unit 172 of the road surface model corresponding point searching unit 170 extracts the position and posture of the vehicle which is synchronized with the specified image from the vehicle-camera synchronous data, and projects the road surface shape model on the image plane based on the position and posture of vehicle and the position and posture of camera. Then, the road surface shape model is superposed with the image and displayed on the displaying device.

Here, a detail of the 3D model projecting process (S502) performed by the model projecting unit 172 will be explained.

The model projecting unit 172 projects and converts the road surface shape model to the image plane of the camera.

The position ($x_{cam}$, $y_{cam}$, $z_{cam}$) of the point cloud of the road surface shape model for the camera coordinate system is represented by the following equations 5 and 6.

[Expression 4]

$$\begin{bmatrix} x_{cam} \\ y_{cam} \\ z_{cam} \end{bmatrix} = \begin{bmatrix} \cos\phi_{cam} & -\sin\phi_{cam} & 0 \\ \sin\phi_{cam} & \cos\phi_{cam} & 0 \\ 0 & 0 & 1 \end{bmatrix} \begin{bmatrix} 1 & 0 & 0 \\ 0 & \cos\theta_{cam} & -\sin\theta_{cam} \\ 0 & \sin\theta_{cam} & \cos\theta_{cam} \end{bmatrix} \quad \text{(equation 5)}$$

$$\begin{bmatrix} \cos\psi_{cam} & 0 & \sin\psi_{cam} \\ 0 & 1 & 0 \\ -\sin\psi_{cam} & 0 & \cos\psi_{cam} \end{bmatrix} \begin{bmatrix} x_3 \\ y_3 \\ z_3 \end{bmatrix}$$

where the attachment position of the camera is $\Delta x_{cam}$: distance in transverse direction from the position of vehicle; $\Delta y_{cam}$: distance in height direction from the position of vehicle; $\Delta z_{cam}$: distance in depth direction from the position of vehicle; $\phi_{cam}$: an attachment roll angle to the top plate; $\theta_{cam}$: an attachment pitch angle to the top plate; and $\psi_{cam}$: an attachment yaw angle to the top plate. However, $$\begin{bmatrix} x_2 \\ y_2 \\ z_2 \end{bmatrix} = \begin{bmatrix} \cos\phi_v & -\sin\phi_v & 0 \\ \sin\phi_v & \cos\phi_v & 0 \\ 0 & 0 & 1 \end{bmatrix} \begin{bmatrix} 1 & 0 & 0 \\ 0 & \cos\theta_v & -\sin\theta_v \\ 0 & \sin\theta_v & \cos\theta_v \end{bmatrix} \quad \text{(equation 6)}$$

$$\begin{bmatrix} \cos\psi_v & 0 & \sin\psi_v \\ 0 & 1 & 0 \\ -\sin\psi_v & 0 & \cos\psi_v \end{bmatrix} \begin{bmatrix} x_{lrf} \\ y_{lrf} \\ z_{lrf} \end{bmatrix} - \begin{bmatrix} \Delta x_{cam} \\ \Delta y_{cam} \\ \Delta z_{cam} \end{bmatrix}$$

Next, a straight line formed by these points and the center of the camera ($x_{cam()}$, $y_{cam()}$, $z_{cam()}$) is represented by the following equations 7, 8, 9, and 10.

[Expression 5]

$$\frac{x - x_{cam0}}{\lambda} = \frac{y - y_{cam0}}{\mu} = \frac{z - z_{cam0}}{\nu} \quad \text{(equation 7)}$$

However, $$\lambda = \frac{(x_{cam} - x_{cam0})}{\sqrt{(x_{cam} - x_{cam0})^2 + (y_{cam} - y_{cam0})^2 + (z_{cam} - z_{cam0})^2}} \quad \text{(equation 8)}$$

$$\mu = \frac{y_{cam} - y_{cam0}}{\sqrt{(x_{cam} - x_{cam0})^2 + (y_{cam} - y_{cam0})^2 + (z_{cam} - z_{cam0})^2}} \quad \text{(equation 9)}$$

(4.14)

$$\nu = \frac{z_{cam} - z_{cam0}}{\sqrt{(x_{cam} - x_{cam0})^2 + (y_{cam} - y_{cam0})^2 + (z_{cam} - z_{cam0})^2}} \quad \text{(equation 10)}$$

Further, at this time, the image plane is represented by the following equation 11 using a focal distance f assuming that the camera 230 is an ideal pin hole camera:

$$z = f \quad \text{(equation 11)}$$

An intersecting point of this image plane and the straight line is a point which is the laser measured point of the road surface shape model projected on the image.

FIG. 10 shows the image on which projected transformation has been performed. As understood from the figure, the point projected transformed and the image are matched well. For example, it can be understood from the figure that a step represented by the point projected transformed matches the step of the road surface shown by the image.

Next, in FIG. 25, the three neighboring points extracting process (S503) will be explained.

A neighborhood extracting unit 171 of the road surface model corresponding point searching unit 170 extracts three neighboring points of the measurement image point from the laser measured point cloud of the road surface shape model.

FIG. 26 is a flowchart showing a flow of the three neighboring points extracting process (S503) according to the first embodiment.

FIG. 27 shows the three neighboring points extracting process (S503) according to the first embodiment.

A detail of the three neighboring points extracting process (S503) performed by the neighborhood extracting unit 171 of the road surface model corresponding point searching unit 170 will be explained in the following with reference to FIGS. 26 and 27.

In FIGS. 26 and 27, the neighborhood extracting unit 171 calculates the most neighboring point P1 of the measurement image point Pin from the laser measured point cloud of the road surface shape model projected on the image plane (S601).

Next, the neighborhood extracting unit 171 selects a scanning line S3, an interval from which to a scanning line S2 includes the measurement image point Pin, out of a scanning line S1 and the scanning line S3 which are scanning lines directly before and after the scanning line S2 including the most neighboring point P1 (S602).

Next, the neighborhood extracting unit 171 calculates a straight line L which connects the most neighboring point P1 and the measurement image point Pin (S603).

Then, the neighborhood extracting unit 171, in the selected scanning line S3, calculates a point P2 which is the most neighboring to the straight line L at the right side of the straight line L and a point P3 which is the most neighboring to the straight line L at the left side of the straight line L, and outputs the points corresponding to the calculated most neighboring points P1, P2, and P3 before projecting on the image plane as three neighboring points of the measurement image point Pin (S604).

The scanning line means the laser measured point cloud obtained by irradiation of laser with swinging once in the transverse direction by the laser radar 240, and the laser measured point cloud of one scanning line forms a line segment.

If the three neighboring points of the measurement image point extracted in the three neighboring points extracting process (S503) are P1 ($x_{p1}$, $y_{p1}$, $z_{p1}$), P1 ($x_{p2}$, $y_{p2}$, $z_{p2}$), and P3 ($x_{p3}$, $y_{p3}$, $z_{p3}$), an equation form of a three-dimensional plane (the road surface shape model corresponding plane) formed by the three neighboring points of the measurement image point is represented by the following equation 12.

[Expression 6]

$$\begin{vmatrix} x & y & z & 1 \\ x_{p1} & y_{p1} & z_{p1} & 1 \\ x_{p2} & y_{p2} & z_{p2} & 1 \\ x_{p3} & y_{p3} & z_{p3} & 1 \end{vmatrix} = 0 \quad \text{(equation 12)}$$

Next, in FIG. 25, a LOS computing process (S504) will be explained.

<S504: LOS Calculating Process>

The camera LOS computing unit 140 extracts the position and posture of the vehicle which is synchronized with the specified image from the vehicle-camera synchronous data, calculates ENU coordinates of the measurement image point and the center of the camera of the specified image based on the position and posture of vehicle and the position and posture of camera, and calculates a LOS vector from the center of the camera to the measurement image point in the ENU coordinate system.

Here, if the position on the image shown by the measurement image point is ($U_L$, $V_L$), the measurement image point ($N_L$, $U_L$, $E_L$) in the ENU coordinate can be obtained using the following equations 13, 14, and 15.

[Expression 7]

$$\begin{bmatrix} N_L \\ U_L \\ E_L \end{bmatrix} = \begin{bmatrix} \cos\psi_v & 0 & \sin\psi_v \\ 0 & 1 & 0 \\ -\sin\psi_v & 0 & \cos\psi_v \end{bmatrix} \begin{bmatrix} 1 & 0 & 0 \\ 0 & \cos\theta_v & -\sin\theta_v \\ 0 & \sin\theta_v & \cos\theta_v \end{bmatrix} \quad \text{(equation 13)}$$
$$\begin{bmatrix} \cos\phi_v & -\sin\phi_v & 0 \\ \sin\phi_v & \cos\phi_v & 0 \\ 0 & 0 & 1 \end{bmatrix} \begin{bmatrix} N_{Lcam} \\ U_{Lcam} \\ E_{Lcam} \end{bmatrix} + \begin{bmatrix} N_v \\ U_v \\ E_v \end{bmatrix}$$

However, $$\begin{bmatrix} N_L \\ U_L \\ E_L \end{bmatrix} = \begin{bmatrix} \cos\psi_{cam} & 0 & \sin\psi_{cam} \\ 0 & 1 & 0 \\ -\sin\psi_{cam} & 0 & \cos\psi_{cam} \end{bmatrix} \begin{bmatrix} 1 & 0 & 0 \\ 0 & \cos\theta_{cam} & -\sin\theta_{cam} \\ 0 & \sin\theta_{cam} & \cos\theta_{cam} \end{bmatrix} \quad \text{(equation 14)}$$
$$\begin{bmatrix} \cos\phi_{cam} & -\sin\phi_{cam} & 0 \\ \sin\phi_{cam} & \cos\phi_{cam} & 0 \\ 0 & 0 & 1 \end{bmatrix} \begin{bmatrix} U'_L \\ V'_L \\ f \end{bmatrix} + \begin{bmatrix} \Delta x_{cam} \\ \Delta y_{cam} \\ \Delta z_{cam} \end{bmatrix}$$

$$\begin{bmatrix} U'_L \\ V'_L \\ f \end{bmatrix} = \begin{bmatrix} (U_L - \text{U\_SIZE}) \times \text{Pixel\_SIZE} \\ (V_L - \text{V\_SIZE}) \times \text{Pixel\_SIZE} \\ f \end{bmatrix} \quad \text{(equation 15)}$$

Here, U_SIZE is a horizontal CCD (Charge Coupled Devices) pixel size, for example, in NTSC (National Television Standards Committee) camera, 640 [pixel]; V_SIZE is a vertical CCD pixel size, similarly, 480 [pixel]; ($U_L$,$V_L$) is the position of the measurement image point on the image plane, and Pixel_SIZE is the size of the pixel, for example, some tens [μm] in a square CCD element.

Then, a LOS vector passing through this measurement image point ($N_L$, $U_L$, $E_L$) and the center of the camera is represented by the following equations 16, 17, 18, and 19.

[Expression 8]

$$\frac{x - x_{cam0}}{\lambda} = \frac{y - U_{cam0}}{\mu} = \frac{z - z_{cam0}}{\upsilon} \quad \text{(equation 16)}$$

However, $$\lambda = \frac{(N_{cam} - N_{cam0})}{\sqrt{(N_L - N_{cam0})^2 + (U_L - U_{cam0})^2 + (E_L - E_{cam0})^2}} \quad \text{(equation 17)}$$

$$\mu = \frac{(U_L - U_{cam0})}{\sqrt{(N_L - N_{cam0})^2 + (U_L - U_{cam0})^2 + (E_L - E_{cam0})^2}} \quad \text{(equation 18)}$$

$$\upsilon = \frac{E_L - E_{cam0}}{\sqrt{(N_L - N_{cam0})^2 + (U_L - U_{cam0})^2 + (E_L - E_{cam0})^2}} \quad \text{(equation 19)}$$

Next, in FIG. 25, an intersecting point computing process (S505) will be explained.

<S505: Intersecting Point Calculating Process>

The road surface model corresponding point searching unit 170 calculates ENU coordinates of an intersecting point of a plane formed by the three neighboring points extracted by the three neighboring points extracting process (S503) and the LOS vector calculated by the LOS computing process (S504) as the position of the feature captured in the measurement image point specified by the user.

Namely, the road surface model corresponding point searching unit 170 calculates an intersecting point of the plane formed by the three neighboring points represented by the equation 12 and the LOS vector represented by the equations 16 through 19 as the feature position (x, y, z).

Embodiment 2

In the second embodiment, a road feature measurement screen 400, which is displayed by the image displaying unit 341 in the image displaying process (S204a) of the road feature position measuring process that has been explained in the first embodiment, will be explained.

FIG. 28 shows a system configuration of a road feature measurement system 101 and a functional configuration of a road feature measurement apparatus B 500 according to the second embodiment.

The road feature measurement apparatus B 500 corresponds to the road feature measurement apparatus 100 that has been explained in the first embodiment, from which the vehicle position and posture (3-axis) computing unit 110, the road surface shape model generating unit 150, the laser radar position and posture computing unit 160, and a part of the feature identification apparatus 300 (the motion stereo unit 310, the moving body removing unit 320, and the feature identifying unit 330) are removed to the outside.

Various data such as vehicle position and posture, camera attachment offset calculated by the vehicle position and posture (3-axis) computing unit 110, road surface shape model generated by the road surface shape model generating unit 150, image data obtained by the camera 230, and feature types, etc. specified by the feature identifying unit 330 are stored in an observation data memory unit B 598, inputted from the observation data memory unit B 598 to a road feature measurement apparatus B 500, and stored in the observation data memory unit 199. Physical storage medium such as a hard disk drive, a DVD, and a USB memory, etc. are examples of the observation data memory unit B 598. Further, the input of each data from the observation data memory unit B 598 to the road feature measurement apparatus B 500 is done by directly reading from the storage medium, or by communication via network such as the Internet, LAN (local area network), etc.

Using a function of an OS 921 (or a browser), the image displaying unit 341 displays the image captured by the camera 230 (a captured image 401, hereinafter), the feature position calculated by the road surface model corresponding point searching unit 170, etc. on the displaying device 901.

Using a function of the OS 921 (or the browser), the image point inputting unit 342 inputs information (an measurement image point, for example) specified by the user using an inputting device such as a mouse 903, a keyboard 902, etc.

The road surface model corresponding point searching unit 170 stores the feature position calculated as three-dimensional coordinate values corresponding to the measurement image point in the measurement position data memory unit 599. Further, the road surface model corresponding point searching unit 170 stores the measurement image point, a specified image number for identifying the captured image 401 in which the measurement image point is specified, and the feature type for identifying a type of the feature specified by the measurement image point with relating to the feature position in the measurement position data memory unit 599. Hereinafter, the feature position, the measurement image point, the specified image number, and the feature type which are stored with relating to each other are referred to as measurement position data.

FIG. 29 shows the road feature measurement screen 400 according to the second embodiment.

The image displaying unit 341 displays the road feature measurement screen 400 as shown in FIG. 29 on the displaying device 901 of the personal computer which functions as the road feature measurement apparatus B 500 in the image displaying process (S204a) that has been explained in the first embodiment. The road feature measurement screen 400 is a user interface (man-machine interface) to prompt the user to specify a measurement image point and provide the measured result (feature position) to the user.

Hereinafter, configurational elements of the road feature measurement screen 400 and the operation of the image displaying unit 341 will be explained with reference to FIG. 29.

The road feature measurement screen 400 includes a captured image 401.

Further, the road feature measurement screen 400 includes textboxes showing a specific image number 411, a measurement image point 412, and a feature position 414, respectively.

Further, the road feature measurement screen 400 includes a type list box 417 showing a list of feature types.

Further, the road feature measurement screen 400 includes a calculation requesting button 415 to be pressed on requesting calculation of the feature position 414 and a storage requesting button 416 to be pressed on requesting storage of the measurement position data.

The road feature measurement screen 400 is displayed on the displaying device 901 by the image displaying unit 341.

The image displaying unit 341 displays the captured image 401 selected by the user on the road feature measurement screen 400.

For example, before displaying the road feature measurement screen 400, the image displaying unit 341 displays an image selecting screen to prompt the user to select the captured image 401 on the displaying device 901. For example, the image selecting screen is display of a list of image numbers of each of the captured image 401, or display of a list of thumbnails (minified image) of each of the captured image 401. The image displaying unit 341 displays the list of image numbers or the list of thumbnails that cannot be displayed on the screen of the displaying device 901 by scrolling according the mouse operation of the user. Using the mouse 903, the user selects one desired image from a plurality of the captured images 401 displayed on the image selecting screen. Then, the image displaying unit 341 obtains the captured image 401 (image data) selected by the user from the observation data memory unit 199 and displays on the road feature measurement screen 400. Further, the image displaying unit 341 displays the image number of the captured image 401 selected by the user in the textbox of the road feature measurement screen 400 as the specific image number 411.

Further, for example, the user can specify the desired captured image 401 by entering the image number in the textbox of the specific image number 411 in the road feature measurement screen 400 using the keyboard 902. The image displaying unit 341 obtains the captured image 401 (image data) identified by the image number which is entered in the textbox of the specific image number 411 from the observation data memory unit 199 and displays on the road feature measurement screen 400.

In FIG. 29, the captured image 401 which is identified by the image number "nnnnn" is displayed. In the captured image 401 displayed, a street 405 having two lanes and sidewalks 404 provided at both sides of the street 405 are shown. A center line 406 and two white lines 407 are drawn on the street 405. Further, road signs 408 and electric poles 409 are provided vertically along the sidewalk 404 which is shown in the right side of the screen, and a km post 403 (kilo-post) is provided vertically along the sidewalk 404 which is shown in the left side of the screen.

The image displaying unit 341 displays the measurement image point 412 specified by the user on the road feature measurement screen 400.

For example, by operating the mouse 903, the user moves a mouse cursor 402 to the desired position on the captured image 401, and specifies the measurement image point 412 by clicking the mouse 903. The image displaying unit 341 displays coordinates ($U_2$, $V_2$) on the captured image 401 specified with the mouse cursor 402 when the mouse 903 is clicked as the measurement image point 412 on the road feature measurement screen 400.

Further, for example, the user can enter in the textbox of the road feature measurement screen 400 the desired coordinates on the captured image 401 as the measurement image point 412 using the keyboard 902.

The image displaying unit 341 clearly shows the feature type 413 specified in the type list box 417 by the user.

For example, the user selects one feature type corresponding to the measurement image point 412 from a plurality of feature types shown in the type list box 417, moves the mouse cursor 402 to the above of the selected feature type 413, and clicks the mouse 903 to specify the feature type 413. The image displaying unit 341 changes the background color of the feature type 413 specified.

In FIG. 29, from "left edge of left white line", "left edge of right white line", "right edge of left white line", "right edge of right white line", "regulatory sign (blue circle)", "regulatory sign (red circle)", "warning sign (yellow triangle)", "indication sign (blue square)", "crosswalk sign (blue triangle)", "information sign (green square)", etc., "km post" is specified as the feature type 413.

Further, instead of selection using the type list box 417, for example, the feature type 413 can be directly entered in a textbox prepared separately by the user using the keyboard 902.

The image displaying unit 341 displays the feature position 414 calculated by the road surface model corresponding point searching unit 170 on the road feature measurement screen 400.

For example, when the user wants to obtain the feature position 414 corresponding to the measurement image point 412 specified, the user moves the mouse 903 to place the mouse cursor 402 above the calculation requesting button 415, and presses the calculation requesting button 415 by clicking the mouse 903. When the calculation requesting button 415 is pressed, the image point inputting unit 342 inputs the specific image number 411, the measurement image point 412, and the feature type 413 from the OS 921 or the browser. Then, the image point inputting unit 342 outputs the measurement image point 412 to the camera LOS computing unit 140 and the measurement position data memory unit 599, outputs the specific image number 411 to the camera LOS computing unit 140, the road surface model corresponding point searching unit 170 and the measurement position data memory unit 599, and outputs the feature type 413 to the measurement position data memory unit 599. Then, the road surface model corresponding point searching unit 170 calculates the feature position 414 corresponding to the measurement image point 412 by the feature position locating process (S106). Further, the image displaying unit 341 displays the feature position 414 calculated by the road surface model corresponding point searching unit 170 on the road feature measurement screen 400.

Further, when the user wants to store the measurement position data including the feature position 414, the user moves the mouse 903 to place the mouse cursor 402 above the storage requesting button 416, and presses the storage requesting button 416 by clicking the mouse 903. When the storage requesting button 416 is pressed, the measurement position data memory unit 599 stores the feature position 414, the specific image number 411, the measurement image point 412, and the feature type 413 with linking each other as the measurement position data. The linking (making correspondence) means relating each other addresses of storage areas where respective data are stored.

Namely, the image displaying unit 341 displays, out of the image data in time series stored in the observation data memory unit 199, the image data specified by scrolling selection with the mouse operation of the user on the screen of a personal computer (the road feature measurement screen 400) (a PC screen, hereinafter) which functions as the road feature measurement apparatus B 500.

Further, the image point inputting unit 342 obtains the measurement image point 412 specified by the mouse operation of the user, the specific image number 411 of the image for which scroll selection is done by the mouse operation on the PC screen, and a feature ID (the feature type 413) showing a type of the feature.

Further, the road surface model corresponding point searching unit 170 calculates the feature position 414 (output data) based on the data stored in the observation data memory unit 199 such as data of the vehicle position and posture, the camera attachment offset, the road surface shape model, etc. related by the image-capturing time, the measurement image point 412, and the specific image number 411.

Then, the image displaying unit 341 displays the feature position 414 on the PC screen, and the measurement position data memory unit 599 stores the feature position 414, the measurement image point 412, the specified image number 411, and the feature type 413 with relating each other as the measurement position data.

The image displaying unit 341 also can display the measured result by sentences using the feature type 413 and the feature position 414 such as "the coordinates of "aaa" are (x, y, z)". The feature type 413 is set to "aaa", and the feature position 414 is set to "x, y, z".

The measurement apparatus such as follows has been discussed in the second embodiment.

The measurement apparatus (the road feature measurement apparatus B 500, for example) includes the image memory unit (the observation data memory unit 199), the three-dimensional point cloud model memory unit (the observation data memory unit 199), the image displaying unit, the measurement image point obtaining unit (the image point inputting unit 342), and the position calculating unit (the road surface model corresponding point searching unit 170).

The image memory unit stores images captured by the camera 230 (the captured image 401).

The three-dimensional point cloud model memory unit stores the three-dimensional point cloud model (road surface shape model) formed by a point cloud which is an image-capturing point captured by the camera measured by the laser device and also a position of each point cloud is known.

The image displaying unit displays the image stored in the image memory unit on the screen of the displaying device and prompts the user to specify the position within the image. The position within the image is two dimensional coordinates position (u, v) of a pixel on the image plane.

The measurement image point obtaining unit inputs the position within the image specified by the user as the measurement image point using the inputting device.

The position calculating unit detects, from the point cloud of the three-dimensional point cloud model stored by the three-dimensional point cloud model memory unit, a corresponding point (neighboring point) corresponding to the measurement image point obtained by the measurement image point obtaining unit, and, using the position of the corresponding point detected, decides a three-dimensional position of the measurement image point (the feature position 414) obtained by the measurement image point obtaining unit.

Further, the image displaying unit makes a list of a plurality of images stored in the image memory unit to display on the screen, prompts the user to specify the image, displays the image specified by the user on the screen of the displaying device and prompts the user to specify a position within the image.

Further, the measurement apparatus includes the result displaying unit (the image displaying unit 341) for displaying the position of the measurement image point decided by the position calculating unit on the screen of the displaying device by which the image displaying unit displays the image.

Further, the measurement apparatus includes a type inputting unit (the image point inputting unit) for making the user specify a type of the feature to be a target of position measurement and inputting the type of the feature specified by the user from the inputting device.

Further, the measurement apparatus includes a result memory unit (the measurement position data memory unit 599) for storing the measurement image point obtained by the measurement image point obtaining unit, the position of the measurement image point decided by the position calculating unit, and the type of feature inputted by the type inputting unit with relating each other in the storage equipment.

According to the above measurement apparatus (the road feature measurement apparatus B 500, for example), conventional survey work in which a worker goes to the actual place to be measured and carries out survey for each measurement point is unnecessary, and it is possible to carry out survey by only clicking on a PC screen using automatically measured data obtained during running of the vehicle. Consequently, the above measurement apparatus can obtain a large effect in various industry related to the survey. For example, it is possible to largely reduce time and cost for the survey work. Further, for example, conventionally, survey result of the measurement point is noted on paper, etc. by the worker; however, in the above measurement apparatus, since the survey result (feature position) is stored automatically in a hard disk of the PC, transcription error can be prevented, and the reliability of the survey result is improved.

Embodiment 3

In the third embodiment, a feature position locating process (S106) performed by the road surface model corresponding point searching unit 170 will be explained.

Items being different from the first embodiment will be mainly discussed in the following, and items for which explanation is omitted can be considered as the same as the first embodiment.

FIG. 30 shows a functional configuration of the road surface model corresponding point searching unit 170 according to the third embodiment.

As shown in FIG. 30, the road surface model corresponding point searching unit 170 includes a neighborhood extracting unit 171, a model projecting unit 172, a neighboring plane calculating unit 173, and a feature position calculating unit 174.

The model projecting unit 172 projects the point cloud of the road surface shape model on the image plane as explained in the first embodiment.

The neighborhood extracting unit 171 extracts one neighboring point of the measurement image point from the point cloud of the road surface shape model projected on the image plane by the model projecting unit 172.

The neighboring plane calculating unit 173 calculates a particular plane (neighboring plane) including the one neighboring point extracted by the neighborhood extracting unit 171.

The feature position calculating unit 174 calculates an intersecting point of the particular plane calculated by the neighboring plane calculating unit 173 and the LOS vector calculated by the camera LOS computing unit 140 (the vector calculating unit) as a feature position (a three-dimensional position of the measurement image point).

FIG. 31 is a flowchart showing a flow of the feature position locating process (S106) according to the third embodiment, which corresponds to FIG. 25 in the first embodiment.

As shown in FIG. 31, in the feature position locating process (S106) in the third embodiment, instead of the three neighboring points extracting process (S503) of the first embodiment, the neighborhood extracting process (S503B1) and the neighboring plane calculating process (S503B2) are performed. Other processes are the same as the first embodiment.

FIG. 32 shows a method for calculating the feature position of the feature position locating process (S106) according to the third embodiment, which corresponds to FIG. 24 in the first embodiment.

The neighborhood extracting process (S503B1) and the neighboring plane calculating process (S503B2) will be explained in the following with reference to FIG. 32.

Here, the laser measured point cloud (a black circle in FIG. 32) of the road surface shape model is projected on the image plane (an image-capturing plane of the camera 230) by a model projecting unit 172 in the 3D model projecting process (S502).

In the neighborhood extracting process (S503B1), the neighborhood extracting unit 171 discriminates a laser measured point which is close to the measurement image point on the image plane as a neighboring point P1. For example, the neighboring point P1 is the laser measured point which is the closest to the measurement image point on the image plane, the laser measured point which is the closest to the measurement image point in the horizontal axial direction of the image plane, or the laser measured point which is the closest to the measurement image point in the vertical axial direction of the image plane. Further, for example, the neighboring point P1 is either of a plurality of the laser measured points projected within the predetermined range from the measurement image point on the image plane.

In FIG. 32, the point which projects the neighboring point P1 on the image plane is shown by "P1'". Further, three-dimensional coordinates of the neighboring point P1 show $(x_0, y_0, z_0)$ in the ENU coordinate system.

Then, in the neighboring plane calculating process (S503B2), the neighboring plane calculating unit 173 calculates a horizontal plane ($U=z_0$) having the same height (in the direction of U coordinate axis) with the neighboring point P1 as a neighboring plane. The neighboring plane includes the neighboring point P1, and is a plane orthogonal to the U coordinate axis.

After the neighboring plane calculating process (S503B2), the feature position calculating unit 174 calculates an intersecting point $(x, y, z_0)$ of the neighboring plane calculated by the neighboring plane calculating process (S503B2) and the LOS vector directing to the measurement image point from the center of the camera calculated by the LOS computing process (S504) as the feature position 414 (the intersecting computing process [S505]).

The neighboring plane calculated by the neighboring plane calculating unit 173 shows road surface (the sidewalk 404 or the street 405) where the feature specified as the measurement image point 412 is located. This is because it can be considered that the road surface is almost flat between the neighboring point P1 and the feature corresponding to the measurement image point, since the road surface is not largely slanted. Therefore, the intersecting point of the flat neighboring plane including the neighboring point P1 and the LOS vector of the measurement image point can be considered as the position on the road of the feature corresponding to the measurement image point 412.

When the feature for the measurement target is located not on the road but on an approximately vertical wall, etc., the neighboring plane can be calculated as a vertical plane which is orthogonal to the N coordinate axis or the E coordinate axis.

Further, when the feature for the measurement target is located not on the road but on a slope of a mountain, etc., the neighboring plane can be calculated as a plane which has the same gradient with the slope of the mountain.

It is possible to decide whether the neighboring plane is represented by a horizontal plane, a vertical plane or a slope by deciding the plane formed by the feature and determining the type of the plane with the feature identifying unit 330 based on the feature type of the feature represented by a point cloud including the neighboring point P1 among the feature types determined by the feature identifying unit 330.

Further, in the three neighboring points extracting process (S503) of the first embodiment, it is also possible to set a value $(x_0+n, y_0, z_0)$ obtained by adding a predetermined value n to the value of the E coordinate axis of the neighboring point P1 as a coordinate value of the neighboring point P2, and set a value $(x_0, y_0+n, z_0)$ obtained by adding a predetermined value n to the value of the N coordinate axis of the neighboring point P1 as a coordinate value of a neighboring point P3. After the three neighboring points extracting process (S503), in the intersecting point computing process (S505), the feature position calculating unit 174 calculates an intersecting point of a plane including the neighboring points P1, P2, and P3 and the LOS vector of the measurement image point as the feature position 414. The plane including the neighboring points P1, P2, and P3 corresponds to the neighboring plane.

In the third embodiment, the following measurement apparatus has been explained.

The measurement apparatus (the road feature measurement apparatus 100, for example) includes a measurement image point obtaining unit (the image point inputting unit 342), a vector calculating unit (the camera LOS computing unit 140), the neighborhood extracting unit 171, the neighboring plane calculating unit 173, and the feature position calculating unit 174.

The measurement image point obtaining unit displays the image captured by the camera on the displaying device and inputs a position within the image specified by the user as a target of position measurement from the inputting device.

The vector calculating unit calculates a vector (a LOS vector) showing a direction from the center of the camera to the measurement image point inputted by the measurement image point obtaining unit.

The neighborhood extracting unit 171 extracts one neighboring point (at least one or only one) of the measurement image point from the point cloud of the three-dimensional point cloud model.

The neighboring plane calculating unit 173 calculates a particular plane (neighboring plane) including the one neighboring point extracted by the neighborhood extracting unit 171.

The feature position calculating unit 174 calculates an intersecting point of the particular plane calculated by the neighboring plane calculating unit 173 and the vector calculated by the vector calculating unit as a three-dimensional position (the feature position) of the measurement image point.

The measurement apparatus further includes the model projecting unit 172 projecting the point cloud of the three-dimensional point cloud model on the image-capturing plane of the camera corresponding to the image.

Then, the neighborhood extracting unit 171 extracts, among the point clouds of the three-dimensional point cloud model projected on the image-capturing plane by the model projecting unit 172, one of the closest point from the measurement image point within the image-capturing plane, the closest point from the measurement image point in the horizontal axial direction of the image-capturing plane, and the closest point from the measurement image point in the vertical axial of the image-capturing plane as the one neighboring point.

The neighboring plane calculating unit 173 calculates a horizontal plane including the one neighboring point of the measurement image point as the particular plane.

The neighboring plane calculating unit 173 calculates a plane including the one neighboring point of the measurement image point and also orthogonal to one of an X axis (E axis), a Y axis (N axis), and a Z axis (U axis) in the X-Y-Z coordinate system (ENU coordinate system, for example) showing a coordinate system used for the three-dimensional point cloud model as the particular plane.

The measurement apparatus further includes a type inputting unit (the image point inputting unit 342) prompting the user to specify a type of the feature for the target of position measurement and inputting the type of the feature specified by the user from the inputting device.

The neighboring plane calculating unit 173 calculates the particular plane by representing a plane formed by the feature represented by the point cloud included in the one neighboring point of the measurement image point based on the type of the feature inputted by the type inputting unit.

In the road feature measurement apparatus B 500 explained in the second embodiment, the road surface model corresponding point searching unit 170 can perform the neighborhood extracting process (S503B1) and the neighboring plane calculating process (S503B2) instead of the three neighboring points extracting process (S503).

The road feature measurement system 101 and the road feature measurement apparatus 100 (or the road feature measurement apparatus B 500) can combine respective items that have been explained in the first through third embodiment and allow them to selectively operate.

In the first through third embodiments, the following road feature measurement system 101 has been explained:

The road feature measurement system 101 measures the position of feature around the road using the orientation/distance data (the three-dimensional point cloud data, the road surface shape model) and the image data (the captured image 401) around the road obtained by the three-dimensional feature position measuring carriage (the MMS, the measuring carriage 102).

The road feature measurement system 101 measures the three-dimensional position of the feature around the road for the image data (the captured image 401) shown within the terminal screen (the road feature measurement screen 400) by relating the two-dimensional displaying point (the measurement image point 412) obtained by clicking the position of feature to the three-dimensional point cloud data within the terminal screen.

For example, in the measuring carriage 102, the camera 230 captures an image of the road and obtains image data of the road, and the laser radar 240 obtains the orientation/distance data for the feature around the road. Further, the road surface shape model generating unit 150 generates the three-dimensional model of the stationary body captured in the image, compares the three-dimensional model of the stationary body captured in the image with the road surface shape model based on the orientation/distance data, and generates the road surface shape model showing only the stationary body. Then, the road surface model corresponding point searching unit 170 relates the position of the feature specified using a mouse, etc. on the road image captured by the camera to the point cloud data of the road surface shape model, and measures the three-dimensional position of the specified point based on a line of sight vector of the camera 230.

Embodiment 4

A CAD apparatus 600 (CAD: Computer Aided Design), in which the road feature measurement apparatus B 500 explained in the second embodiment is installed, will be explained.

For example, the CAD apparatus 600 drafts roads and generates road data (plotting data) representing the drafted road. Maps used in the road management ledger and the car navigation system are examples of the road data (plotting data).

Items being different from the second embodiment will be mainly discussed in the following, and items for which explanation is omitted can be considered as the same as the second embodiment.

FIG. 33 shows a system configuration of the road feature measurement system 101 and a functional configuration of the CAD apparatus 600 according to the fourth embodiment.

In FIG. 33, in addition to the configuration of the road feature measurement apparatus B 500 explained in the second embodiment, the CAD apparatus 600 includes a drafting unit 610 and a CAD memory unit 699. For example, the CAD apparatus 600 is a CAD for generating attached maps of the road management ledger.

The drafting unit 610 (a drawing unit) carries out a function of the CAD. For example, the drafting unit 610 inputs a plotting command showing contents of image to be generated from the inputting device and draws an image including plural elements on the screen of the displaying device 901 using the CPU based on the plotting command inputted (a drawing process).

Further, the drafting unit 610 (a plotting unit) prompts the user to specify any of plural elements included in the drawn image, obtains the feature position corresponding to the specified element from the road surface model corresponding point searching unit 170 (the position calculating unit), and generates plotting data (road data, for example) representing the drawn image and showing the feature position as a three-dimensional position of element specified by the user using the CPU (a plotting process).

The CAD memory unit 699 stores the plotting data generated by the drafting unit 610 using the storage equipment.

FIG. 34 shows a CAD screen 620 according to the fourth embodiment.

The drafting unit 610 and the image displaying unit 341 display the CAD screen 620 as shown in FIG. 34 on the displaying device 901 of the CAD apparatus 600. For example, the CAD screen 620 is a screen of the CAD for generating the attached maps of the road management ledger.

In the following, the configurational elements of the CAD screen 620 will be explained with reference to FIG. 34.

The CAD screen 620 includes a figure toolbar 621, a road map 622, a measurement screen displaying button 623, a storage requesting button 624, and a road feature measurement screen 400.

The figure toolbar 621 shows types of plural figures such as a straight line, a curve, a circle, a polygon, an arrow, etc. and is a figure-drawing toolbar for prompting the user to specify a type of a figure to be drawn.

The road map 622 is an image drawn based on the specification of the user.

The measurement screen displaying button 623 is a button to be pressed at the time of display request of the road feature measurement screen 400 (refer to the second embodiment).

The storage requesting button 624 is a button to be pressed at the time of storage request of the road map 622.

The road feature measurement screen 400 is displayed by arranging side by side with the road map 622 or superimposing with the road map 622 when the measurement screen displaying button 623 is pressed. Here, it is also possible that the road feature measurement screen 400 has been already displayed.

The CAD screen 620 is displayed on the displaying device 901 by the drafting unit 610 and the image displaying unit 341.

Next, the operation of the drafting unit 610 and the image displaying unit 341 displaying the CAD screen 620 will be explained.

For example, the user operates the mouse 903 to move the mouse cursor 402 to a part showing a type of the desired figure on the figure toolbar 621 and specifies the type of figure to be drawn by clicking the mouse 903. The drafting unit 610 draws a figure of the specified type on the CAD screen 620. Further, the user operates the mouse 903 to manipulate the mouse cursor 402, and specify figuring operation such as move, zooming up/down, transformation, etc. of the figure displayed on the CAD screen 620. The drafting unit 610 redraws the figure displayed on the CAD screen 620 according to the specified figuring operation. By repeating these specifications, the user generates the road map 622 formed by combining plural figures. The road map 622 includes plural figures (elements) representing features (the km post 625, the road sign 626, etc.) spotted around the road. The specification of the type of figures or the specification of the figuring operation by the user is an example of the plotting command showing contents of the image to be generated.

Further, when the user wants to set the three-dimensional coordinates of a position where an actual item is located to the feature shown on the road map 622, the user operates the mouse 903 to move the mouse cursor 402 to above the measurement screen displaying button 623, and presses the measurement screen displaying button 623 by clicking the mouse 903. When the measurement screen displaying button 623 is pressed, the image displaying unit 341 displays the road feature measurement screen 400.

In the following, a case in which the user wants to set the three-dimensional coordinates at the km post 625 of the road map 622 will be explained.

Next, the user specifies the captured image 401 corresponding to the road map 622, and the image displaying unit 341 displays the captured image 401 specified on the road feature measurement screen 400. Next, the user discriminates visually the km post 403 from plural features captured in the captured image 401 and specifies the displayed part of the km post 403 by the mouse 903. Further, the user specifies "km post" from the type list box 417 as the feature type 413 using the mouse 903. Then, the user presses the calculation requesting button 415 using the mouse 903, and the road surface model corresponding point searching unit 170 calculates the three-dimensional coordinates (the feature position) of the specified km post 403.

Then, the user operates the mouse 903 to move the mouse cursor 402 to above the km post 625 of the road map 622 and specifies the km post 625 as the feature corresponding to the three-dimensional coordinates calculated by the road surface model corresponding point searching unit 170 by clicking the mouse 903. The drafting unit 610 sets the three-dimensional coordinates calculated by the road surface model corresponding point searching unit 170 and the feature type 413 specified by the user on the road map 622 by relating to the specified figure (the km post 625). The three-dimensional coordinates and the feature type 413 can be or do not have to be displayed on the CAD screen 620.

Further, when the user wants to store the road data representing the road map 622, the user operates the mouse 903 to move the mouse cursor 402 to above the storage requesting button 624 and presses the storage requesting button 624 by clicking the mouse 903. When the storage request button is pressed, the drafting unit 610 generates the road data representing the road map 622 and stores the generated road data in the CAD memory unit 699. In the road data, the three-dimensional coordinates calculated by the road surface model corresponding point searching unit 170 is set as the three-dimensional coordinates of the km post 625. Further, in the road data, the feature type 413 specified by the user is set as the type of the km post 625.

Namely, the drafting unit 610 generates the road data by setting the feature position obtained by the function of the road feature measurement apparatus B 500 which has been explained in the second embodiment and the feature type 413 in the road map 622 generated by the function of the CAD.

According to the fourth embodiment, while the road map 622 is drafted, the three-dimensional coordinates to be set in the road map 622 can be calculated, it is possible to easily generate the road data such as the road management ledger and maps of the car navigation, etc.

Embodiment 5

In the fifth embodiment, another embodiment will be explained, in which the feature position is decided without calculating the neighboring plane.

Items being different from the first through fourth embodiments will be mainly discussed in the following, and items for which explanation is omitted can be considered as the same as the first through fourth embodiments.

FIG. 35 shows a functional configuration of a road feature measurement apparatus C 700 according to the fifth embodiment.

The functional configuration of the road feature measurement apparatus C 700 according to the fifth embodiment will be explained with reference to FIG. 35.

The road feature measurement apparatus C (an example of a measurement apparatus) corresponds to the road feature measurement apparatus 100, the road feature measurement apparatus B 500, and the CAD apparatus 600 which have been explained in the respective embodiments.

The road feature measurement apparatus C includes an image displaying unit 341, an image point inputting unit 342, the road surface model corresponding point searching unit 170, an image memory unit 708, a three-dimensional point cloud model memory unit 709, a measurement position data memory unit 599, and the displaying device 901, and measures three-dimensional coordinates of the feature specified by the user from the features captured in the image as the feature position.

The road surface model corresponding point searching unit 170 includes the neighborhood extracting unit 171, the model projecting unit 172, and a feature position calculating unit 174.

The neighborhood extracting unit 171 and the model projecting unit 172 include functions which have been explained in the respective embodiments.

Further, the feature position calculating unit 174 includes a function to carry out the process calculating the feature position (position calculating process) which has been explained as the process of the road surface model corresponding point searching unit 170 in the respective embodiments.

The image displaying unit 341, the image point inputting unit 342, and the measurement position data memory unit 599 include functions explained in the second and fourth embodiments.

Further, the image memory unit 708 and the three-dimensional point cloud model memory unit 709 correspond to the observation data memory unit 199 in the respective embodiments.

The image memory unit 708 stores images captured by the camera 230.

The three-dimensional point cloud model memory unit 709 stores the road surface shape model (the three-dimensional point cloud model).

Between the image and the road surface shape model, data showing the same place are stored by relating each other. Namely, the image and the point cloud of the road surface shape models show the same place.

The image displaying unit 341 displays the point cloud, of which three-dimensional positions are known, superimposed with the image, in which the feature is captured, on screen of the displaying device 901 and prompts the user to specify the position of the feature for the measurement target within the image.

For example, the image displaying unit 341 superimposes and displays the image stored in the image memory unit 708 and the road surface shape model (the three-dimensional point cloud model) stored in the three-dimensional point cloud model memory unit 709 and prompts the user to specify a point corresponding to the position within the image which the user observes from the point cloud of the road surface shape model.

The image point inputting unit 342 (a measurement image point obtaining unit) inputs the position within the image specified by the user (the position of two-dimensional coordinates (u, v) of the image on the image plane) as the measurement image point from the inputting device.

The neighborhood extracting unit 171 (a corresponding point detecting unit) detects a corresponding point corresponding to the measurement image point inputted by the image point inputting unit 342 from the point cloud.

For example, the neighborhood extracting unit 171 detects the corresponding point corresponding to the measurement image point inputted by the image point inputting unit 342 from the point cloud of the road surface shape model stored in the three-dimensional point cloud model memory unit 709.

The corresponding point is, for example, a point of the road surface shape model projected on the same coordinates, the closest coordinates, or the neighboring coordinates in the two-dimensional coordinate of pixels on the image plane. Hereinafter, the corresponding point is referred to as a neighboring point.

The feature position calculating unit 174 (a position calculating unit) decides a three-dimensional position of the measurement image point obtained by the image point inputting unit 342 using the three-dimensional position of the corresponding point detected by the neighborhood extracting unit 171.

The measurement position data memory unit 599 (a result memory unit) assumes the three-dimensional position decided by the feature position calculating unit 174 as the three-dimensional position of the feature for the measurement target and stores the three-dimensional position with relating to the type of the feature for the measurement target.

The image memory unit 708 stores the image captured by the camera 230.

The three-dimensional point cloud model memory unit 709 stores the point cloud which is composed of the point cloud measured by the laser device and as well the three-dimensional positions of which are known as the group of the three-dimensional points model.

The model projecting unit 172 projects the road surface shape model stored in the three-dimensional point cloud model memory unit 709 on the image plane of the image displayed by the image displaying unit 341. The point cloud of the road surface shape model projected (a projected point cloud, hereinafter) on the image plane by the model projecting unit 172 is superimposed with the image and displayed on the displaying device 901 by the image displaying unit 341.

FIG. 36 is a flowchart showing a measuring method according to the fifth embodiment.

A measurement method according to the fifth embodiment will be explained in the following with reference to FIG. 36.

<S1111: Image Displaying Process A>

First, the image displaying unit 341 displays the image specified by the user on the displaying device 901.

For example, as has been explained in the second embodiment, the image displaying unit 341 displays a list of the image numbers or a list of thumbnails of the images on the displaying device 901 as a list of images stored in the image memory unit 708. Then, the image displaying unit 341 obtains the image, which is specified by the user from the displayed list of images, from the image memory unit 708, and displays the road feature measurement screen 400 (refer to the second embodiment) on the displaying device 901 with the obtained image as the captured image 401.

<S1112: Point Cloud Projecting Process>

Next, the model projecting unit 172 projects the road surface shape model on the image plane.

At this time, the model projecting unit 172 obtains the road surface shape model corresponding to the image-capturing time and the image-capturing position of the image (the captured image 401, hereinafter) displayed by the image displaying process A (S1111) from the three-dimensional point cloud model memory unit 709, and projects the obtained road surface shape model on the image plane of the captured image 401. The projection of the road surface shape model on the image plane is carried out by "the 3D model projecting process (S502)" that has been explained in the first embodiment.

Hereinafter, the point cloud of the road surface shape models projected on the image plane is referred to as "a projected point cloud".

<S1113: Image Displaying Process B>

Next, the image displaying unit 341 displays the projected point cloud superimposed with the image on the displaying device 901.

FIG. 37 shows the road feature measurement screen 400 according to the fifth embodiment.

In the image displaying process B (S1113), the image displaying unit 341 displays the projected point cloud superimposed with the captured image 401 as shown in FIG. 37. The road feature measurement screen 400 and the captured image 401 are displayed on the displaying device 901 by the image displaying unit 341 in the image displaying process A (S1111). Plural black points within the captured image 401 show the projected point cloud projected on the image plane of the captured image 401 in the point cloud projecting process (S1112). Point "a" 421a, point "b" 421b, point "c" 421c, point "d" 421d, etc. are projected points 421 which form the projected point cloud.

The point "a" 421a is located at an intermediate stage of the km post 403, the point "b" 421b is located on the sidewalk 404 of the left back of the km post 403, the point "c" 421c is located on the sidewalk 404 of the right back of the km post 403, and the point "d" 421d is located at an upper stage of the km post 403.

Since the point "a" 421a and the point "d" 421d show the laser measured point obtained by reflecting with the km post 403, a latitude and a longitude of the km post 403 are correctly shown. When a height of the km post 403 is obtained at the lower end (a contacted point with the sidewalk 404), since the point "a" 421a is located below, the result shows a more precise height than the point "d" 421d.

Since the point "b" 421b and the point "c" 421c show the laser measured points obtained by reflecting with the sidewalk 404, the point "b" 421b and the point "c" 421c do not show the three-dimensional coordinates of the km post 403. Between the point "b" 421b and the point "c" 421c, since the point "c" 421c is closer to the km post 403 than the point "b" 421b, the point "c" 421c shows a closer value of the three-dimensional coordinates of the km post 403 than the point "b" 421b.

<S1120: Measurement Image Point Obtaining Process, Type Inputting Process>

Next, the image point inputting unit 342 inputs the measurement image point 412, the feature type 413, and the specific image number 411 from the inputting equipment such as the mouse 903, the FDD 904, etc. via the OS 921. The measurement image point 412, the feature type 413, and the specific image number 411 inputted by the image point inputting unit 342 are stored in the measurement position data memory unit 599 with the feature position 414 in a result storing process (S1150) which will be discussed later.

For example, the image point inputting unit 342 inputs two-dimensional coordinates (uv coordinate) within the image shown by the mouse cursor 402 when the user clicks the mouse 903 as the measurement image point 412, and displays the measurement image point 412 inputted on the road feature measurement screen 400.

Further, for example, the image point inputting unit 342 inputs a type specified by the user within the type list box 417 with clicking the mouse 903 as the feature type 413 as explained in the second embodiment, and changes the background color of the specified part of the feature type 413.

Further, the specific image number 411 is an identification number of the captured image 401 displayed on the road feature measurement screen 400.

In FIG. 37, when the user wants to measure the three-dimensional coordinates at which the km post 403 captured in the captured image 401 is actually located, the user specifies the point "a" 421a superimposed with the km post 403 by the mouse cursor 402. However, since the point "a" 421a is small, the user cannot always specify the point "a" 421a, so that the measurement image point 412 shows different uv coordinates from the point "a" 421a.

For example, each projected point 421 is shown by one dot (pixel, picture element).

Further, the image displaying unit 341 displays the pixel of the measurement image point 412 specified by the user in the measurement image point obtaining process (S1120) separately from other pixels. For example, the image displaying unit 341 blinks or changes the color of the pixel showing the measurement image point 412 (and pixels around the measurement image point 412).

By this operation, the user can repeat the operation of the mouse 903 until the projected point 421 (the point "a" 421a, for example) superimposed with the feature for the measurement target is finally specified as the measurement image point 412.

<S1130: Corresponding Point Detecting Process>

Next, the neighborhood extracting unit 171 extracts a neighboring point (corresponding point) of the measurement image point 412 from the projected point cloud.

At this time, the neighborhood extracting unit 171 discriminates the projected point 421 having the closest uv coordinate to the measurement image point 412 (an example of the corresponding point) as the neighboring point from the projected point cloud.

For example, as shown in FIG. 37, when the user specifies a pixel which is slightly dislocated from the point "a" 421a using the mouse cursor 402 as the measurement image point 412 in the measurement image point obtaining process (S1120), the neighboring point is the point "a" 421a. Further, in the measurement image point obtaining process (S1120), when the pixel itself on which the point "a" 421a is projected is specified as the measurement image point 412, the point "a" 421a is assumed as the neighboring point.

Further, the image displaying unit 341 displays the projected point 421 extracted by the neighborhood extracting unit 171 in the corresponding point detecting process (S1130) separately from other projected points 421. For example, the image displaying unit 341 blinks, changes the color of, or enlarges the projected point 421 decided (the point "a" 421a in FIG. 37).

<S1140: Position Calculating Process>

Next, the feature position calculating unit 174 obtains a three-dimensional position of the neighboring point as the feature position 414.

When the user wants to measure a three-dimensional position of the measurement image point 412, the user operates the mouse 903 to press the calculation requesting button 415 of the road feature measurement screen 400 (refer to FIG. 37).

When the calculation requesting button 415 is pressed, the feature position calculating unit 174 extracts the laser measured point corresponding to the neighboring point extracted in the corresponding point detecting process (S1130) from the point cloud of the road surface shape model stored in the three-dimensional point cloud model memory unit 709 and obtains the three-dimensional coordinates shown by the extracted laser measured point as the feature position 414.

Further, the image displaying unit 341 displays the feature position 414 obtained in the position calculating process (S1140) on the road feature measurement screen 400 as shown in FIG. 37.

<S1150: Result Storing Process>

Then, the measurement position data memory unit 599 stores the feature position 414, the measurement image point 412, the specific image number 411, and the feature type 413.

When the user wants to store the feature position 414, the user operates the mouse 903 to press the storage requesting button 416 of the road feature measurement screen 400 (refer to FIG. 37).

When the storage requesting button 416 is pressed, the measurement position data memory unit 599 stores the specific image number 411, the measurement image point 412, and the feature type 413 inputted in the measurement image point obtaining process/type inputting process (S1120) with relating to the feature position 414 obtained in the position calculating process (S1140) as the measurement position data.

As discussed above, the road feature measurement apparatus C 700 can measure the three-dimensional coordinates at which the feature for the measurement target is actually located by displaying the projected point cloud superimposed with the captured image 401 and prompting the user to specify the laser measured point representing the feature for the measurement target. Using the road feature measurement apparatus C 700, the user can measure the three-dimensional coordinates of the feature by operating the mouse 903 on the screen of the PC without survey in the actual place.

The road feature measurement apparatus C 700 can be used as the CAD apparatus 600 by including the CAD function (the drafting unit 610) as well as the fourth embodiment.

Embodiment 6

In the sixth embodiment, another embodiment to detect the feature from the image and measure a three-dimensional position of the detected feature will be explained.

Items being different from the fifth embodiment will be mainly discussed in the following, and items for which explanation is omitted can be considered as the same as the fifth embodiment.

FIG. 38 shows a functional configuration of the road feature measurement apparatus C 700 according to the sixth embodiment.

The functional configuration of the road feature measurement apparatus C 700 according to the sixth embodiment will be explained in the following with reference to FIG. 38.

The road feature measurement apparatus C 700 of the sixth embodiment additionally includes a feature region detecting unit 701 to the road feature measurement apparatus C 700 which has been explained in the fifth embodiment.

The feature region detecting unit 701 detects an image region where the feature for the measurement target is captured as a feature image region by analyzing the image stored in the image memory unit 708.

The image displaying unit 341 prompts the user to specify the position of the image in the feature image region detected by the feature region detecting unit 701.

When a point of the point cloud shown in the feature image region detected by the feature region detecting unit 701 is located at the position within the image shown by the measurement image point, the neighborhood extracting unit 171 (the corresponding point detecting unit) detects that point as the corresponding point corresponding to the measurement image point.

Further, when the point of the point cloud shown in the feature image region detected by the feature region detecting unit 701 is not located at the position within the image shown by the measurement image point, the neighborhood extracting unit 171 detects a closest point to the measurement image point as the corresponding point corresponding to the measurement image point.

FIG. 39 is a flowchart showing a measuring method according to the sixth embodiment.

The measuring method according to the sixth embodiment will be explained with reference to FIG. 39.

The measuring method according to the sixth embodiment additionally includes a feature region detecting process (S1213) to the measuring method which has been explained in the fifth embodiment.

From the image displaying process A (S1211) through the result storing process (S1250) (except for the feature region detecting process [S1213]) in the sixth embodiment are the same as the image displaying process A (S1111) through the result storing process (S1150) in the fifth embodiment.

A feature region detecting process (S1213) and an image displaying process B (S1214) will be explained in the following.

<S1213: Feature Region Detecting Process>

The feature region detecting unit 701 carries out image processing of the image specified by the user in the image displaying process A (S1211), and detects a part in which a feature to be a candidate of the measurement target from the image specified by the user as a feature image region.

For example, a feature pattern in which a specific feature is represented by a shape and color is previously stored in a memory unit (an image memory unit 708, for example), and the feature region detecting unit 701 carries out pattern matching of the image and the feature pattern and discriminates a region matched with the feature pattern within the image as the feature image region. For example, the feature pattern includes a blue circle or a red circle representing a regulatory sign, a yellow triangle representing a warning sign, a blue quadrangle representing an indication sign, a blue triangle representing a crosswalk sign, a green quadrangle representing an information sign, a white straight line representing a white line, etc.

The regulatory sign, the warning sign, the direction sign, the crosswalk sign, and the information sign are respectively kinds of the road signs. The white line is a kind of the road indication.

FIG. 40 shows the road feature measurement screen 400 according to the sixth embodiment.

For example, the feature region detecting unit 701 detects a region in which the km post 403 is captured within the captured image 401 in FIG. 40 as the feature image region.

<S1214: Image Displaying Process B>

The image displaying unit 341, similarly to the fifth embodiment, displays the projected point cloud superimposed with the image and as well shows the feature image region detected by the feature region detecting process (S1213) within the image.

For example, the image displaying unit 341 displays a mark (an arrow or a frame border, for example) for indicating the feature image region.

For example, the image displaying unit 341 displays the mark (illustration omitted) for indicating the region in which the km post 403 is captured within the captured image 401 in FIG. 40.

By this operation, the road feature measurement apparatus C 700 aids the user to find the feature to be the measurement target within the image or reduces the measurement leakage of the feature caused by oversight of the measurement target by the user within the image.

The feature image region detected in the feature region detecting process (S1213) can be also used in the corresponding point detecting process (S1230).

In the following, the using method of the feature image region in the corresponding point detecting process (S1230) will be explained.

It is assumed that in FIG. 40, in order to measure three-dimensional coordinates of the km post 403, the user does not specify (neighborhood of) the point "a" 421a or the point "d" 421d superimposed on the km post 403 as the measurement image point 412, but specifies a point "A" 412A of the upper end of the km post 403 as the measurement image point 412.

At this time, in the corresponding point detecting process (S1230), the point "e" 421e which is the closest projected point 421 to the point "A" 412A is extracted. The point "e" 421e is not the projected point 421 superimposed on the km post 403.

Namely, the laser measured point corresponding to the point "e" 421e is not a point obtained by reflection from the km post 403, but a point obtained by reflection from one point on the sidewalk 404 which is far away behind the km post 403. Therefore, the laser measured point corresponding to the point "e" 421e shows the three-dimensional coordinates of one point on the sidewalk 404 which is far away from the km post 403 instead of the three-dimensional coordinates of the km post 403.

Further, in FIG. 40, when the user specifies the point "B" 412B which is the lower end of the km post 403 as the measurement image point 412, the point "c" 421c, which is not overlapped with the km post 403 and shown, is extracted in the corresponding point detecting process (S1230).

However, since the laser measured point corresponding to the point "c" 421c is a point obtained by reflecting with the sidewalk 404 adjacent to the point where the km post 403 is provided, the point "c" shows a close value to the three-dimensional coordinates of the km post 403. The laser measured point is obtained with high density (with some cm intervals, for example) by the laser radar 240, so that if the laser measured point corresponding to the point "c" 421c is assumed to be the three-dimensional coordinates of the km post 403, an error should be small.

Then, in the measurement image point obtaining process (S1220), when the measurement image point 412 is specified within the feature image region (or within a predetermined range of the feature image region), in the corresponding point detecting process (S1230), the neighborhood extracting unit 171 extracts the closest projected point 421 (an example of the corresponding point) to the measurement image point 412 among the projected points 421 projected within the feature image region.

Namely, if the projected point exists within the feature image region, the neighborhood extracting unit 171 extracts the projected point projected within the feature image region as the corresponding point (the neighboring point) corresponding to the measurement image point.

For example, in FIG. 40, it is assumed that the region in which the km post 403 is captured is detected as the feature image region. At this time, the point "e" 421e which is the closest among all of the projected points 421 is not extracted, since it is not displayed within the km post 403 (the feature image region). Then, the neighborhood extracting unit 171 extracts the point "d" 421d which is the closest to the point "A" 412A among the projected points 421 (the point "a" 421a, the point "d" 421d) superimposed with the km post 403.

However, in the measurement image point obtaining process (S1220), when although the measurement image point 412 is specified within the feature image region, the projected point 421 projected does not exist within the feature image region, in the corresponding point detecting process (S1230), the neighborhood extracting unit 171 extracts the projected point 421 (an example of the corresponding point) which is the closest to the measurement image point 412 among the projected points 421 projected outside of the feature image region.

Namely, the neighborhood extracting unit 171, when there is no projected point projected within the feature image region, detects the projected point which is the closest to the measurement image point as the corresponding point (the neighboring point) corresponding to the measurement image point.

For example, in FIG. 40, when an edge 424 of the white line 407 (a border line of the white line 407) is the feature image region, and if there is no projected point 421 on the edge 424, the neighborhood extracting unit 171 extracts the point "f" 421f which is the closest projected point to the point "x" 423 showing the measurement image point.

Further, in the measurement image point obtaining process (S1220), when the measurement image point 412 is specified within the predetermined range 422 of the lower end part of the feature image region (within or outside of the feature image region), the neighborhood extracting unit 171 can extract the projected point 421 which is the closest to the measurement image point 412 (an example of the corresponding point) among all of the projected points 421.

For example, in FIG. 40, when the point "B" 412B located within the predetermined range 422 of the lower end part of the km post 403 which is detected as the feature image region is specified, the neighborhood extracting unit 171 extracts the point "c" 421c which is the closest among all of the projected points 421. Although the point "c" 421c is not overlapped with the km post 403 and is shown, the point "c" 421c is extracted as the closest projected point 421.

By employing the feature image region in the corresponding point detecting process (S1230), the road feature measurement apparatus C 700 can measure the three-dimensional coordinates of the feature with high precision by extracting the most appropriate projected point 421 even if the measurement image point 412 is erroneously specified by the user.

Embodiment 7

In the seventh embodiment, another embodiment will be explained, in which a neighboring point of the measurement image point is obtained as the first candidate of the feature position, and as well an intersecting point of a neighboring plane and a LOS vector for the measurement image point is calculated as the second candidate of the feature position, and either of the first candidate and the second candidate is decided as the feature position.

Items being different from the sixth embodiment will be mainly discussed in the following, and items for which explanation is omitted can be considered as the same as the sixth embodiment.

FIG. 41 shows a functional configuration of the road feature measurement apparatus C 700 according to the seventh embodiment.

The functional configuration of the road feature measurement apparatus C 700 according to the seventh embodiment will be explained in the following with reference to FIG. 41.

The road feature measurement apparatus C 700 according to the seventh embodiment additionally includes a camera LOS computing unit 140 and a neighboring plane calculating unit 173 to the road feature measurement apparatus C 700 which has been explained in the sixth embodiment.

A camera LOS computing unit 1401 (a vector calculating unit) calculates a LOS vector showing a direction from the center of camera of the camera 230 to the measurement image point.

The neighboring plane calculating unit 173 (a plane calculating unit) calculates a particular plane including a neighboring point (the corresponding point) detected by the neighborhood extracting unit 171 (the corresponding point detecting unit).

The feature position calculating unit 174 (a position calculating unit) obtains a three-dimensional position of the neighboring point detected by the neighborhood extracting unit 171 (the corresponding point detecting unit) as the first candidate showing a three-dimensional position of the measurement image point. Further, the feature position calculating unit 174 calculates an intersecting point of the particular plane calculated by the neighboring plane calculating unit 173 and the LOS vector calculated by the camera LOS computing unit 140 as the second candidate of the three-dimensional position of the measurement image point.

The image displaying unit 341 (the position displaying unit) displays the first candidate and the second candidate obtained by the feature position calculating unit 174 on the screen of the displaying device 901, and prompts the user to specify either of the first candidate and the second candidate.

The measurement position data memory unit 599 (the result memory unit) stores the one specified by the user between the first candidate and the second candidate as the three-dimensional position of the measurement image point (the feature position).

FIG. 42 is a flowchart showing a measuring method according to the seventh embodiment.

The measuring method according to the seventh embodiment will be explained in the following with reference to FIG. 42.

The measuring method according to the seventh embodiment additionally includes a plane calculating process (S1351), a vector calculating process (S1352), a position calculating process B (S1353), and a position displaying process (S1360) to the measuring method which has been explained in the sixth embodiment.

The image displaying process A (S1311) through the corresponding point detecting process (S1330), the position calculating process A (S1340) and the result storing process (S1370) in the seventh embodiment are the same as the image displaying process A (S1211) through the corresponding point detecting process (S1230), the position calculating process (S1240), and the result storing process (S1250) in the sixth embodiment.

Hereinafter, the plane calculating process (S1351), the vector calculating process (S1352), the position calculating process B (S1353), and the position displaying process (S1360) will be explained.

<S1351: Plane Calculating Process>

The neighboring plane calculating unit 173 calculates a particular plane including the neighboring point extracted in the corresponding point detecting process (S1330) as a neighboring plane.

For example, the neighboring plane calculating unit 173 calculates a horizontal plane including the neighboring point as the neighboring plane.

The plane calculating process (S1351) is the same as the neighboring plane calculating process (S503B) which has been explained in the third embodiment.

<S1352: Vector Calculating Process>

The camera LOS computing unit 140 calculates the LOS vector of the camera 230 for the measurement image point inputted in the measurement image point obtaining process (S1320) based on a posture angle of the camera 230 when the image displayed in the image displaying process A (S1311) is captured. The measurement image point inputted in the measurement image point obtaining process (S1320) and the specified image number to identify the image displayed in the image displaying process A (S1311) are outputted from the image point inputting unit 342 to the camera LOS computing unit 140. The camera LOS computing unit 140 decides the time when the image is captured based on the specified image number outputted from the image point inputting unit 342 and obtains the posture angle of the camera 230 at the decided time.

The plane calculating process (S1352) is the same as the LOS calculating process (S504) which has been explained in the first embodiment.

<S1353: Position Calculating Process B>

Next, the feature position calculating unit 174 calculates an intersecting point of the neighboring plane calculated in the plane calculating process (S1351) and the LOS vector calculated in the vector calculating process (S1352) as the second candidate of the feature position.

A calculating method of the second candidate of the feature position by the position calculating process B (S1353) is the same as the calculating method of the feature position by the intersecting point calculating process (S505) which has been explained in the third embodiment.

Here, the three-dimensional coordinates of the neighboring point obtained in the position calculating process A (S1340) is the first candidate of the feature position.

<S1360: Position Displaying Process>

Next, the image displaying unit 341 displays the first candidate of the feature position obtained in the position calculating process A (S1340) and the second candidate of the feature position calculated in the position calculating process B (S1353) on the displaying device 901.

FIG. 43 shows the road feature measurement screen 400 according to the seventh embodiment.

For example, the image displaying unit 341 displays, in the position displaying process (S1360), as shown in FIG. 43, the first candidate of the feature position (the feature position 414a) and the second candidate of the feature position (the feature position 414b) on the road feature measurement screen 400.

Here, the road feature measurement screen 400 includes a selection list box 420 to make the user specify either of the feature position 414a and the feature position 414b. The user specifies either of the feature position 414a and the feature position 414b using the selection list box 420 as the feature position. For example, in FIG. 43, the feature position 414a (the first candidate) shown as the "feature position 1" is specified.

Then, when the storage requesting button 416 is pressed, the measurement position data memory unit 599, in the result storing process (S1370), stores the feature position specified in the selection list box 420 with relating to the measurement image point 412, the specific image number 411, and the feature type 413 as the measurement position data.

On specifying either of the first candidate and the second candidate as the feature position, the user determines, for example, according to the type of the feature for the measurement target.

For example, in FIG. 43, when the user wants to measure the position of the feature having a width (the feature having a wide plane compared with the obtained density of the laser measured point) such as the km post 403 (a column), the user can obtain a correct feature position (the first candidate) by specifying the projected point 421 (the point "a" 421*a*, for example) superimposed on the feature as the measurement image point as has been explained in the fifth embodiment.

However, when the user wants to measure the position of the feature having no width (a line-shaped feature having a narrow width compared with the obtained density of the laser measured point) such as an edge 424 of the white line 407 (a border line of the white line 407), since not always there exists the projected point 421 superimposed on the feature, the user is to specify one point (one pixel) on the feature which has no projected point 421 (the point "x" 423, for example) as the measurement image point. Therefore, the position calculating process A (S1340) in which the three-dimensional coordinates of the laser measured point corresponding to the projected point 421 (the point "f" 421*f*, for example) which is the closest to the measurement image point is assumed to be the feature position (the first candidate) cannot always obtain the feature position with higher precision than the feature position calculated in the position calculating process B (S1353) (the second candidate).

Then, when the projected point 421 superimposed on the feature for the measurement target can be specified as the measurement image point 412, the user should specify "feature position 1" showing the feature position (the first candidate) obtained in the position calculating process A (S1340) in the selection list box 420.

Further, when one point on the feature having no projected point 421 is specified as the measurement image point 412, the user should specify "feature position 2" showing the feature position (the second candidate) obtained in the position calculating process B (S1353) in the selection list box 420.

Since the position calculating process B (S1353) calculates the feature position (the second candidate) based on the LOS vector for the measurement image point, it is possible to obtain the feature position (the second candidate) with a high precision even if there is no projected point 421 on the feature.

As discussed above, the user can select the feature position showing a higher precision among plural feature positions decided by different methods (the position calculating process A (S1340), the position calculating process B [S1353]) according to the type of the feature of which position is to be measured or presence/absence of the projected point 421 superimposed on the feature.

Embodiment 8

In the eighth embodiment, another embodiment will be explained, in which a candidate of the feature position with a higher precision is decided as the feature position between the first candidate and the second candidate of the feature position, while the user's selection is unnecessary.

Items being different from the seventh embodiment will be mainly discussed in the following, and items for which explanation is omitted can be considered as the same as the seventh embodiment.

FIG. 44 is a flowchart showing a measuring method according to the eighth embodiment.

The measuring method according to the eighth embodiment will be explained in the following with reference to FIG. 44.

The measuring method according to the eighth embodiment carries out a position calculating process C (S1360B) instead of the position displaying process (S1360) which has been explained in the seventh embodiment.

Hereinafter, the position calculating process C (S1360B) will be explained.

<S1360B: Position Calculating Process C>

The feature position calculating unit 174 decides either of the feature position (the first candidate) obtained in the position calculating process A (S1340) and the feature position (the second candidate) calculated in the position calculating process B (S1353) based on the feature type inputted in the measurement image point obtaining process (S1320).

As has been explained in the seventh embodiment, when the projected point 421 superimposed on the feature for the measurement target is specified as the measurement image point 412, normally the feature position (the first candidate) obtained in the position calculating process A (S1340) shows a higher precision than the feature position (the second candidate) calculated in the position calculating process B (S1353). Further, when there is no projected point 421 superimposed on the feature for the measurement target, the feature position (the second candidate) calculated in the position calculating process B (S1353) shows a higher precision than the feature position (the first candidate) obtained in the position calculating process A (S1340).

Further, when the feature having a width such as the km post, various kinds of road signs, etc. is the measurement target, normally there exists the projected point 421 superimposed on the feature for the measurement target. Further, when the feature having no width such as the edge of the white line, etc. is the measurement target, there may be no projected point 421 superimposed on the feature for the measurement target.

Then, the feature position calculating unit 174, in the position calculating process C (S1360B), selects the feature position (the first candidate) obtained in the position calculating process A (S1340) when the feature type 413 shows the feature having a width. Further, the feature position calculating unit 174 selects the feature position (the second candidate) calculated in the position calculating process B (S1353) if the feature type 413 shows the feature having no width.

In the result storing process (S1370), the measurement position data memory unit 599 stores the feature position selected (decided) in the position calculating process C (S1360B) with relating to the measurement image point 412, the specific image number 411, and the feature type 413 as the measurement position data.

As discussed above, the road feature measurement screen 400 can decide a candidate having a higher precision between the first candidate and the second candidate without making the user select.

Embodiment 9

In the second through the eighth embodiments, the measurement apparatus (the road feature measurement apparatus, or the CAD apparatus 600, for example) includes the image memory unit (the observation data memory unit 199), the three-dimensional point cloud model memory unit (the observation data memory unit 199), the image displaying unit 341, the measurement image point obtaining unit (the image point inputting unit 342), and the position calculating unit (the road surface model corresponding point searching unit 170). Then, the position calculating unit detects the corresponding point corresponding to the measurement image point obtained by the measurement image point obtaining unit from the point cloud of the three-dimensional point cloud model stored in the three-dimensional point cloud model memory unit, and decides a three-dimensional position of the measurement image point obtained by the measurement image unit using the position of the detected corresponding point.

In the ninth embodiment, another embodiment will be explained, in which the user terminal (a measurement terminal device) includes (1) a measurement image point obtaining unit, (2) an image displaying unit, and a server (a measurement server device) includes (3) an image memory unit, (4) a three-dimensional point cloud model memory unit, and (5) a position calculating unit.

The user terminal sends information of the measurement image point to the server, and the server decides a three-dimensional position of the measurement image point (the feature position) received and sends to the user terminal.

Items being different from the first through the eighth embodiments will be mainly discussed in the following, and items for which explanation is omitted can be considered as the same as the first through the eighth embodiment.

FIG. 45 shows a functional configuration of the measurement server device 710 and the measurement terminal device 720 according to the ninth embodiment.

In FIG. 45, the measurement terminal device 720 (a user terminal, hereinafter) and the measurement server device 710 (a server, hereinafter) communicate via the Internet 940.

The server (the measurement server device 710) provides, as a Web server, the user terminal connected to the Internet 940 with a function to measure the feature position.

The user terminal (the measurement terminal device 720) accesses the server using the Web browser, requests the server to measure a feature position corresponding to a measurement image point, and obtains the feature position corresponding to the measurement image point by receiving the measured feature position from the server.

Here, the server and the user terminal can be connected with communication network other than the Internet 940 (LAN, for example); the server can be other than the Web server; and the user terminal can access the server without using the Web browser.

In FIG. 45, the same signs are appended to similar configuration to the ones which have been explained in other embodiments.

Further, the server-side image point inputting unit 342s and the user-side image point inputting unit 342u form a configuration corresponding to the image point inputting unit 342 which has been explained in other embodiments.

FIG. 46 is a flowchart showing a measuring method according to the ninth embodiment.

The measuring method according to the ninth embodiment will be explained in the following with reference to FIG. 46.

<S1411: Image Presenting Process>

The image presenting unit 711 of the server (the measurement server device) sends the image stored in (3) the image memory unit 708 and the road surface shape model stored in (4) the three-dimensional point cloud model memory unit 709 to the user terminal by data transmission via broadband. At this time, the road surface shape model to be sent to the user terminal is the projected point cloud of the image, which is sent together, projected by the model projecting unit 172. Further, only the image can be sent to the user terminal and the projected point cloud can remain unsent to the user terminal.

<S1412: Image Displaying Process>

In the user terminal (the measurement terminal device), (2) the image displaying unit 341 displays the measurement screen by superimposing the image and the projected point cloud sent from the server on the display (the displaying device 901) of the user terminal. For example, the image displaying unit 341 displays the road feature measurement screen 400 (FIG. 37) or the CAD screen 620 (FIG. 34) as the measurement screen by superimposing the image and the projected point cloud.

By selection by the user, the display can be switched between superimposed display of the image and the projected point cloud and display of only the image.

The image displaying unit 341 can be a program supplied from the server to the user terminal. At this time, it is assumed that the image displaying unit 341 has been previously downloaded from the server and installed in the user terminal.

The image displaying process (S1412) corresponds to, for example, the image displaying process A (S1111) and the image displaying process B (S1113).

<S1421: Terminal-Side Measurement Image Point Obtaining Process>

The user, by the user terminal, using an inputting device such as a mouse or a light pen, etc., clicks a point (a pixel) within the image of the measurement screen as a measurement image point. The user terminal obtains the measurement image point by a user-side image point inputting unit 342u ((1) the measurement image point obtaining unit) based on the clicked point and sends the measurement image point to the server.

Further, the user-side image point inputting unit 342u can send the identification number of the image together with the measurement image point. Further, the user-side image point inputting unit 342u can input a feature type as well as the type inputting process (S1120) and can send the measurement image point and the feature type to the server.

<S1422: Server-Side Measurement Image Point Obtaining Process>

In the server, the server-side image point inputting unit 342s receives the measurement image point from the user terminal.

The terminal-side measurement image point obtaining process (S1421) and the server-side measurement image point obtaining process (S1422) correspond to, for example, the measurement image point obtaining process (S1120).

<S1430: Corresponding Point Detecting Process>

In the server, the neighborhood extracting unit 171 extracts a neighboring point of the measurement image point from a projected point cloud similarly to the corresponding point detecting process (S1130).

<S1440: Position Calculating Process>

In the server, the feature position calculating unit 174 obtains a three-dimensional position of the neighboring point from the three-dimensional point cloud model memory unit 709 as the feature position similarly to the position calculating process (S1140) and sends the feature position to the user terminal.

<S1450: Result Storing Process>

In the user terminal, the image displaying unit 341 displays the feature position sent from the server on the measurement screen, and the measurement position data memory unit 599 stores the feature position sent from the server by relating to the measurement image point, the feature type, and the image number as the measurement position data.

The result storing process (S1450) corresponds to, for example, the result storing process (S1150).

Any method can be used for presenting the image (and the projected point cloud) from the server to the user terminal in the image presenting process (S1411).

For example, it is possible that the server sends an image list such as a list of image numbers, a list of thumbnails of images, etc. to the user terminal, the user terminal sends a request for an image selected by the user from the list of images to the server, and the server sends the requested image to the user terminal.

Further, for example, it is also possible that the server sends all the images to the user terminal and the user terminal stores all the images.

Further, for example, the server generates arrangement information of all the images by assuming a case in which all the images are arranged lengthwise and crosswise (vertically and horizontally) or a case in which all the images are arranged depthwise, and sends one image (or images) A to the user terminal. Further, the user terminal displays the image A sent from the server on the image selection screen. Further, the user operates the mouse to move the mouse cursor in the image selection screen, and the user terminal sends the operation information of the mouse to the server. For example, the operation of the mouse is the operation to scroll vertically and horizontally in the image selection screen or the operation to turn up the image displayed on the image selection screen. Then, the server, according to the operation of the mouse, sends the image B arranged above/below/left to/right to or in front/back of the image A in the arrangement information to the user terminal, and the user terminal displays the image B sent from the server on the image selection screen according to the operation of the mouse. For example, the user terminal, according to the scroll in the image selection screen, displays the image A and the image B, which are arranged vertically, by scrolling. Further, for example, the user terminal displays that the image A is turned up so that the image B appears from beneath the image A.

Namely, in ultrafast broadband environment, when the user scrolls the measurement screen, the scroll information is sent to the server side, the server sends the image located at scrolled destination (for example, an image which will appear when the currently displayed image is turned up) to the user terminal at each scroll.

However, it is also possible that the server does not send the image at each scroll, but sends the images arranged in front of or after (or above/below/left to/right to) the image of the display target together with the image of the display target to the user terminal, and it is also possible the server at first sends all the images to the user terminal. The user terminal stores the sent images in the memory unit. These operations can reduce the number of transmission of the images from the server to the user terminal.

The ninth embodiment can be combined with another embodiment.

For example, the server includes the neighboring plane calculating unit 173 and the camera LOS computing unit 140. At this time, the neighboring plane calculating unit 173 calculates the neighboring plane including the neighboring point similarly to the plane calculating process (S1351), and the camera LOS computing unit 140 calculates the LOS vector similarly to the vector calculating process (S1352). Then, the feature position calculating unit 174 calculates an intersecting point of the neighboring plane and the LOS vector as the feature position.

Further, for example, the server also can include the feature region detecting unit 701. At this time, the feature region detecting unit 701 detects the feature image region from the image similarly to the feature region detecting process (S1213), and the image presenting unit 711 sends the feature image region together with the image to the user terminal. Then, the image displaying unit 341 of the user terminal displays the image and the feature image region similarly to the image displaying process B (S1214).

The ninth embodiment enables simultaneous operation of plural user terminals to decide three-dimensional coordinates of the features captured in the images.

Further, even if the user itself does not have a server, the user can decide the three-dimensional coordinates of the feature captured in the image, which improves the convenience.

In each embodiment, the motion stereo process (S201) and the moving body removing process (S202) can remain unperformed. Namely, the road surface shape model can include the laser measured point cloud showing the moving body.

Further, in each embodiment, the feature identifying process (S203) can remain unperformed. Namely, the laser measured point cloud of the road surface shape model can remain unclassified for each feature type.

EXPLANATION OF SIGNS

Figure 1:
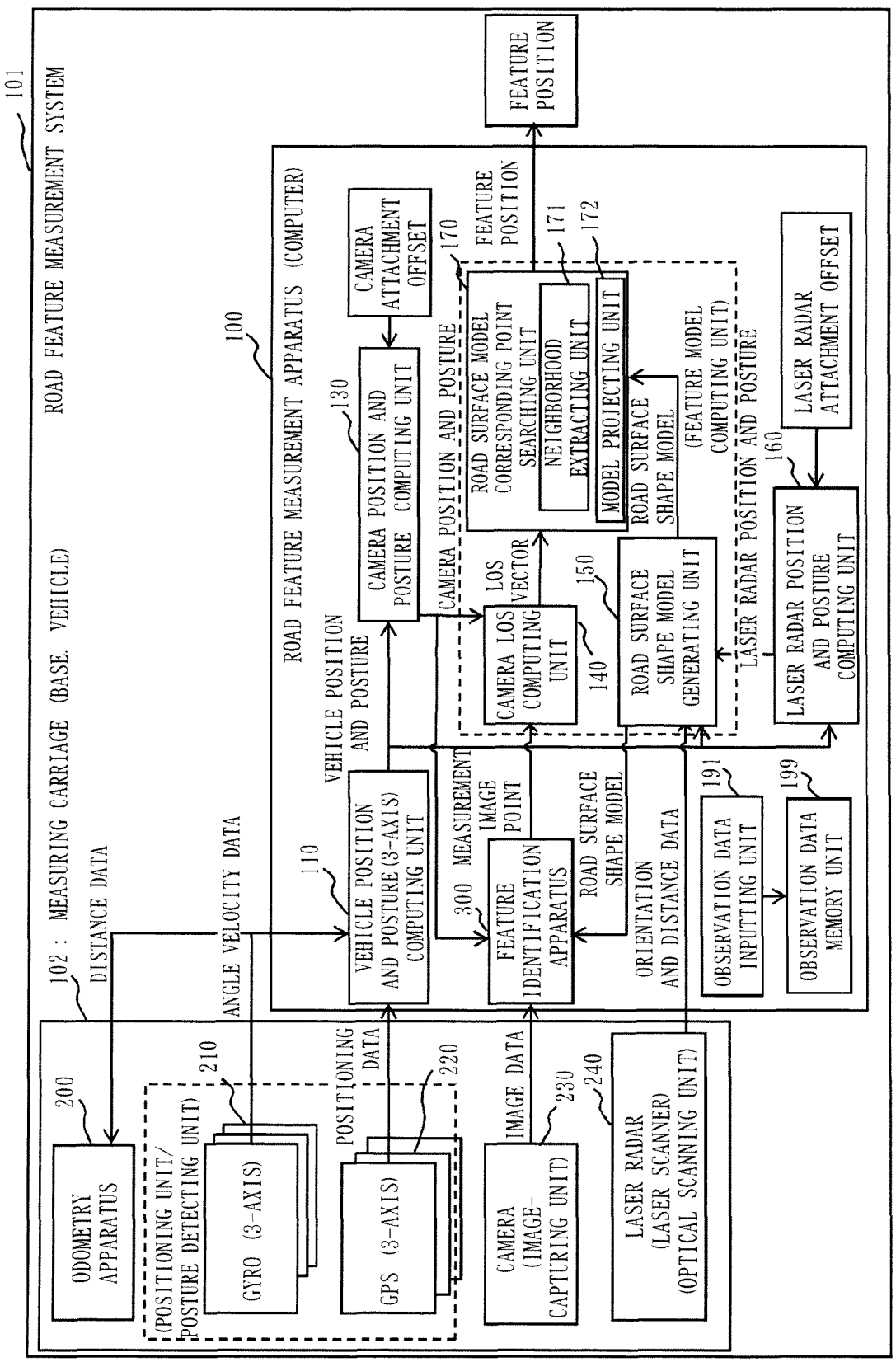
FIG. 1 shows a system configuration of a road feature measurement system 101 and a functional configuration of a road feature measurement apparatus 100 according to the first embodiment.
Figure 2:
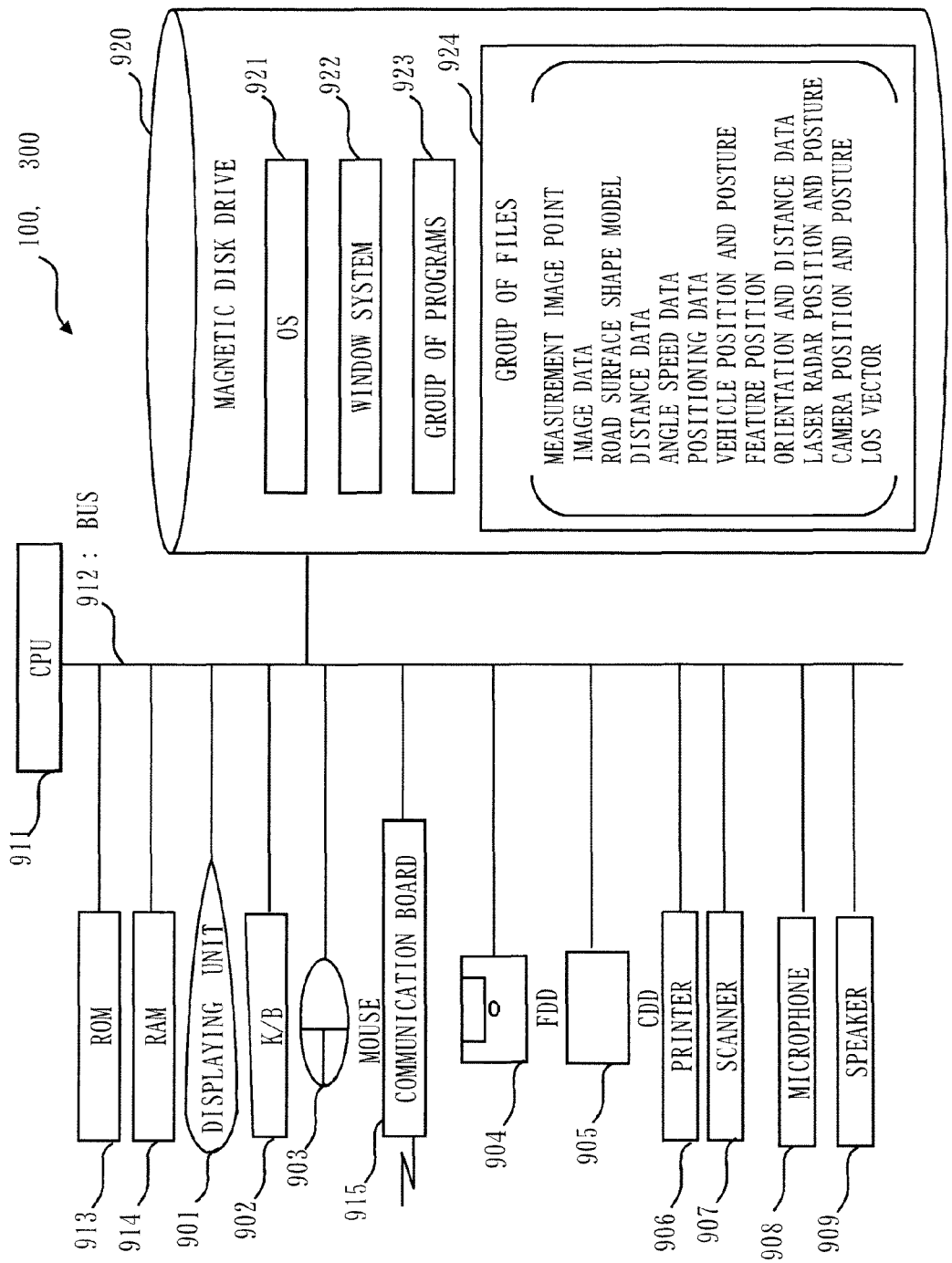
FIG. 2 shows an example of hardware resource for the road feature measurement apparatus 100 and a feature identification apparatus 300 according to the first embodiment.
Figure 3:
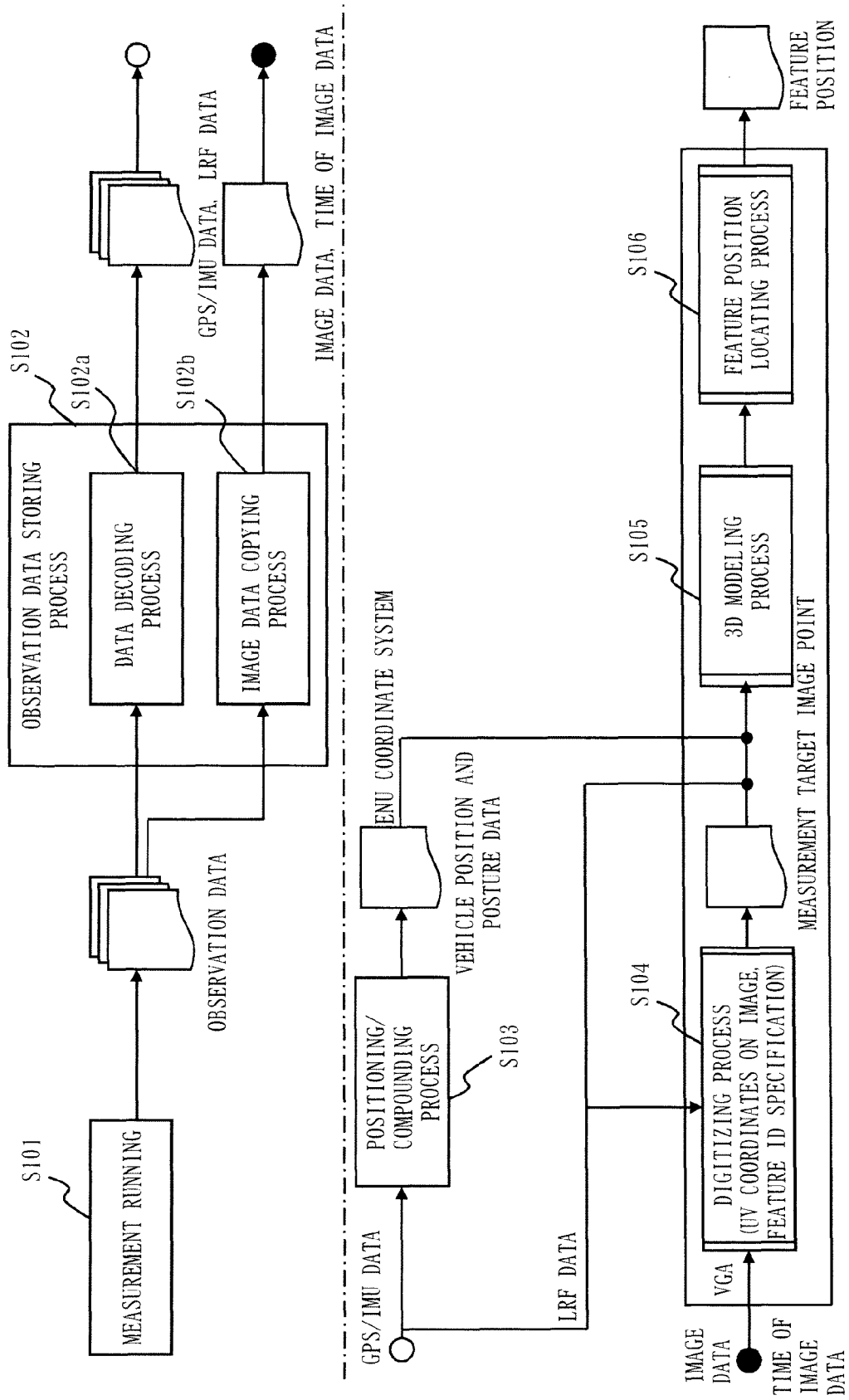
FIG. 3 is a flowchart showing a flow of road feature position measuring process of the road feature measurement system 101 according to the first embodiment.
Figure 4:
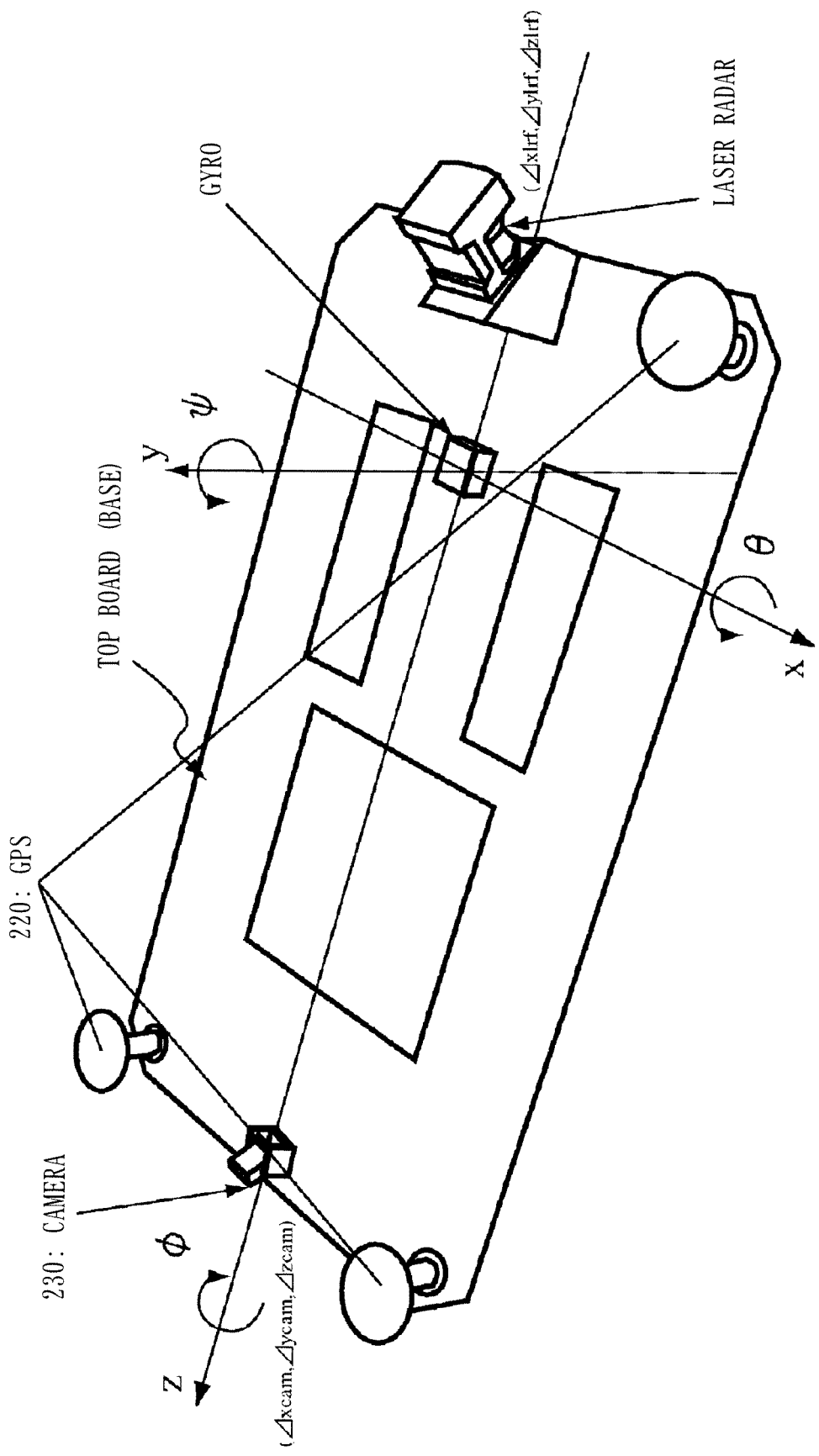
FIG. 4 shows positional relation among locations of a vehicle, LRF, and a camera 230 according to the first embodiment.
Figure 5:
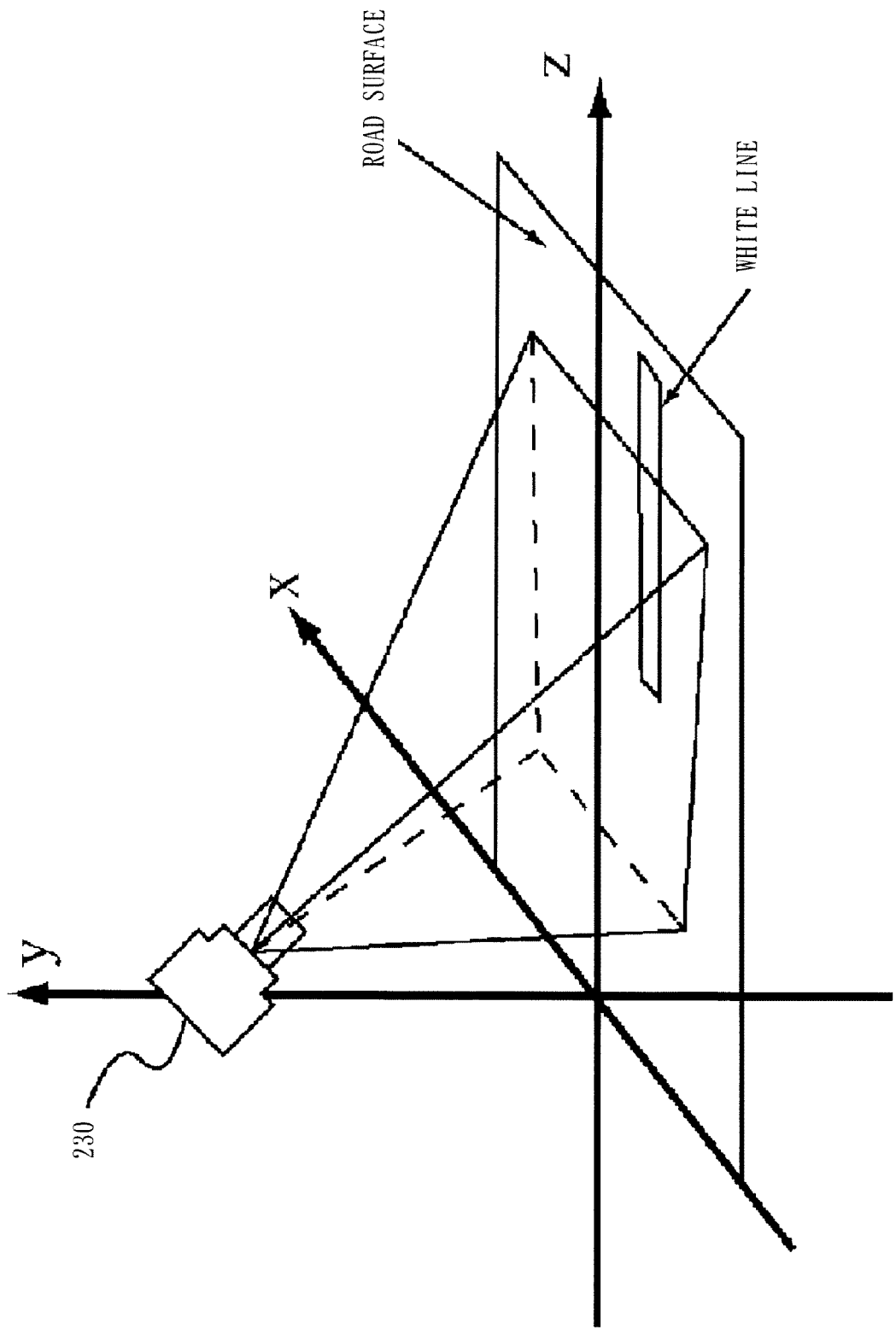
FIG. 5 shows positional relation among locations of the vehicle, LRF, and the camera 230 according to the first embodiment.
Figure 6:
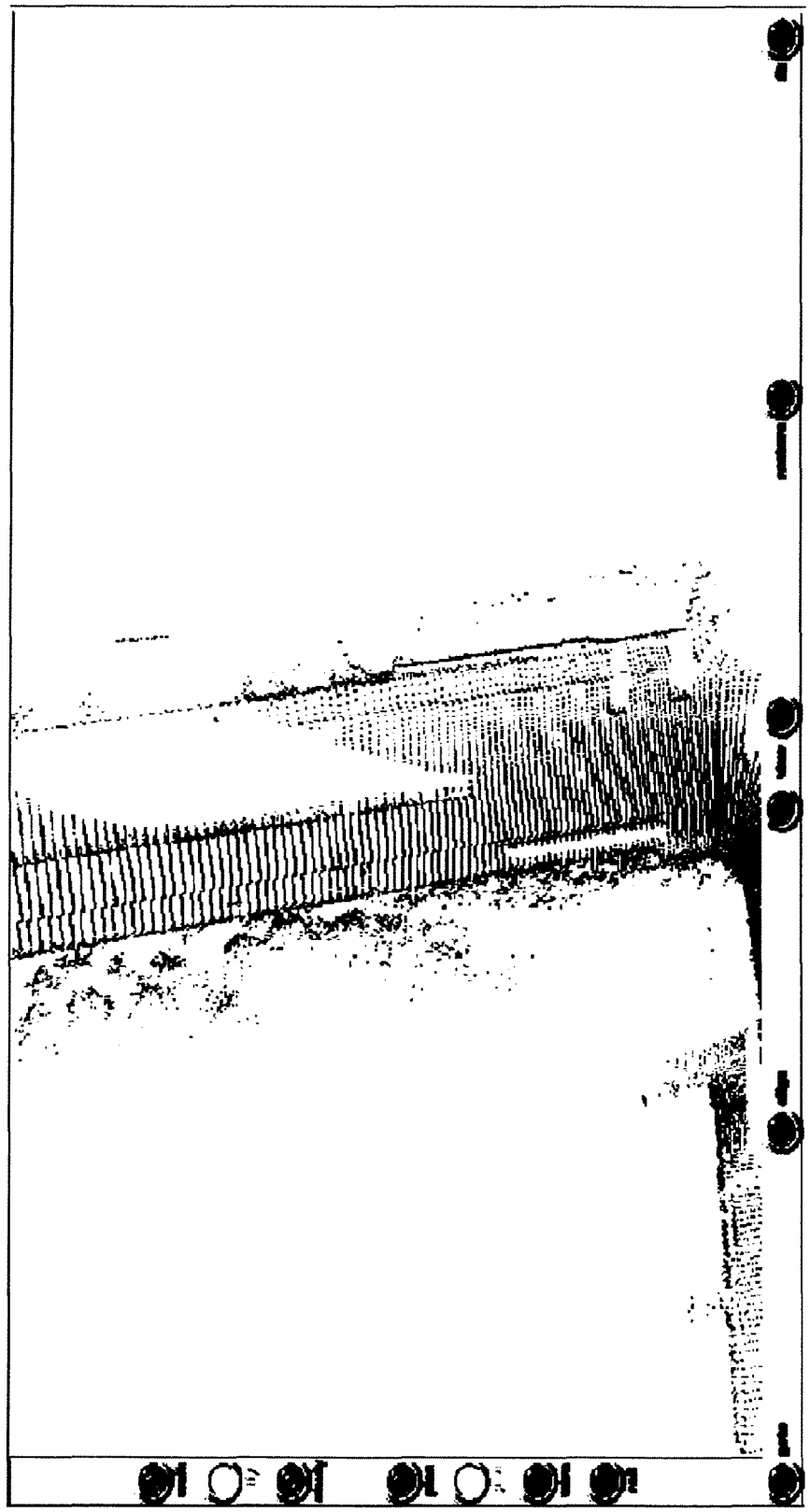
FIG. 6 shows a road surface shape model according to the first embodiment.
Figure 7:
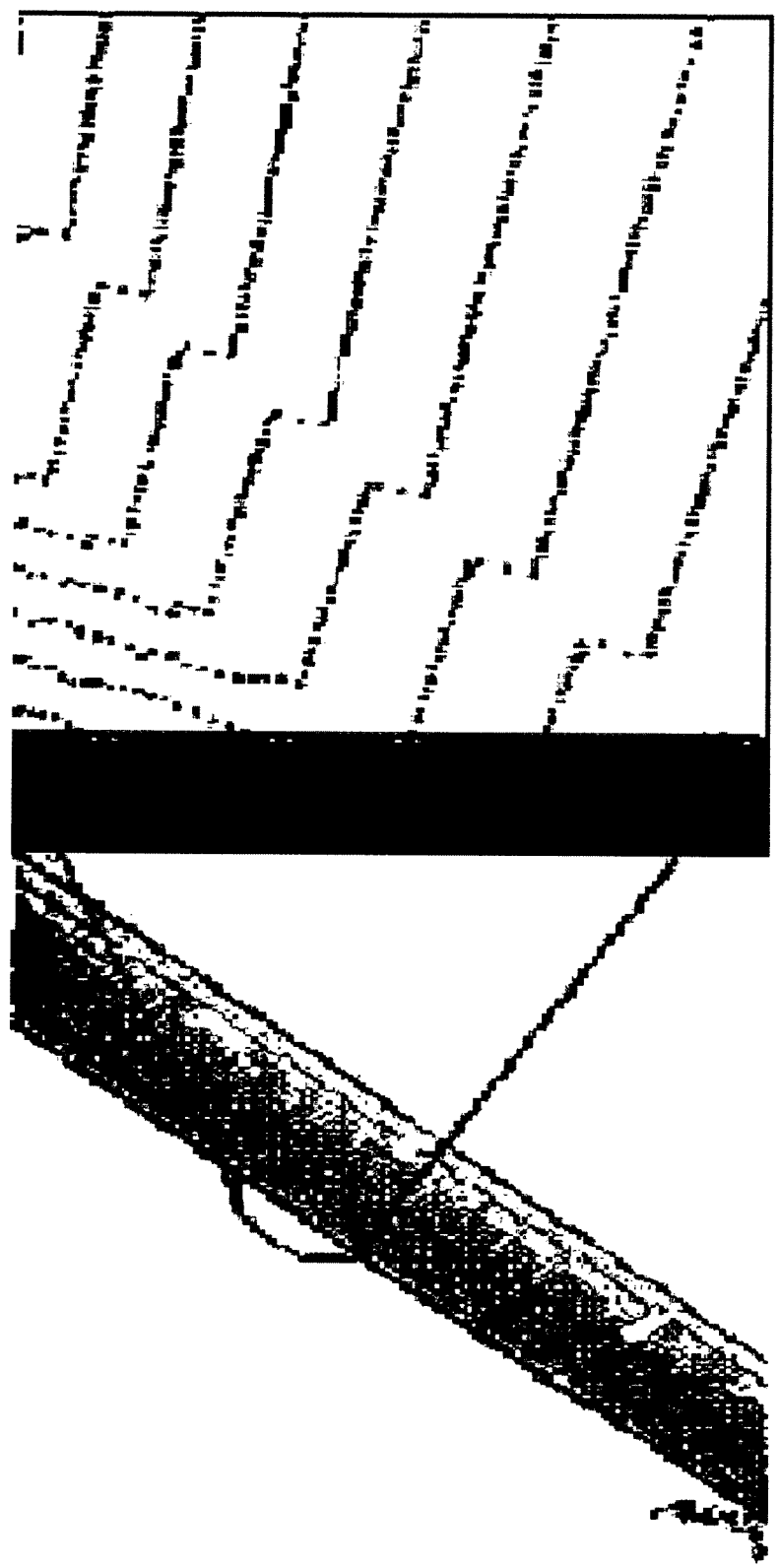
FIG. 7 shows a road surface shape model according to the first embodiment.
Figure 8:
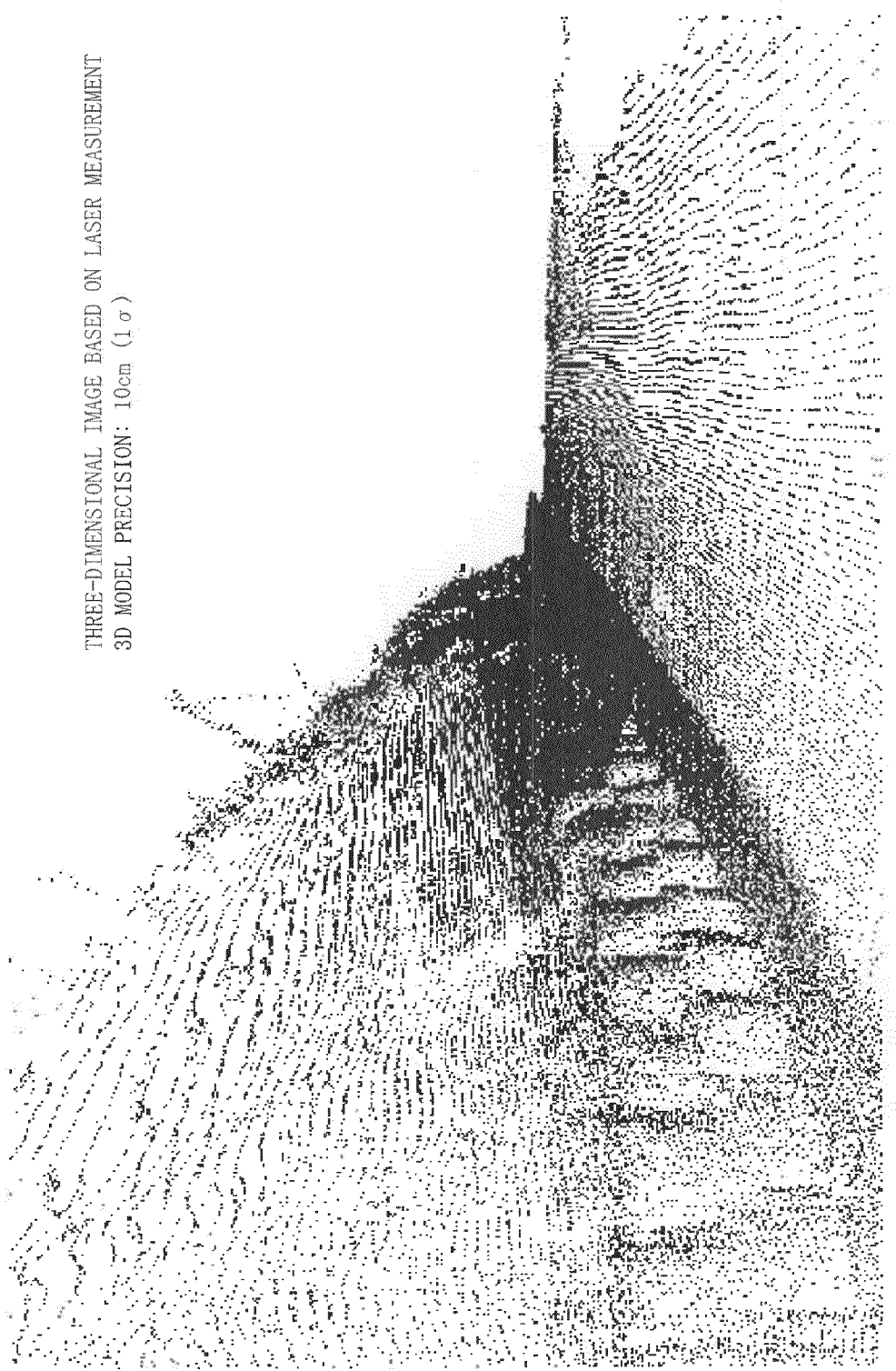
FIG. 8 shows a road surface shape model according to the first embodiment.
Figure 9:
FIG. 9 shows an optical image corresponding to FIG. 8.
Figure 10:
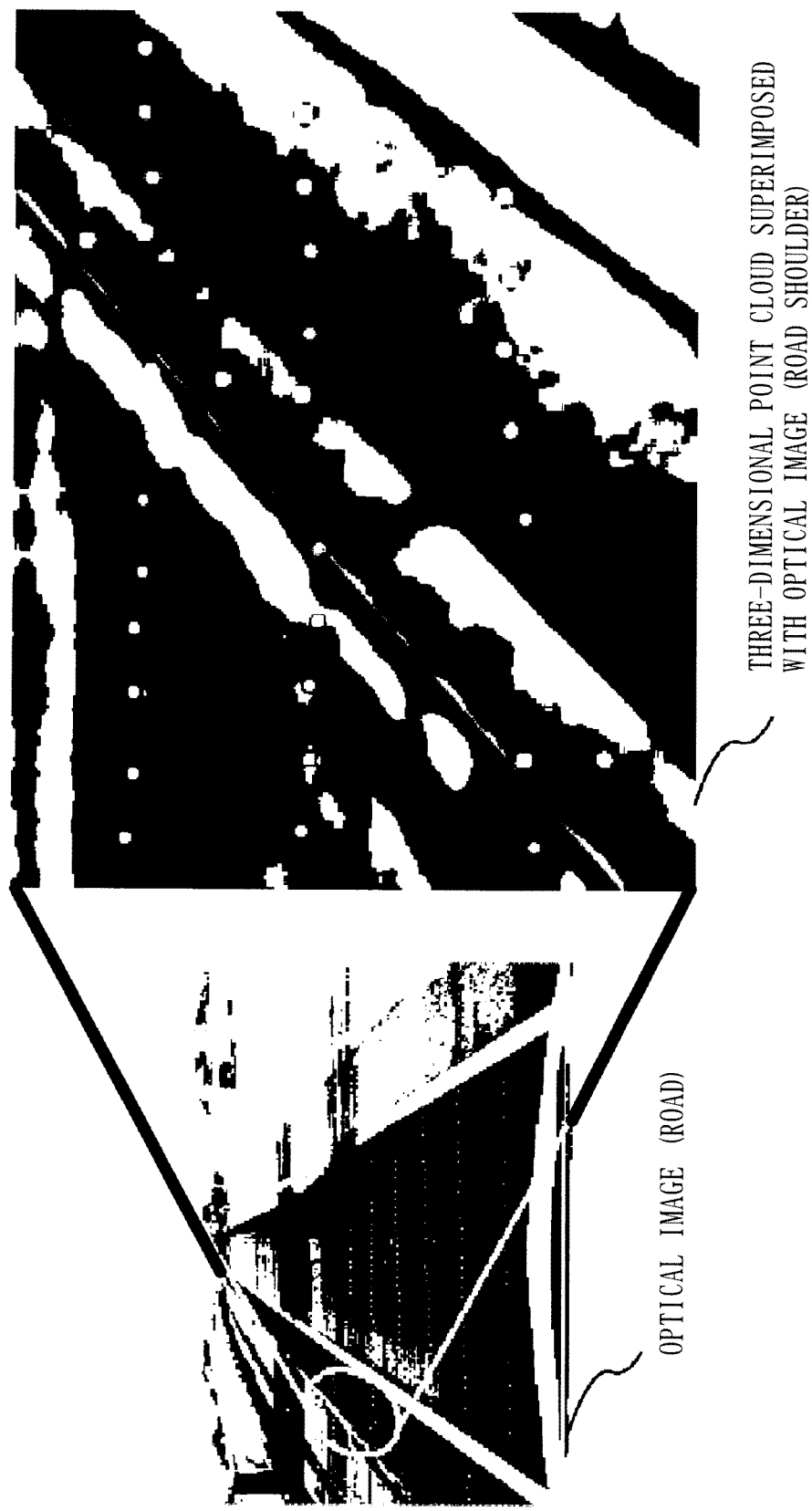
FIG. 10 shows an image on which projection transformation is performed according to the first embodiment.
Figure 11:
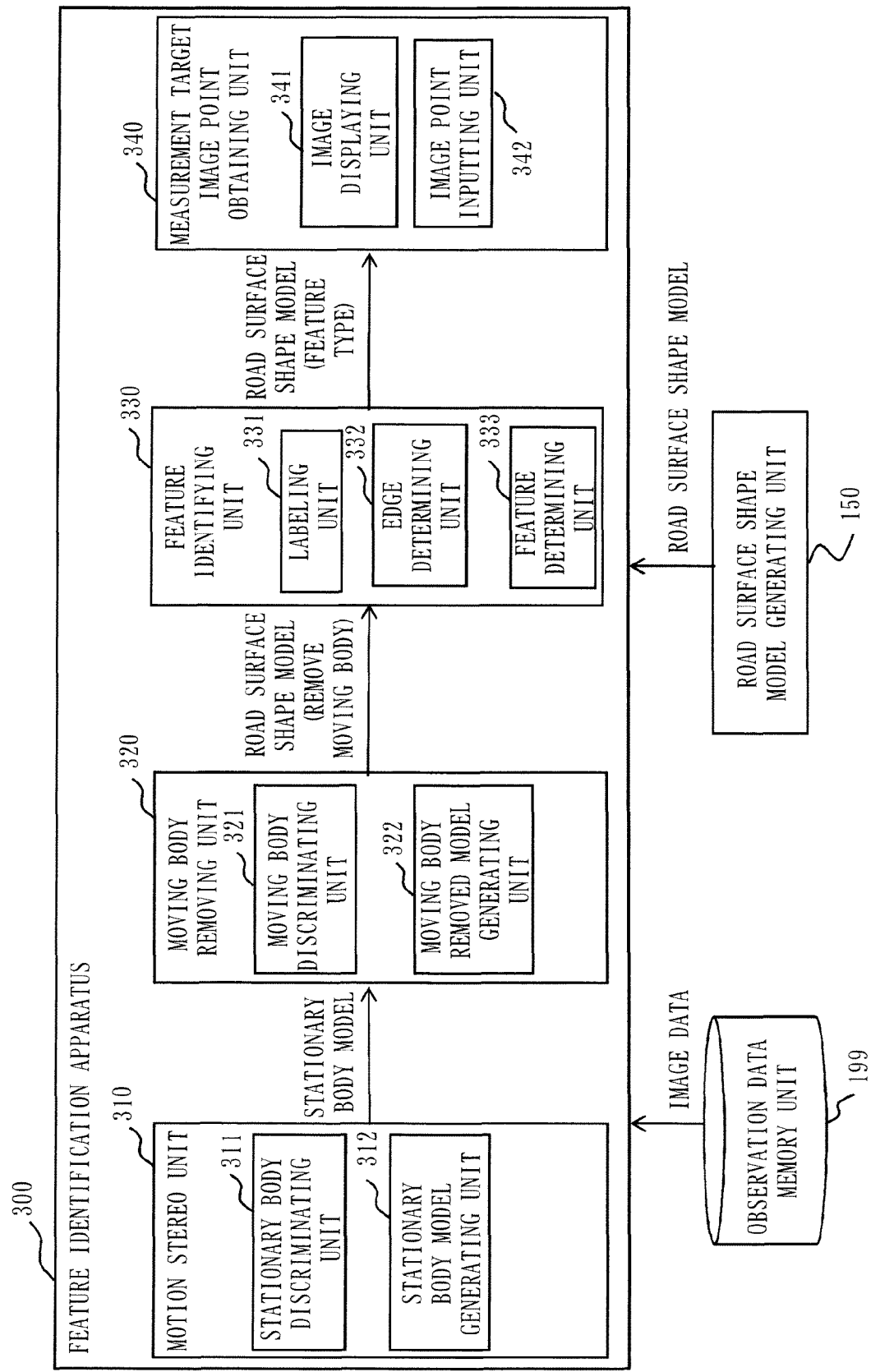
FIG. 11 shows a configuration of a feature identification apparatus 300 according to the first embodiment.
Figure 12:
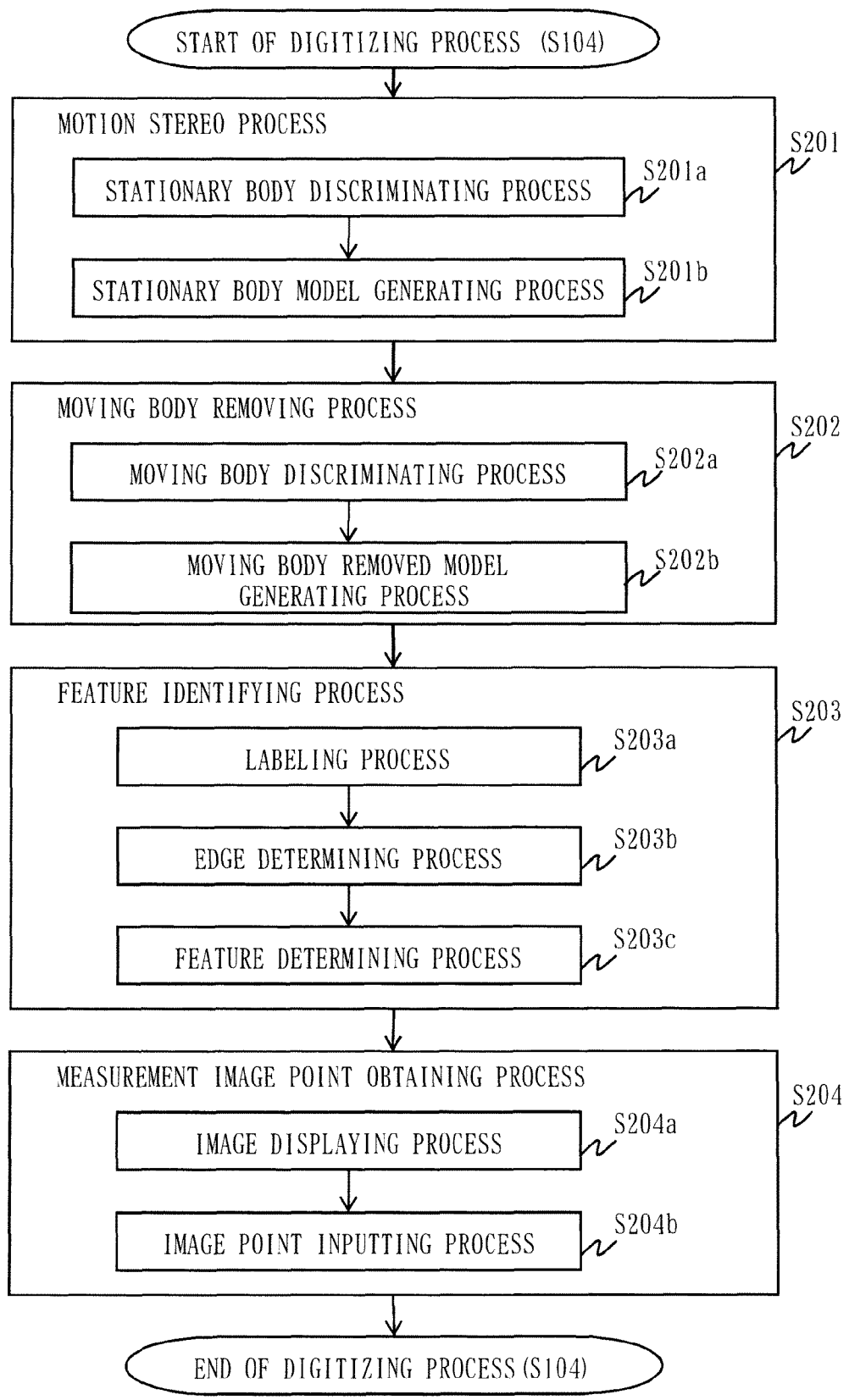
FIG. 12 is a flowchart showing a flow of digitizing process (S104) of the feature identification apparatus 300 according to the first embodiment.
Figure 13:
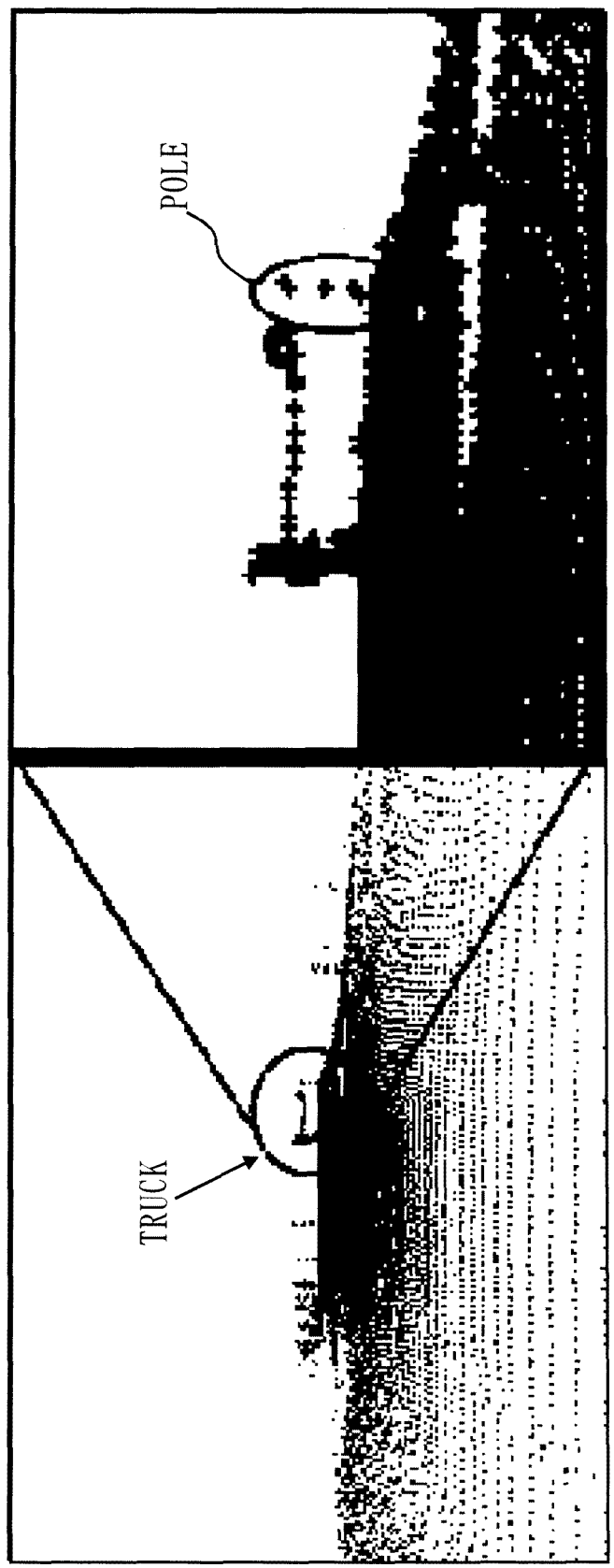
FIG. 13 shows a road surface shape model when a truck does not hide a pole.
Figure 14:
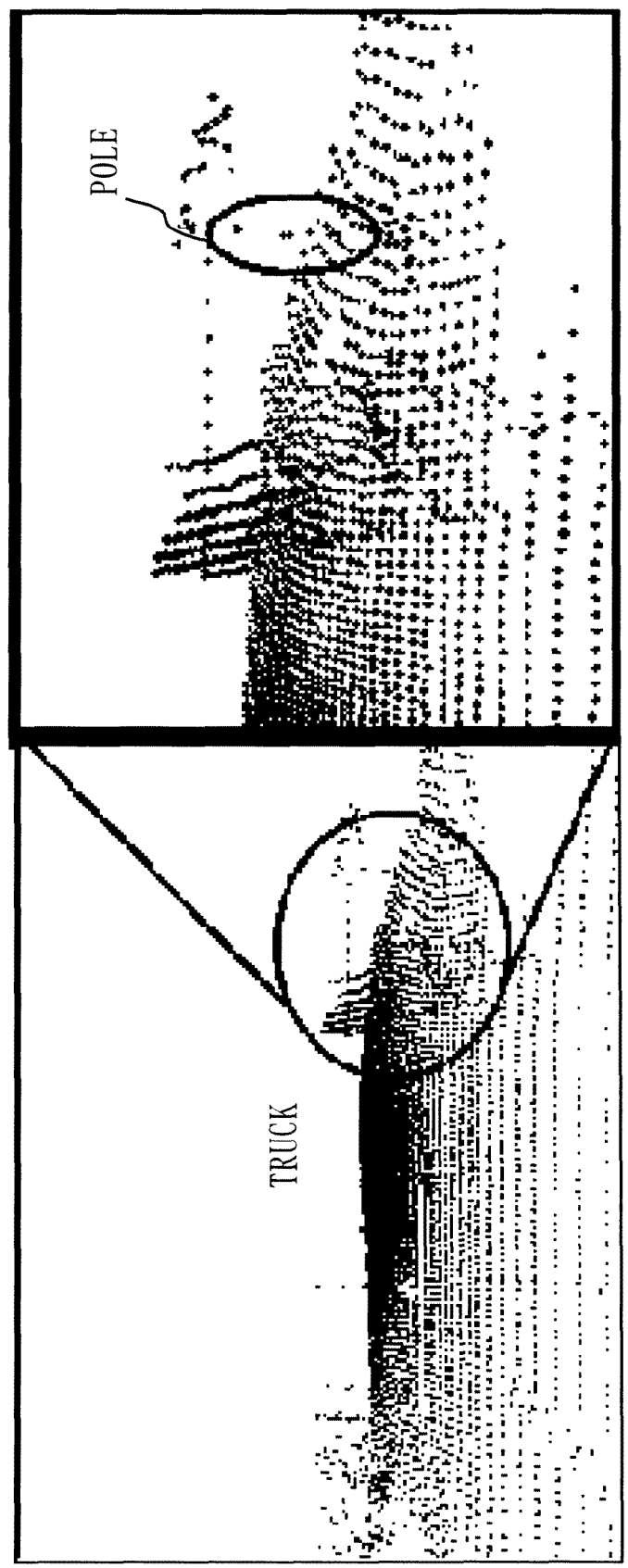
FIG. 14 shows a road surface shape model when a truck hides a pole.
Figure 15:
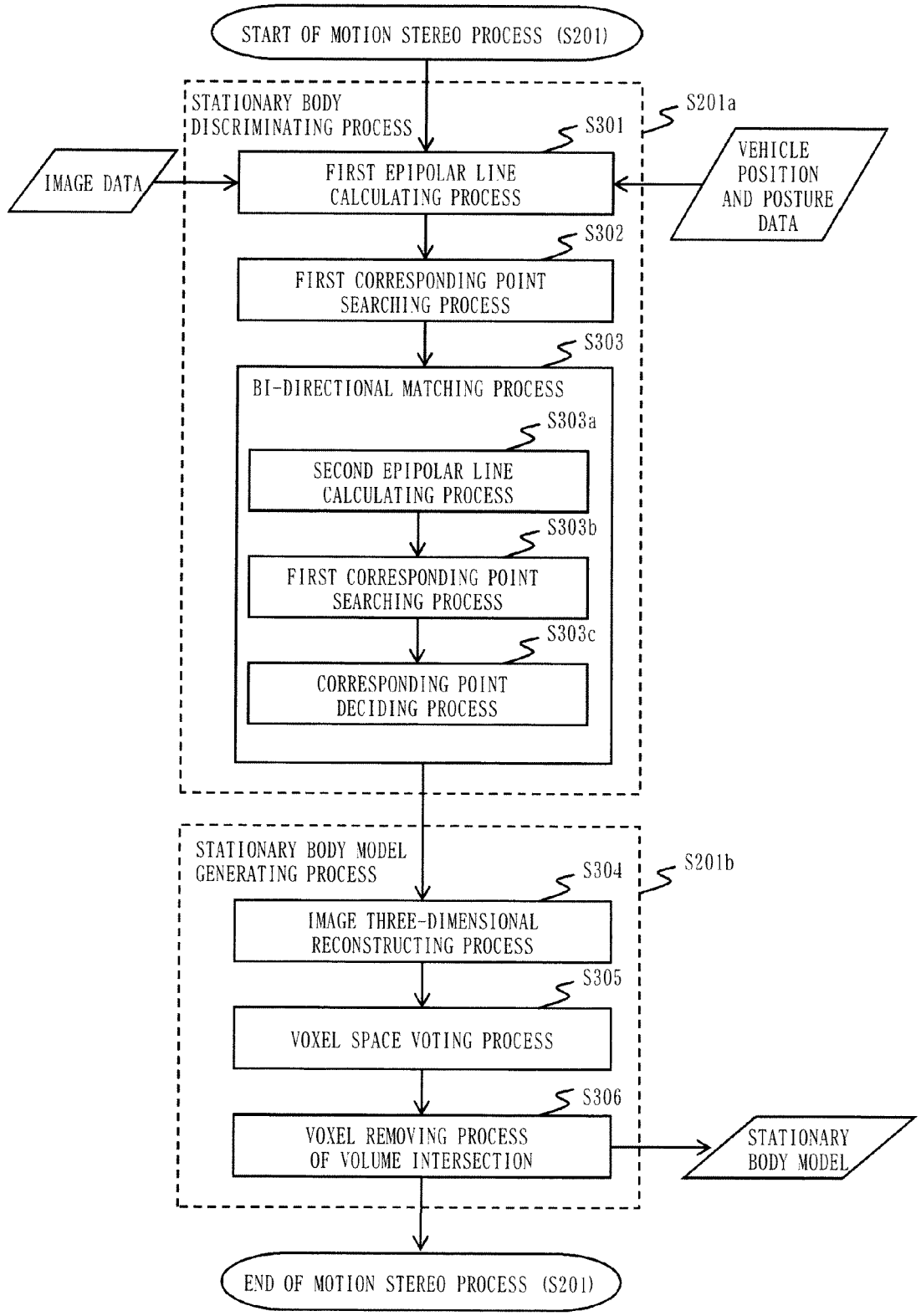
FIG. 15 is a flowchart showing a flow of motion stereo process (S201) according to the first embodiment.
Figure 16:
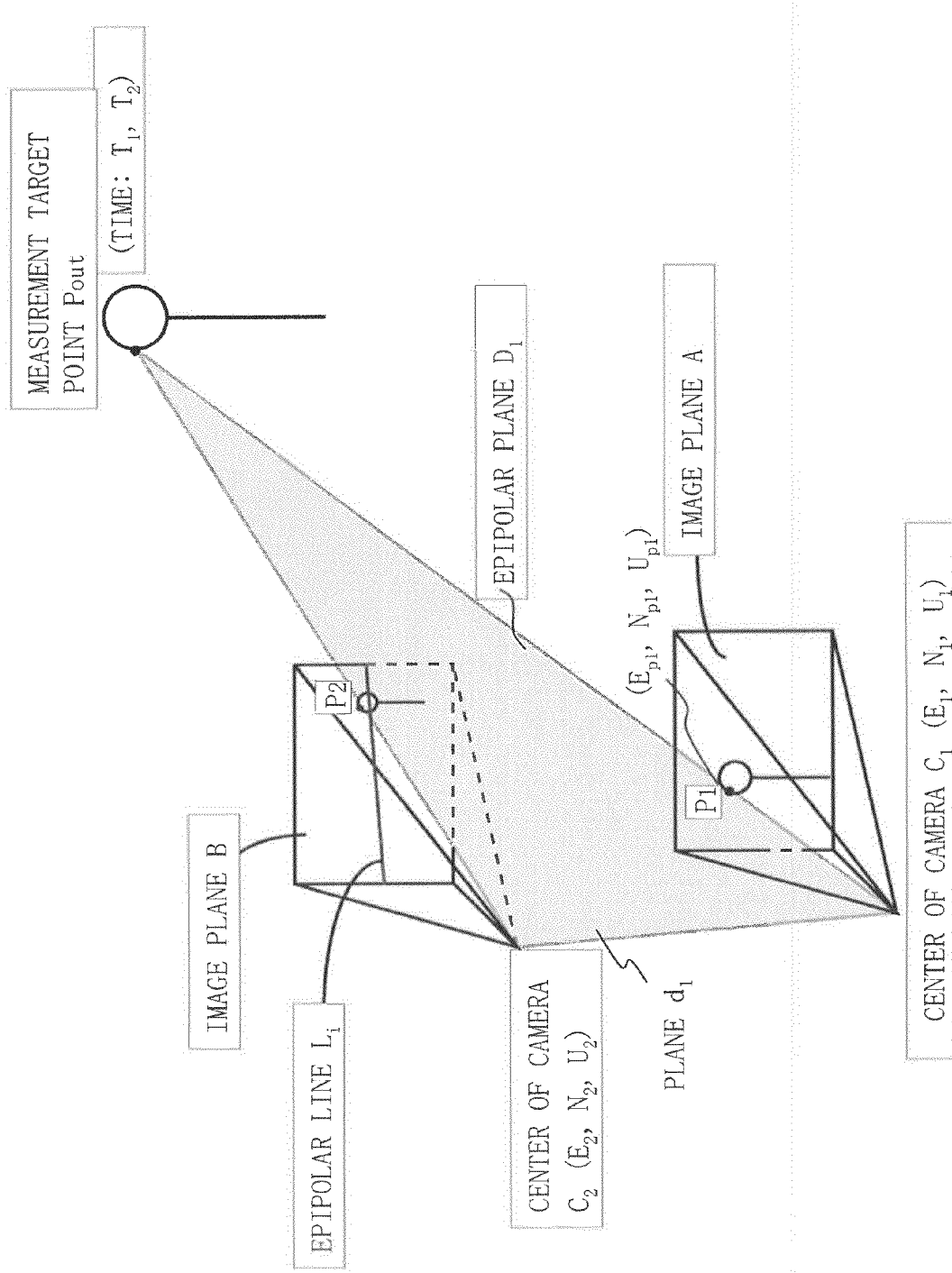
FIG. 16 shows a calculating method of an epipolar line L1 according to the first embodiment.
Figure 17:
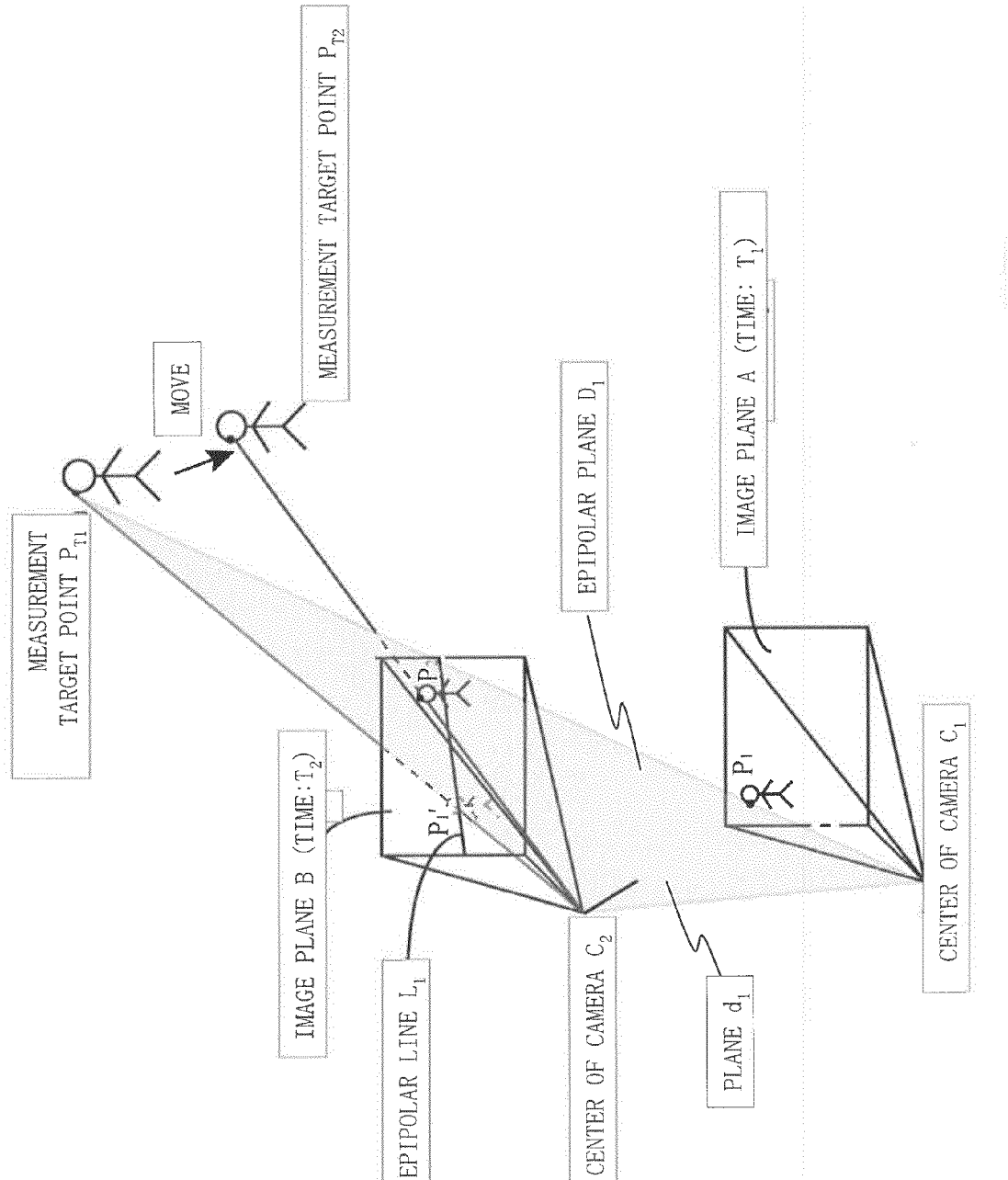
FIG. 17 shows that a corresponding point $P_2$ corresponding to a measurement target point $P_{T2}$ after moving does not exist on the epipolar line $L_1$.
Figure 18:
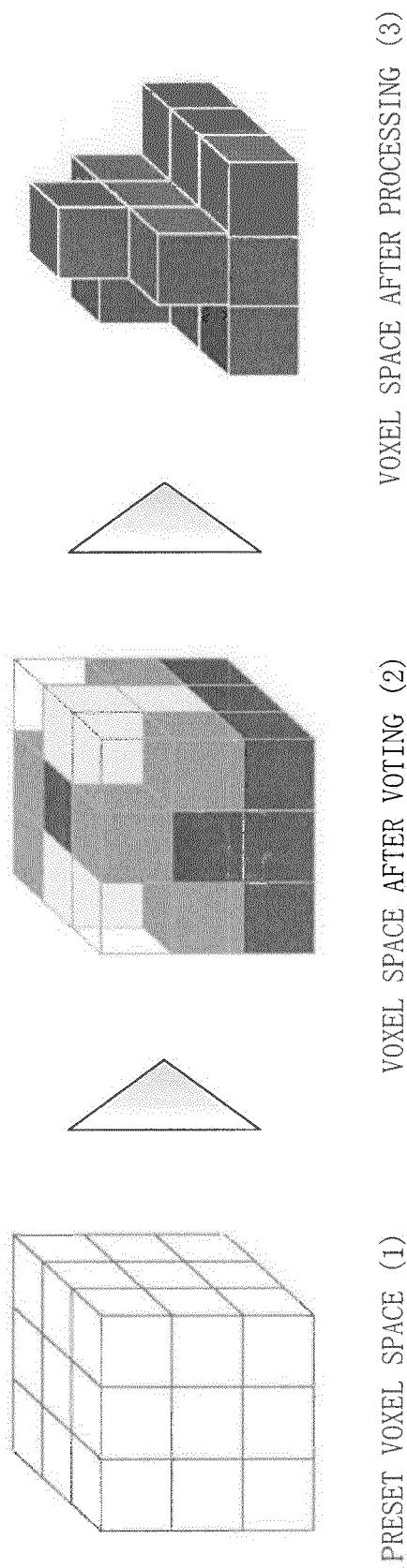
FIG. 18 is an image drawing of a voxel space voting process (S305) according to the first embodiment.
Figure 19:
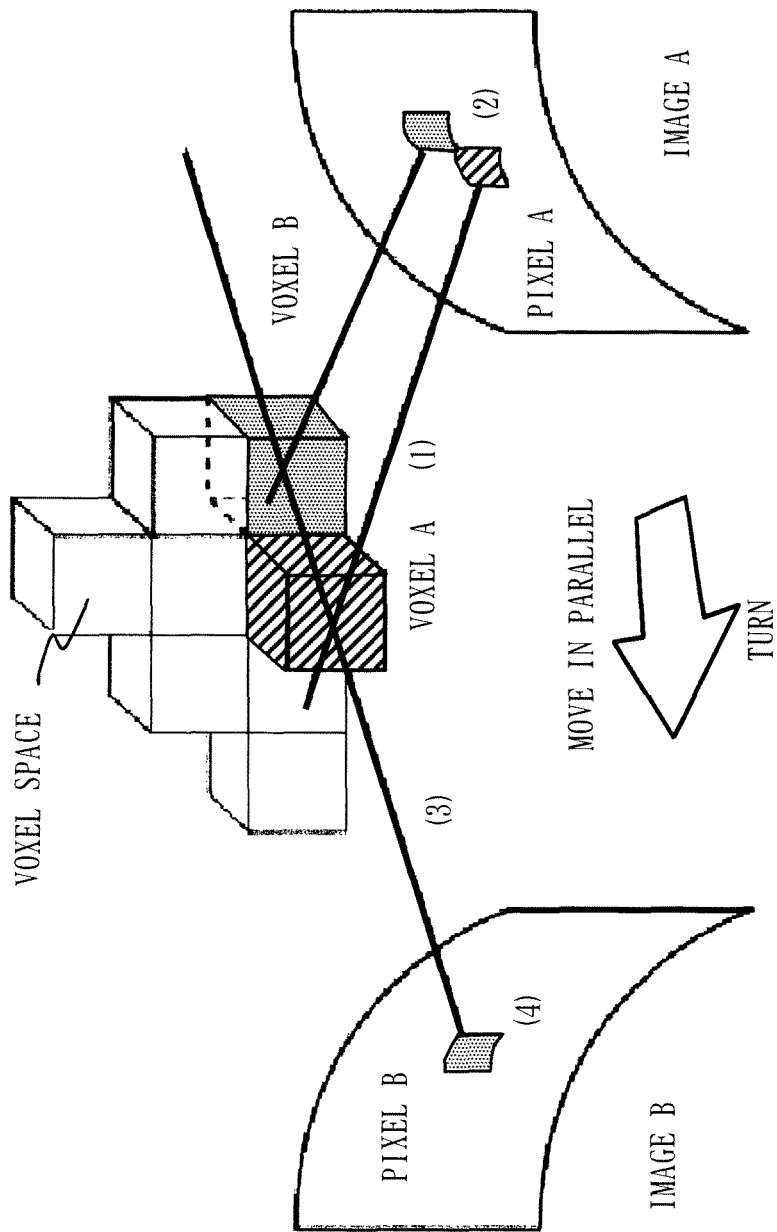
FIG. 19 shows a volume intersection according to the first embodiment.
Figure 20:
FIG. 20 is an image showing a place where a feature specified by the user is easily misrecognized.
Figure 21:
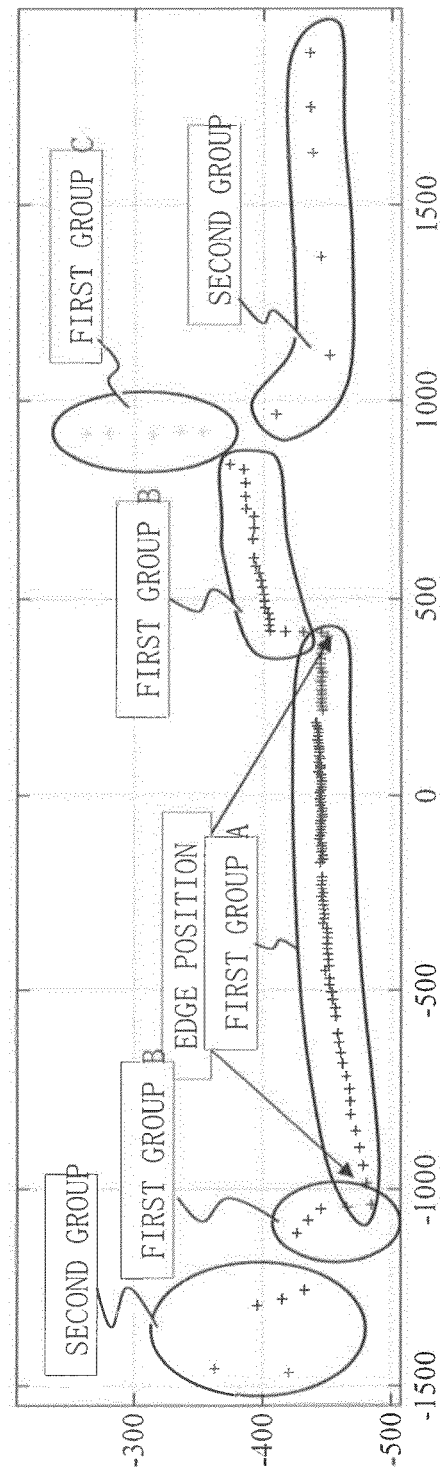
FIG. 21 shows feature identifying process (S203) according to the first embodiment.
Figure 22:
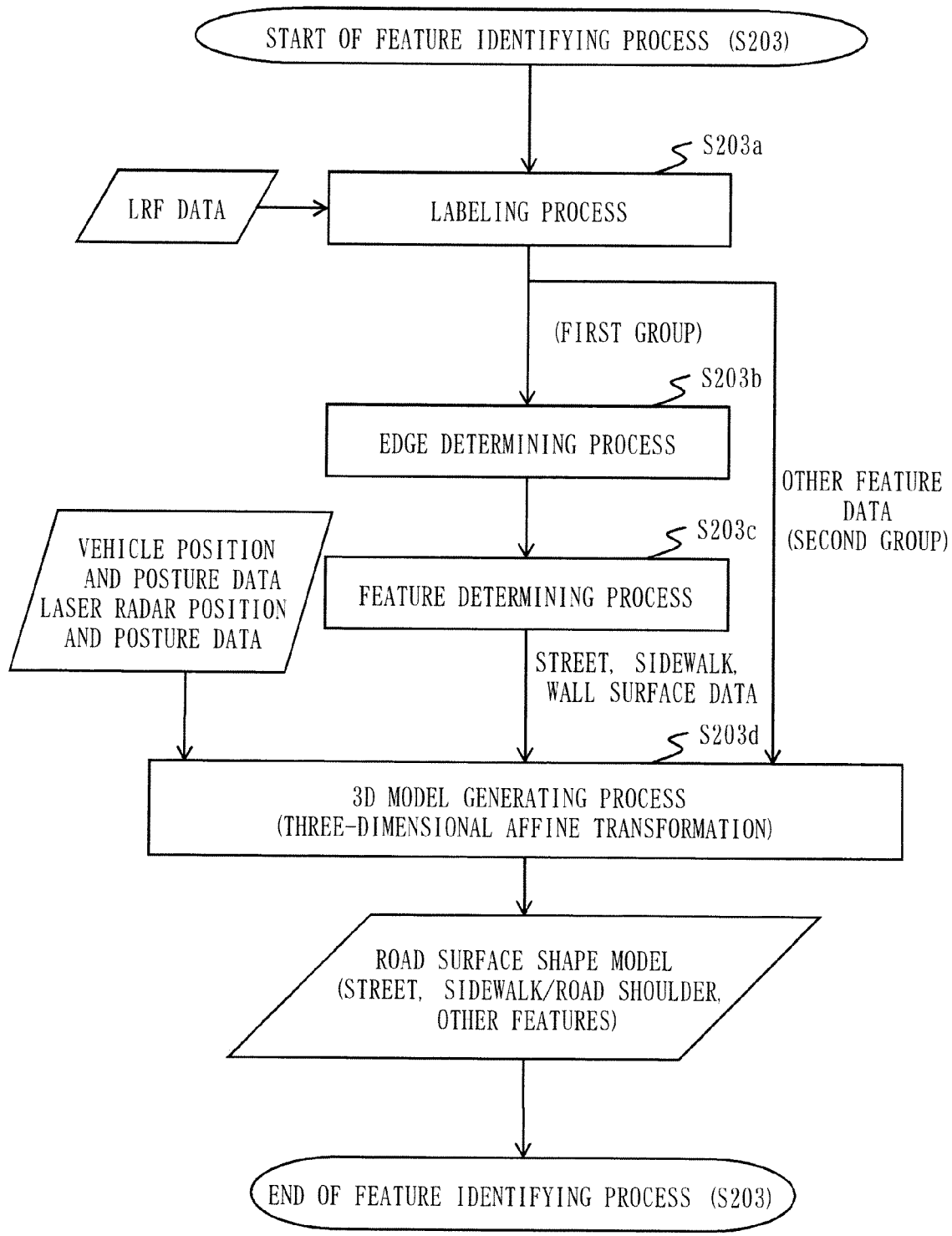
FIG. 22 is a flowchart showing a flow of the feature identifying process (S203) according to the first embodiment.
Figure 23:
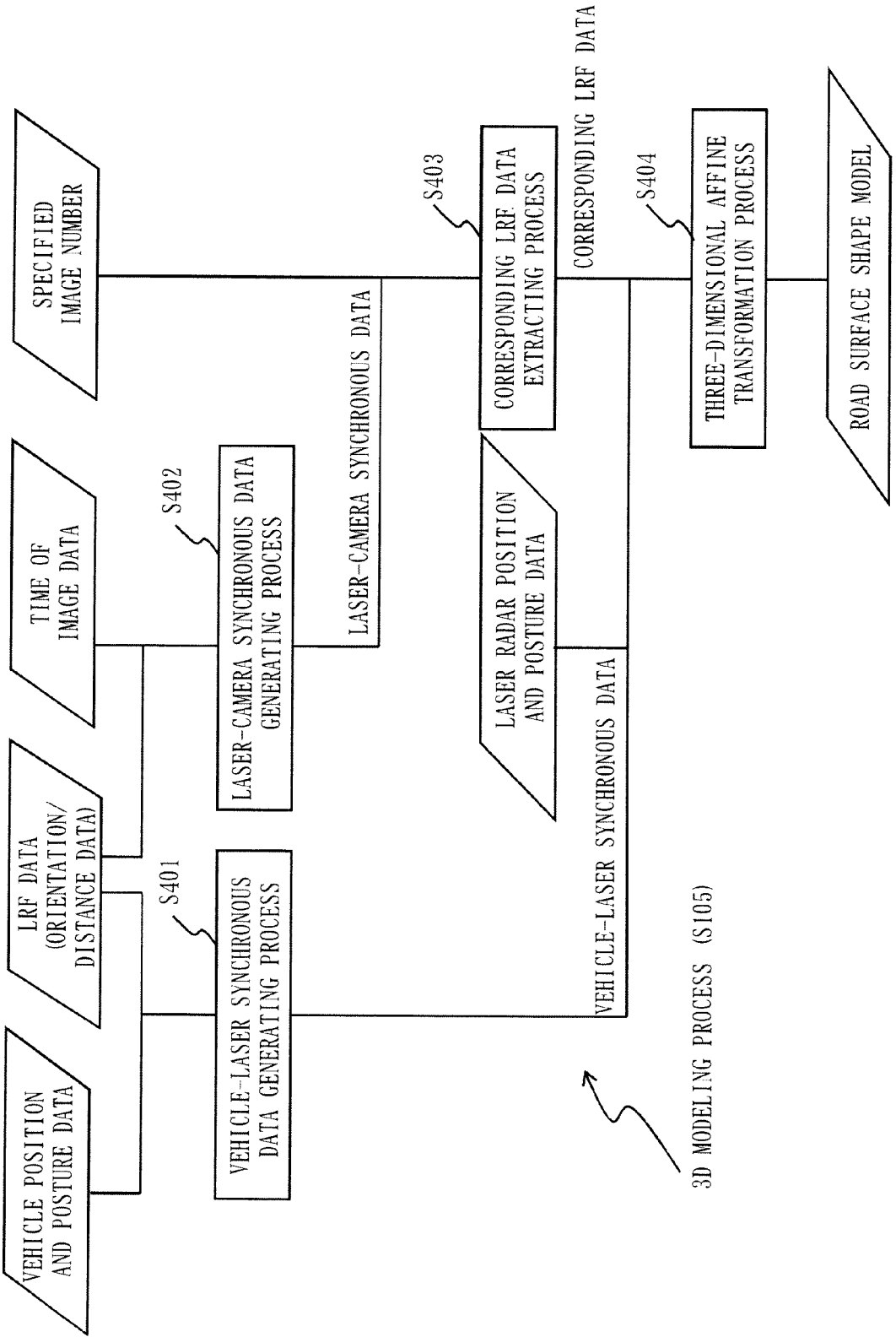
FIG. 23 is a flowchart showing a flow of 3D modeling process (S105) according to the first embodiment.
Figure 24:
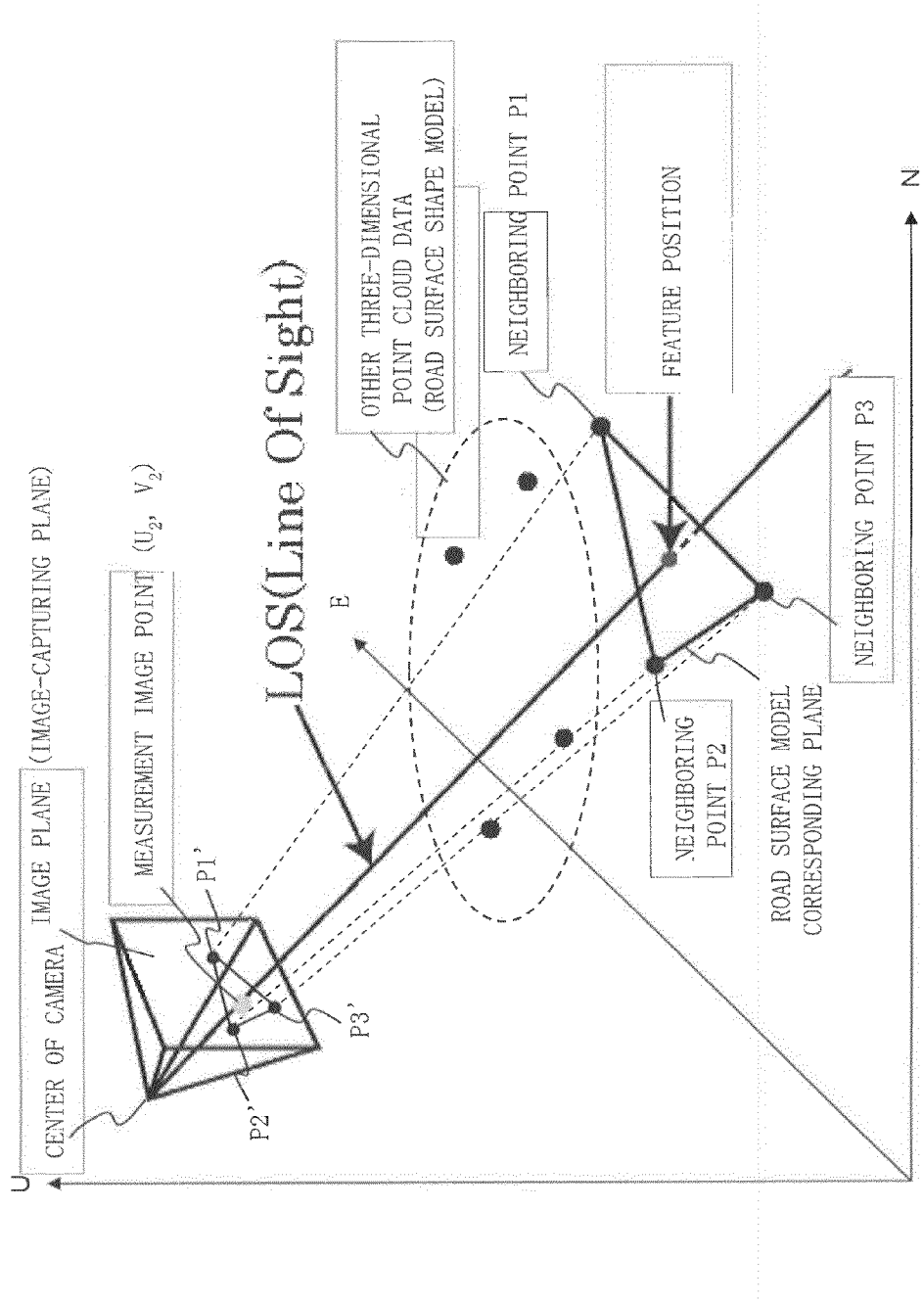
FIG. 24 shows a calculating method of a feature position in feature position locating process (S106) according to the first embodiment.
Figure 25:
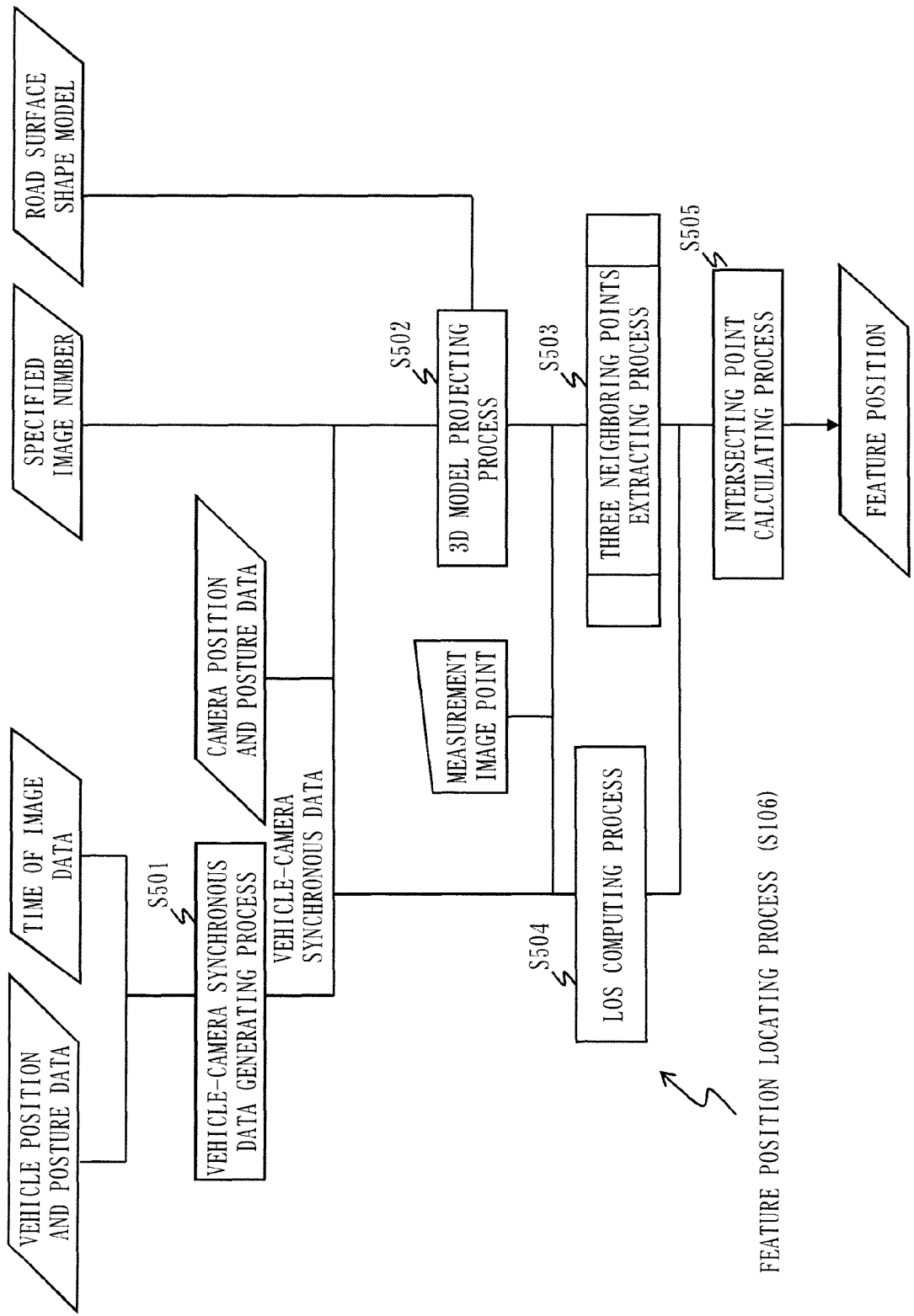
FIG. 25 is a flowchart showing a flow of the feature position locating process (S106) according to the first embodiment.
Figure 26:
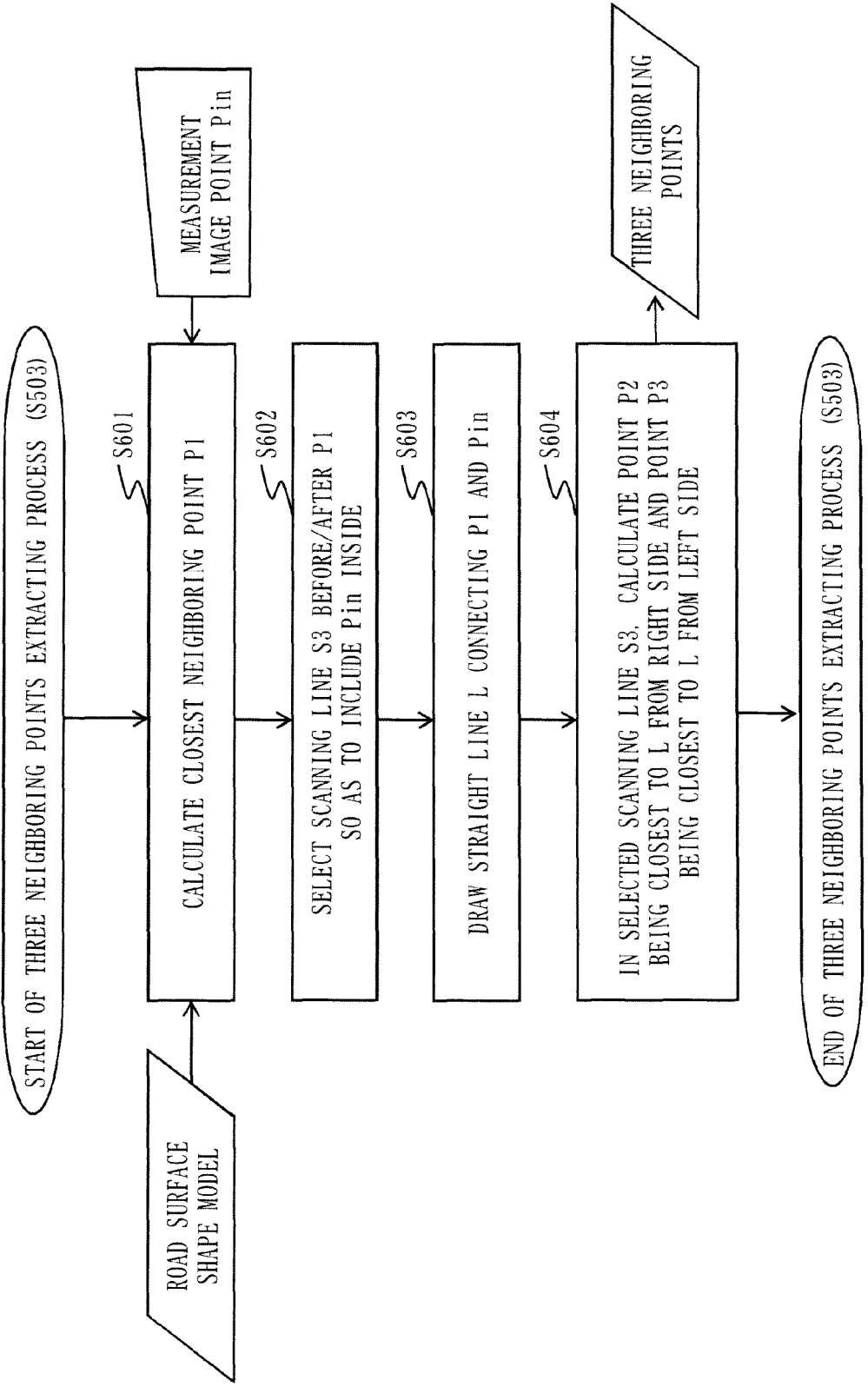
FIG. 26 is a flowchart showing a flow of three neighboring points extracting process (S503) according to the first embodiment.
Figure 27:
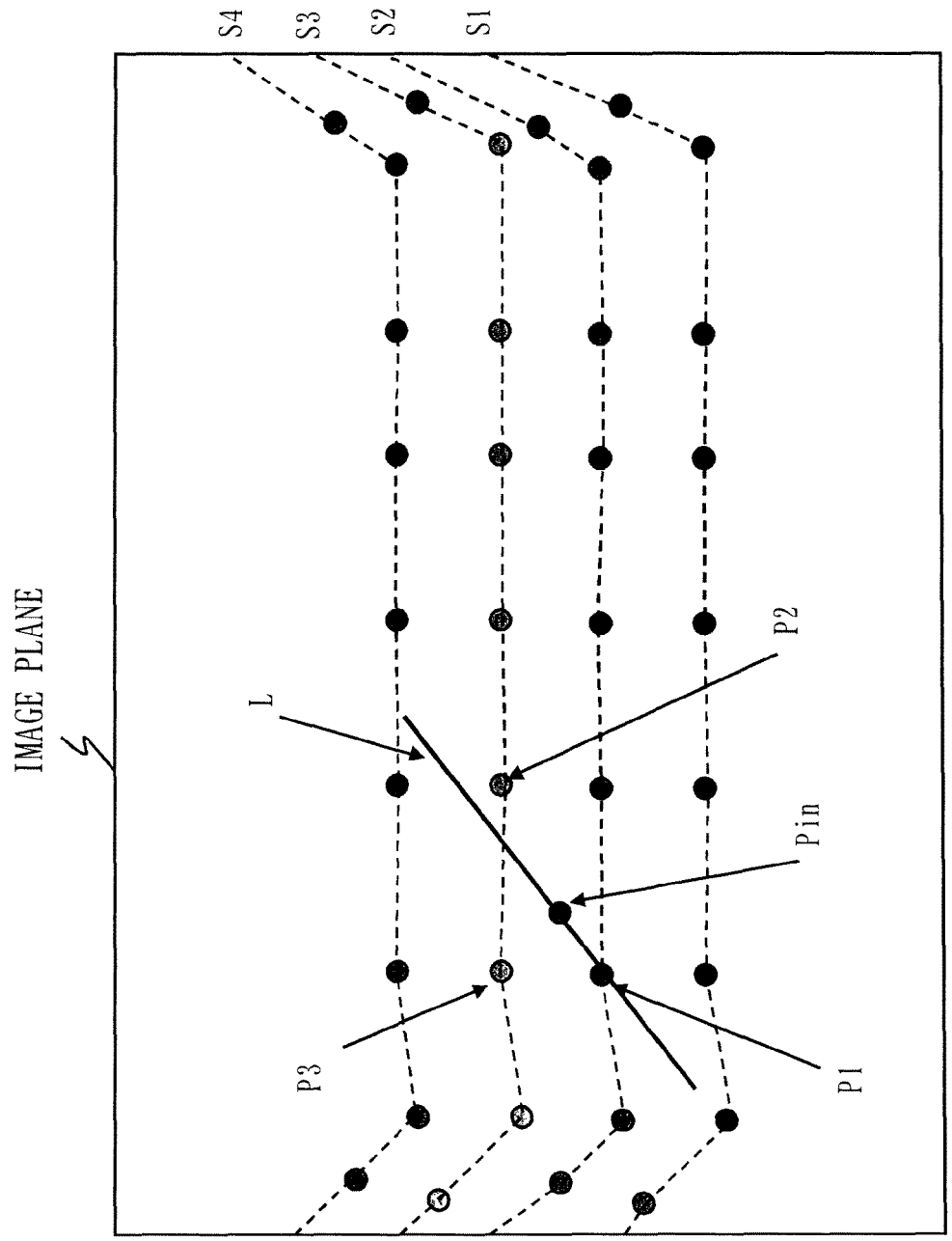
FIG. 27 shows the three neighboring points extracting process (S503) according to the first embodiment.
Figure 28:
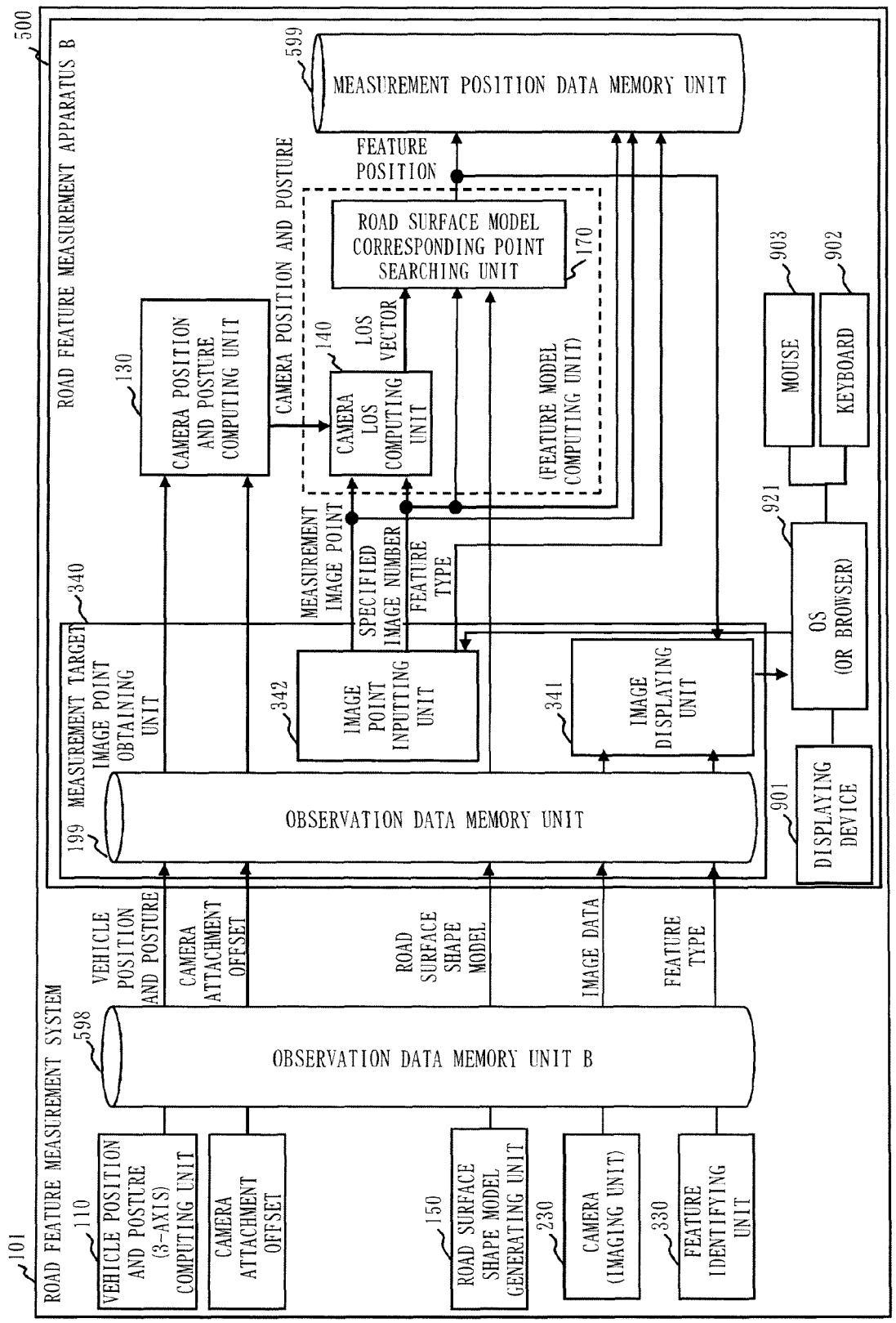
FIG. 28 shows a system configuration of a road feature measurement system 101 and a functional configuration of a road feature measurement apparatus B 500 according to the second embodiment.
Figure 29:
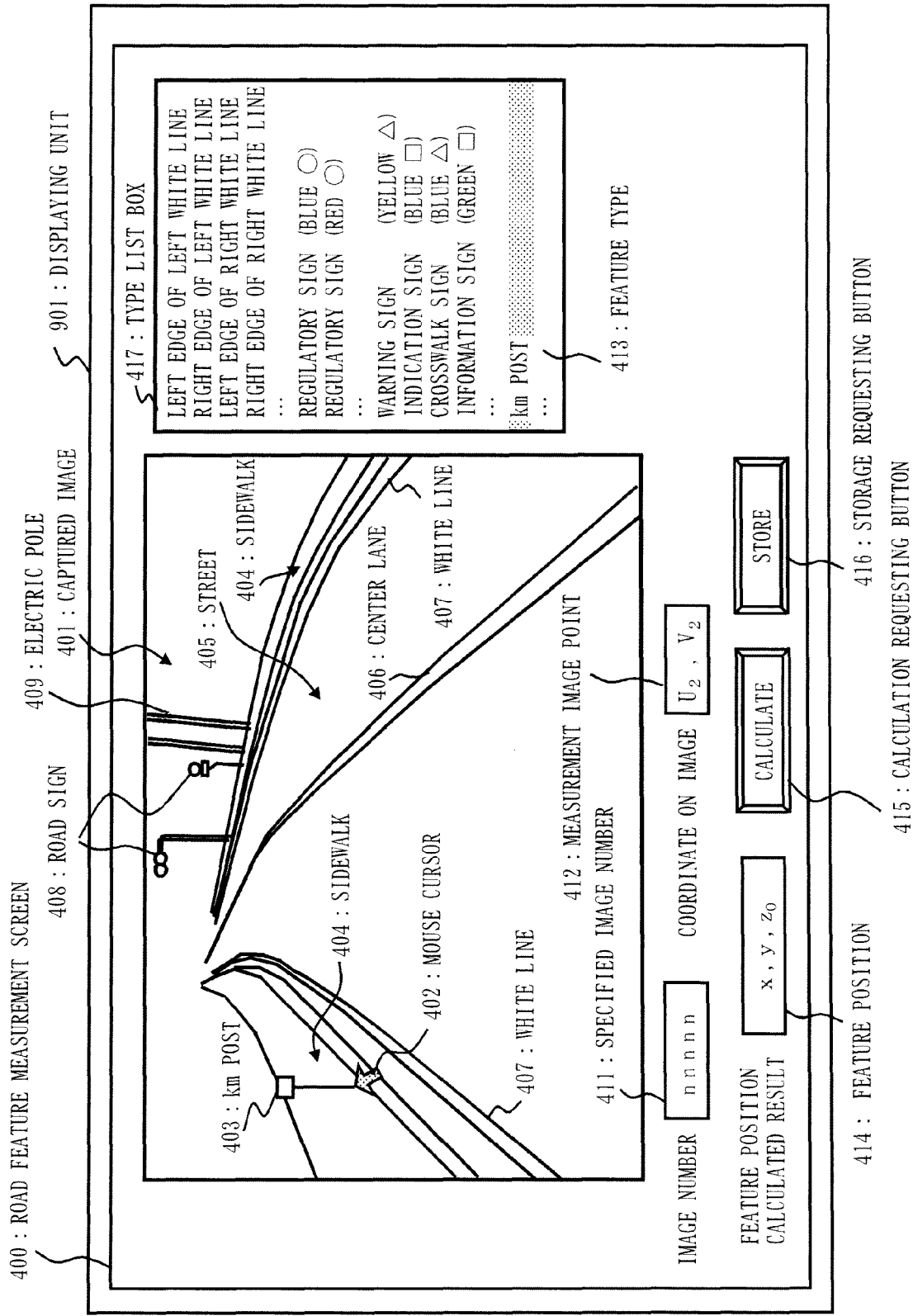
FIG. 29 shows a road feature measurement screen 400 according to the second embodiment.
Figure 30:
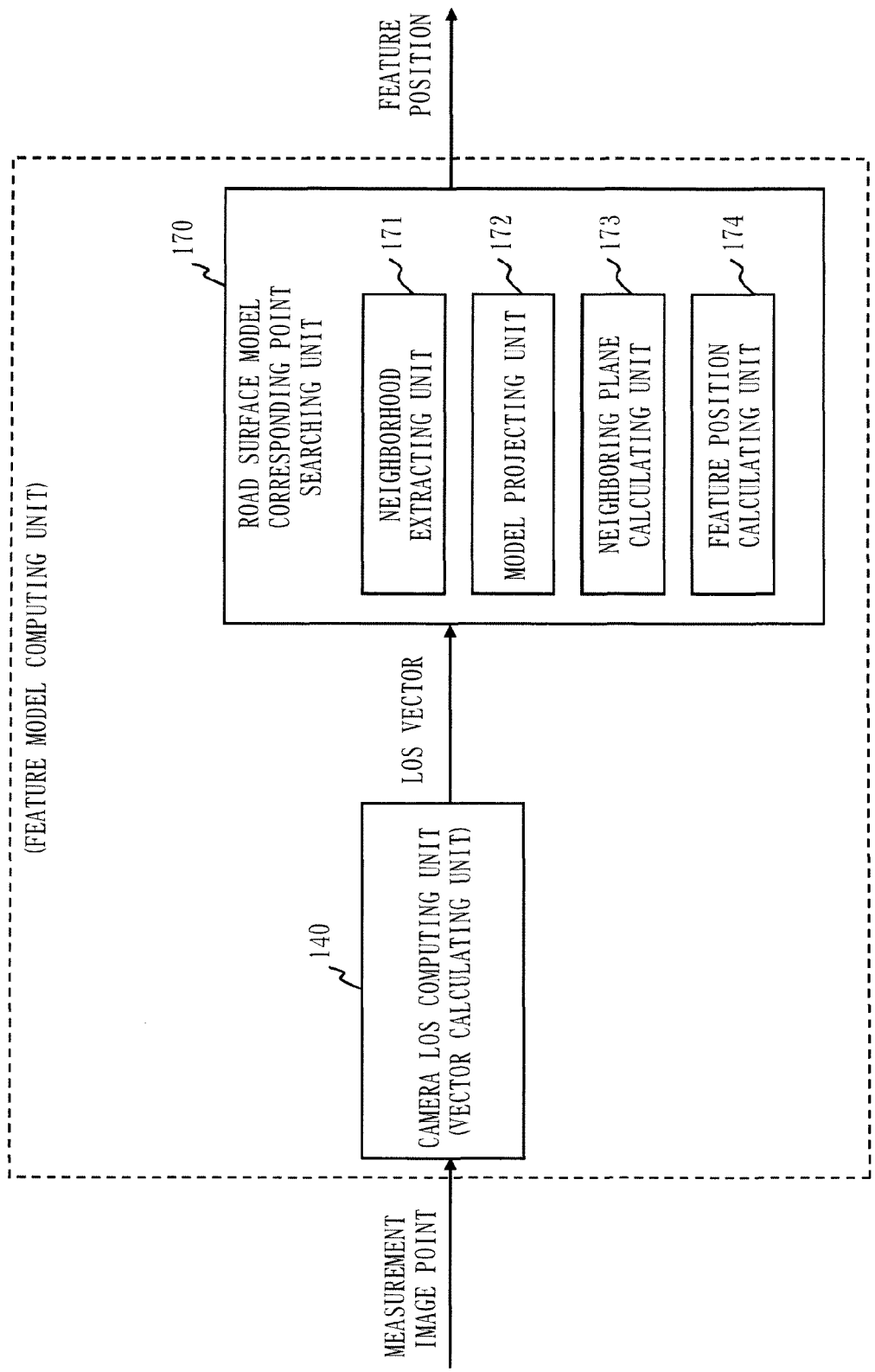
FIG. 30 shows a functional configuration of a road surface model corresponding point searching unit 170 according to the third embodiment.
Figure 31:
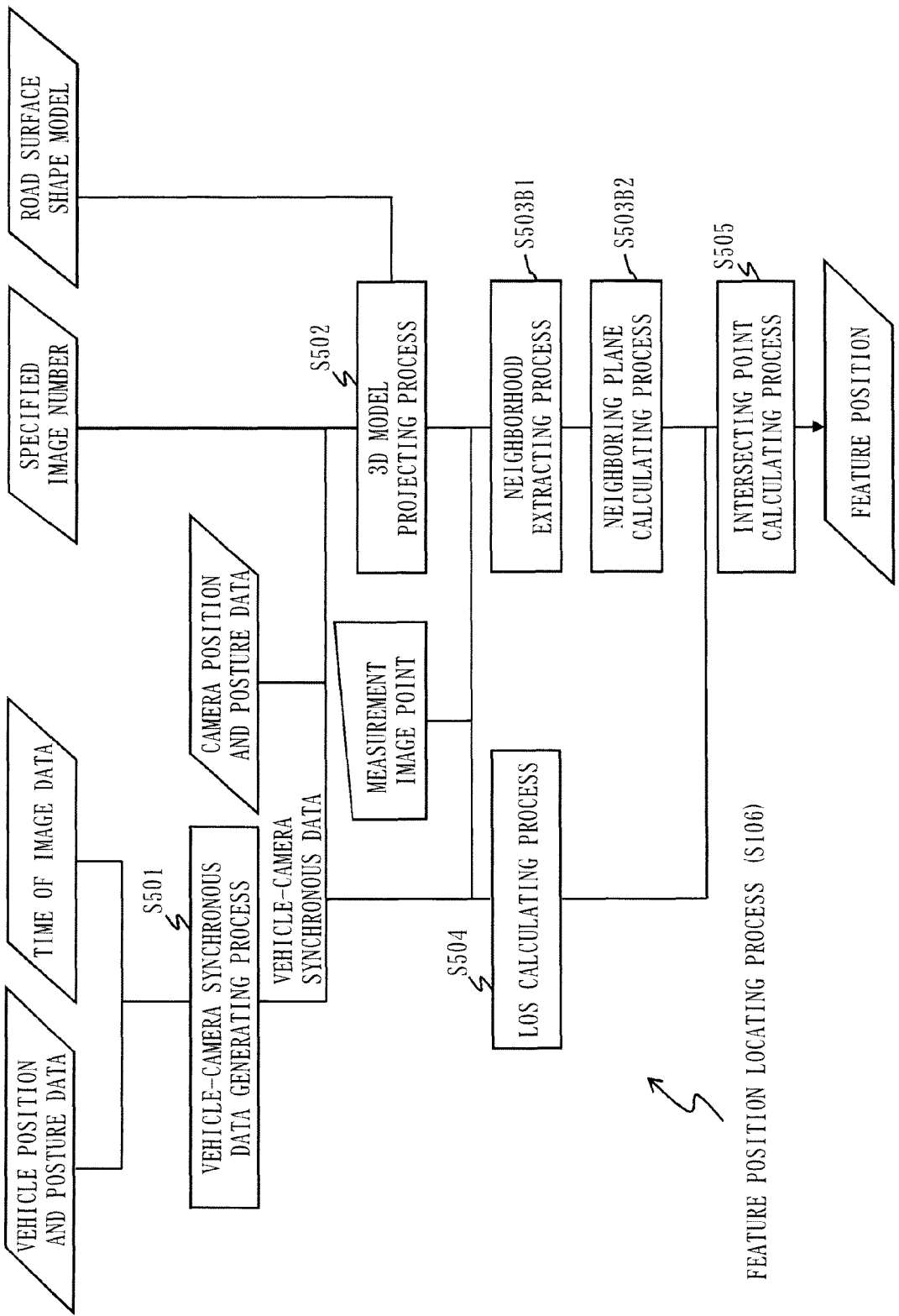
FIG. 31 is a flowchart showing a flow of feature position locating process (S106) according to the third embodiment.
Figure 32:
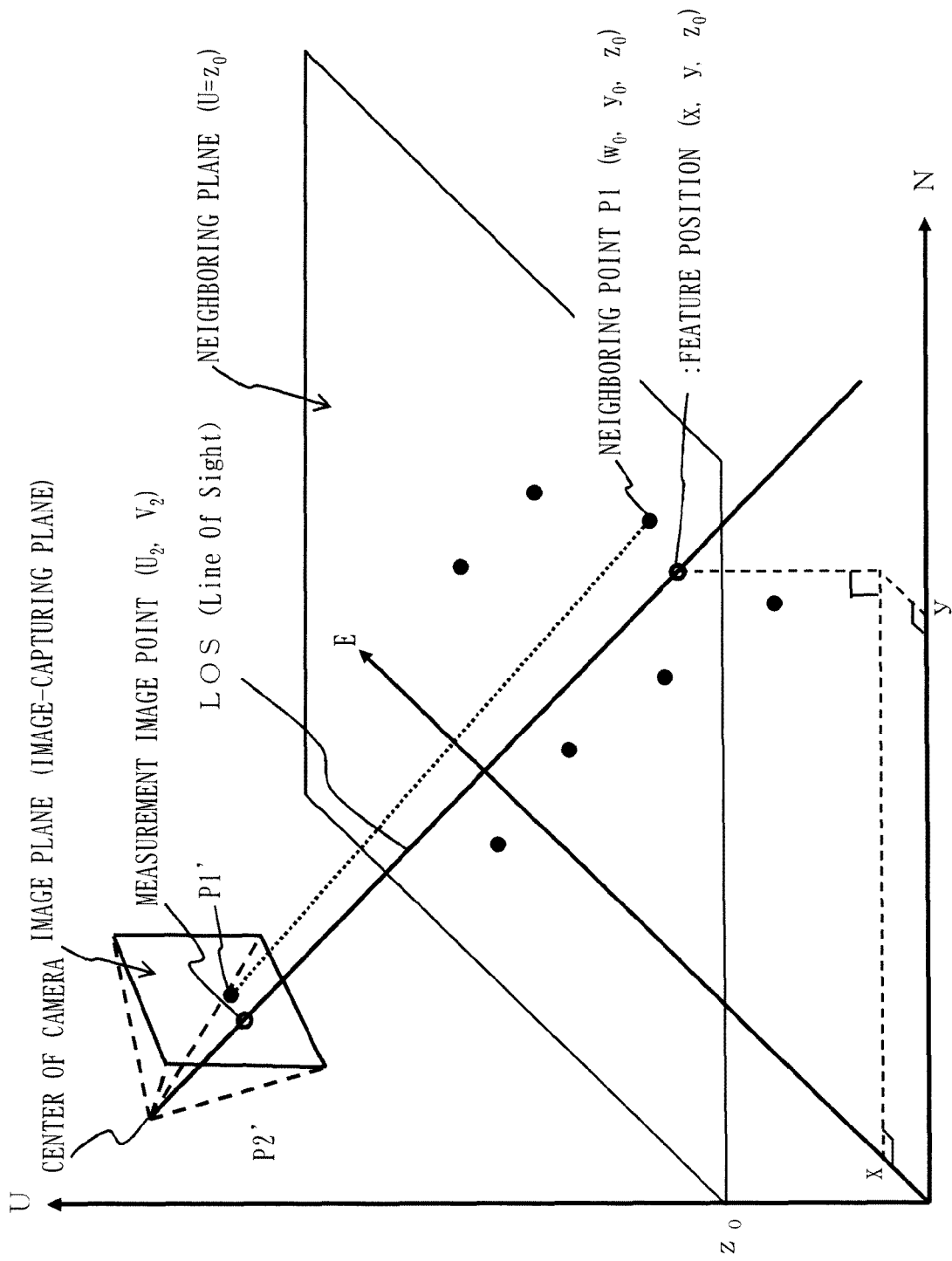
FIG. 32 shows a calculating method of feature position in feature position locating process (S106) according to the third embodiment.
Figure 33:
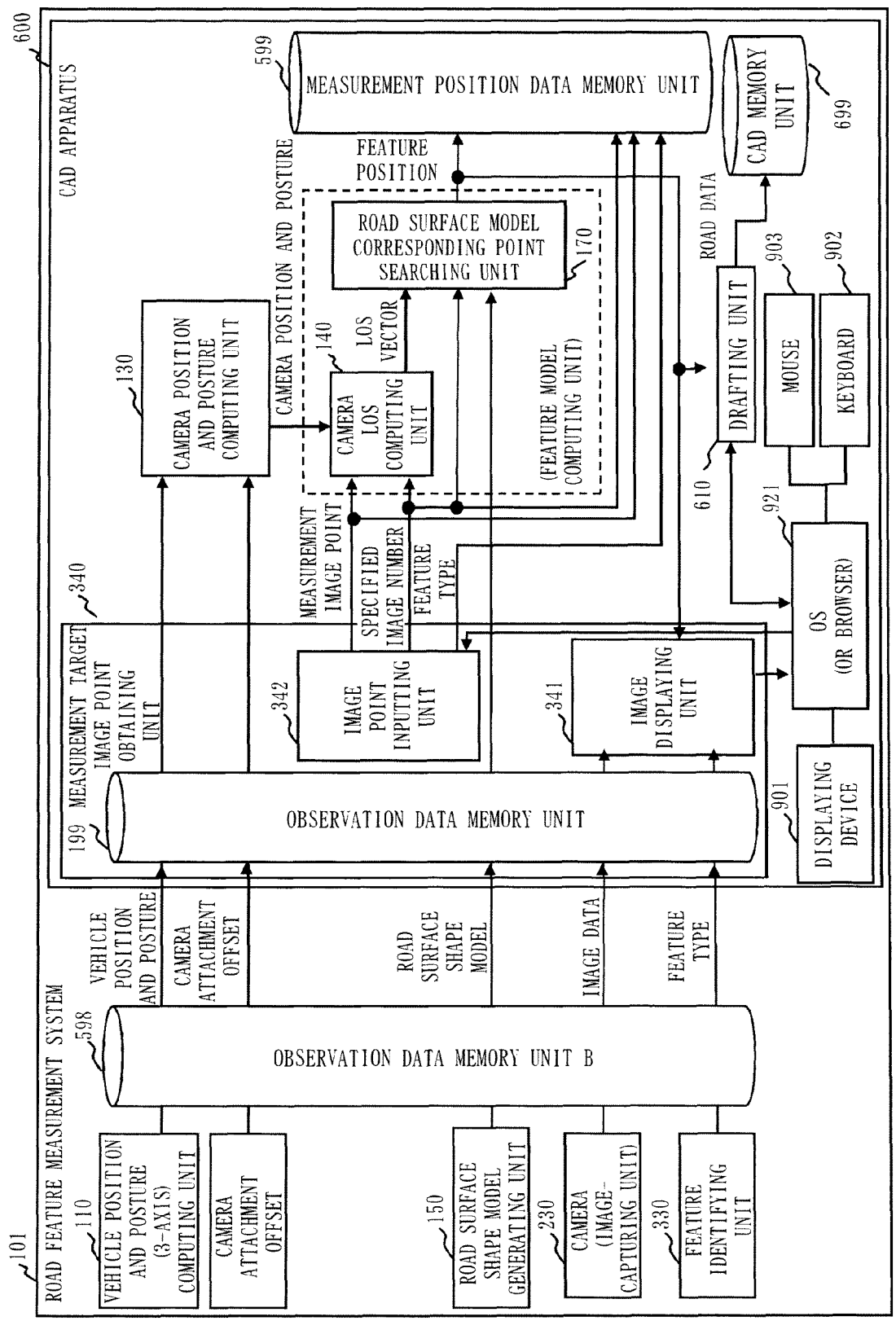
FIG. 33 shows a system configuration of a road feature measurement system 101 and a functional configuration of a CAD apparatus 600 according to the fourth embodiment.
Figure 34:
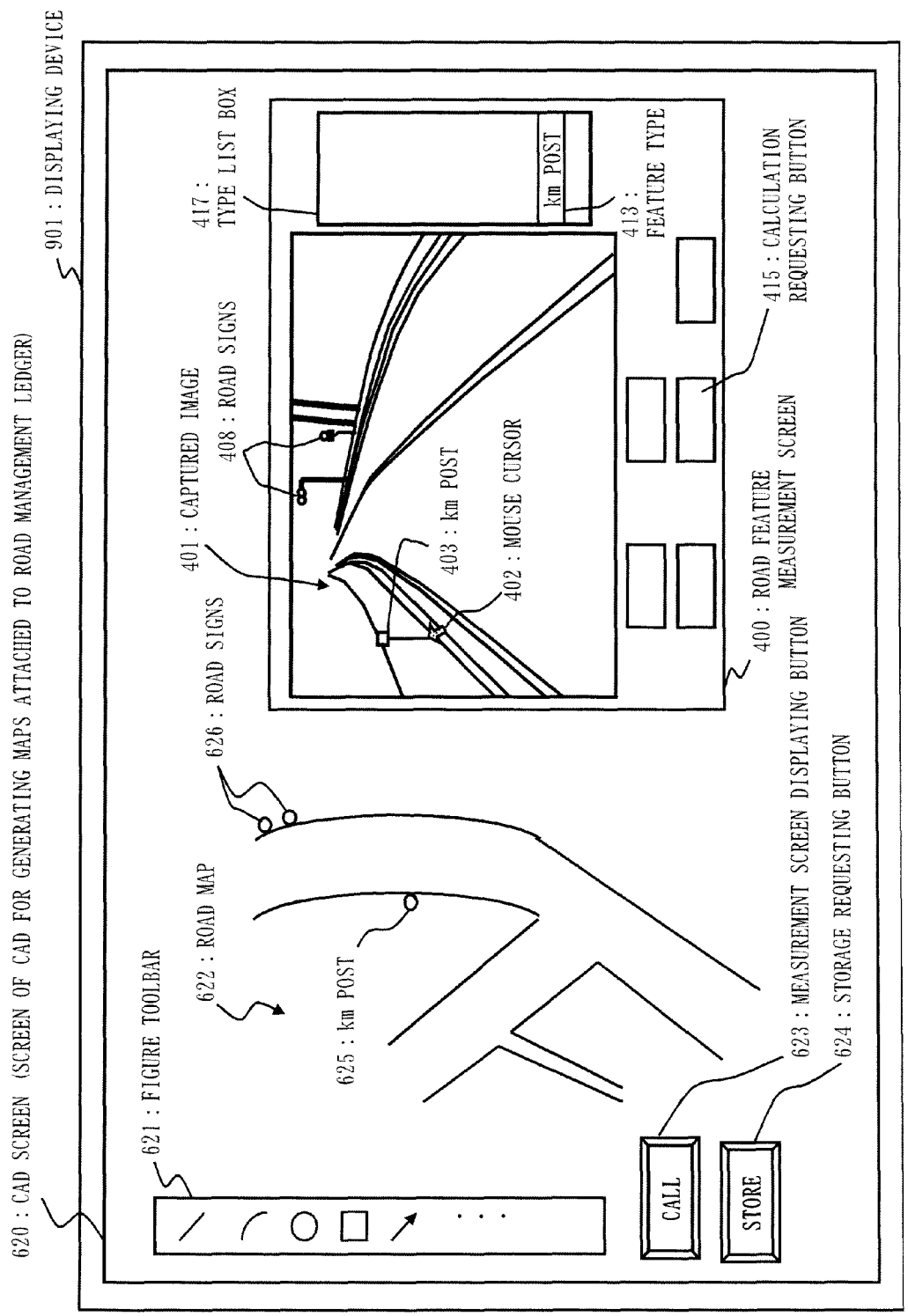
FIG. 34 shows a CAD screen 620 according to the fourth embodiment.
Figure 35:
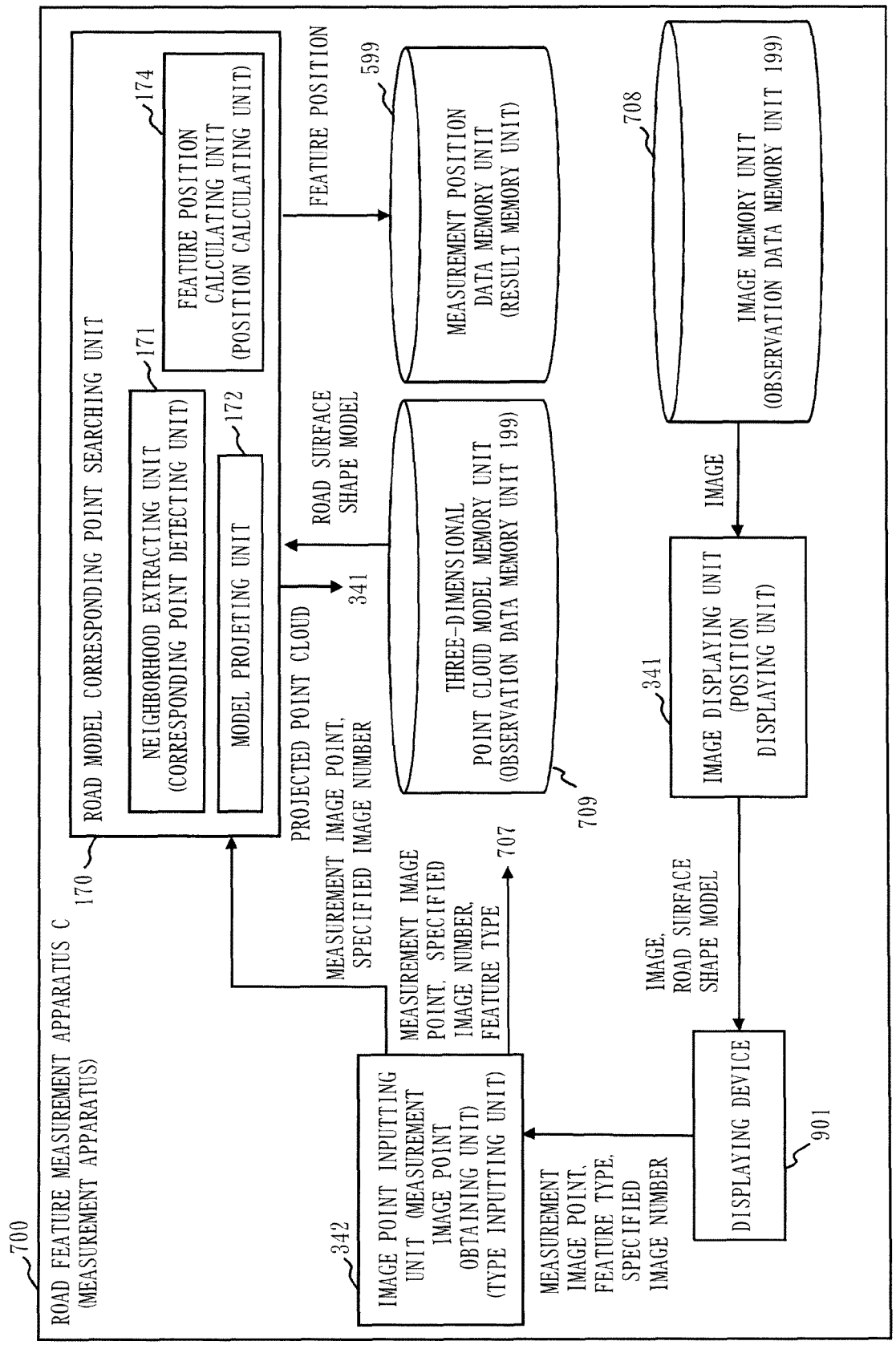
FIG. 35 shows a functional configuration of a road feature measurement apparatus C 700 according to the fifth embodiment.
Figure 36:
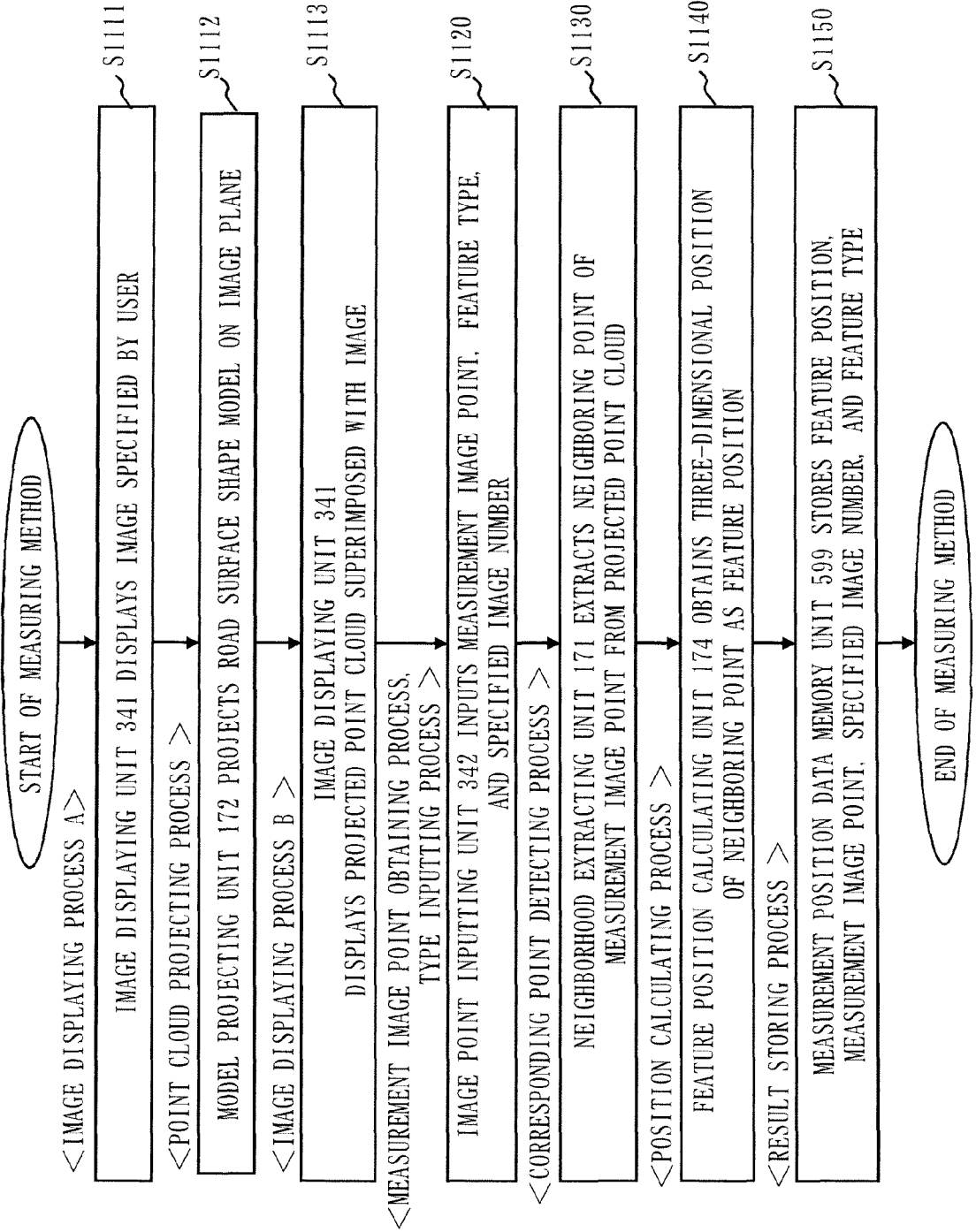
FIG. 36 is a flowchart showing a measuring method according to the fifth embodiment.
Figure 37:
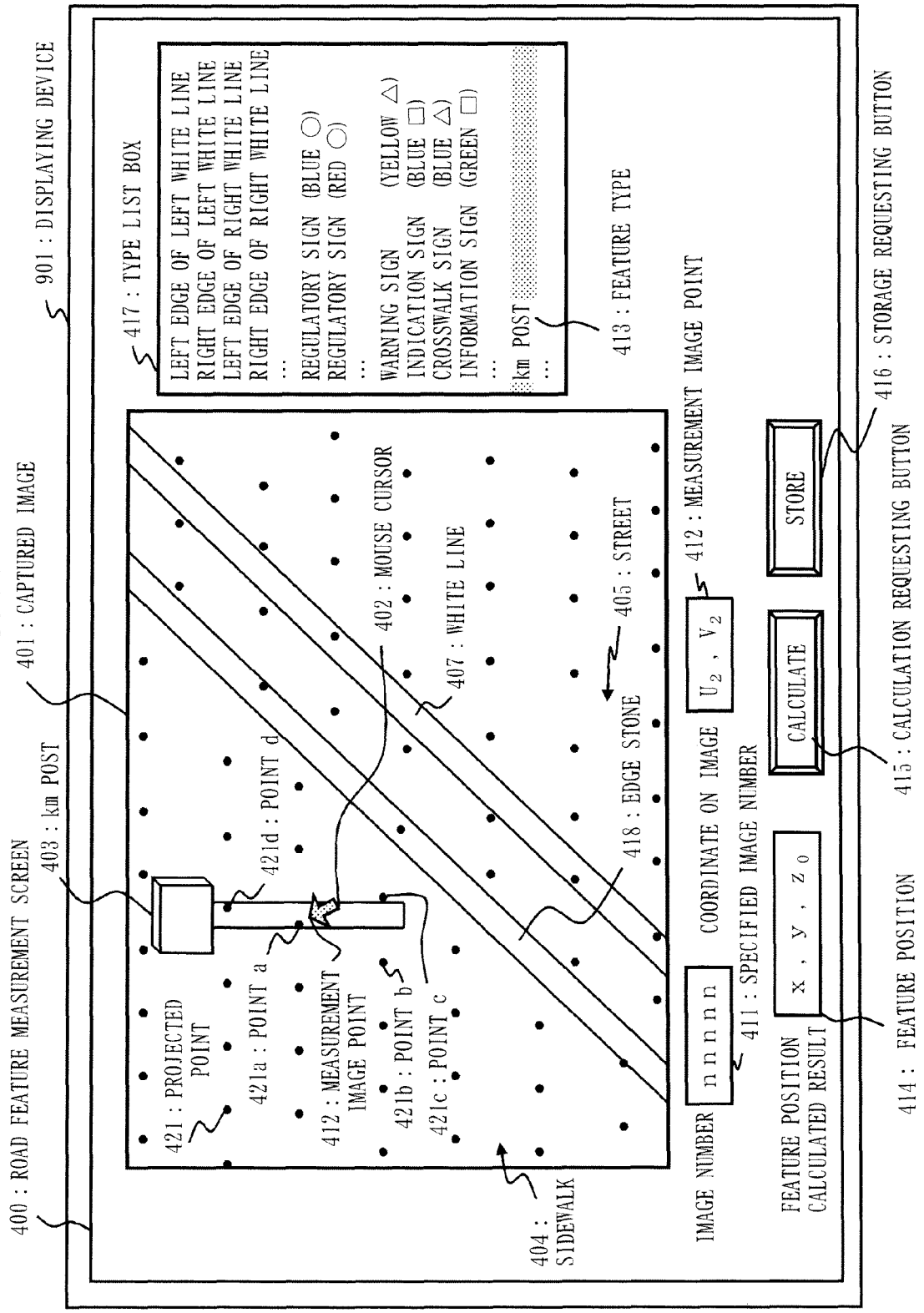
FIG. 37 shows a road feature measurement image road feature measurement screen 400 according to the fifth embodiment.
Figure 38:
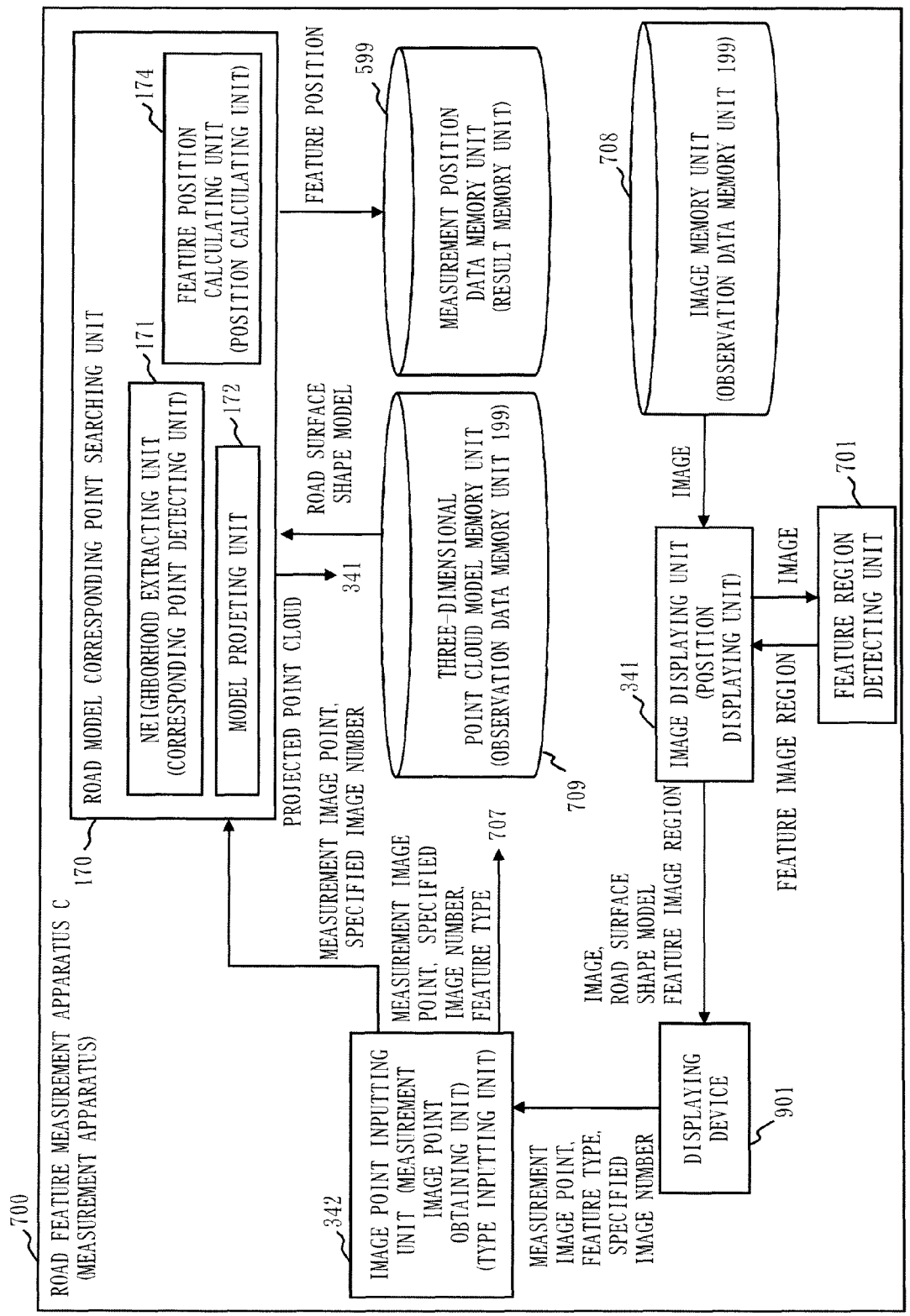
FIG. 38 shows a functional configuration of a road feature measurement apparatus C 700 according to the sixth embodiment.
Figure 39:
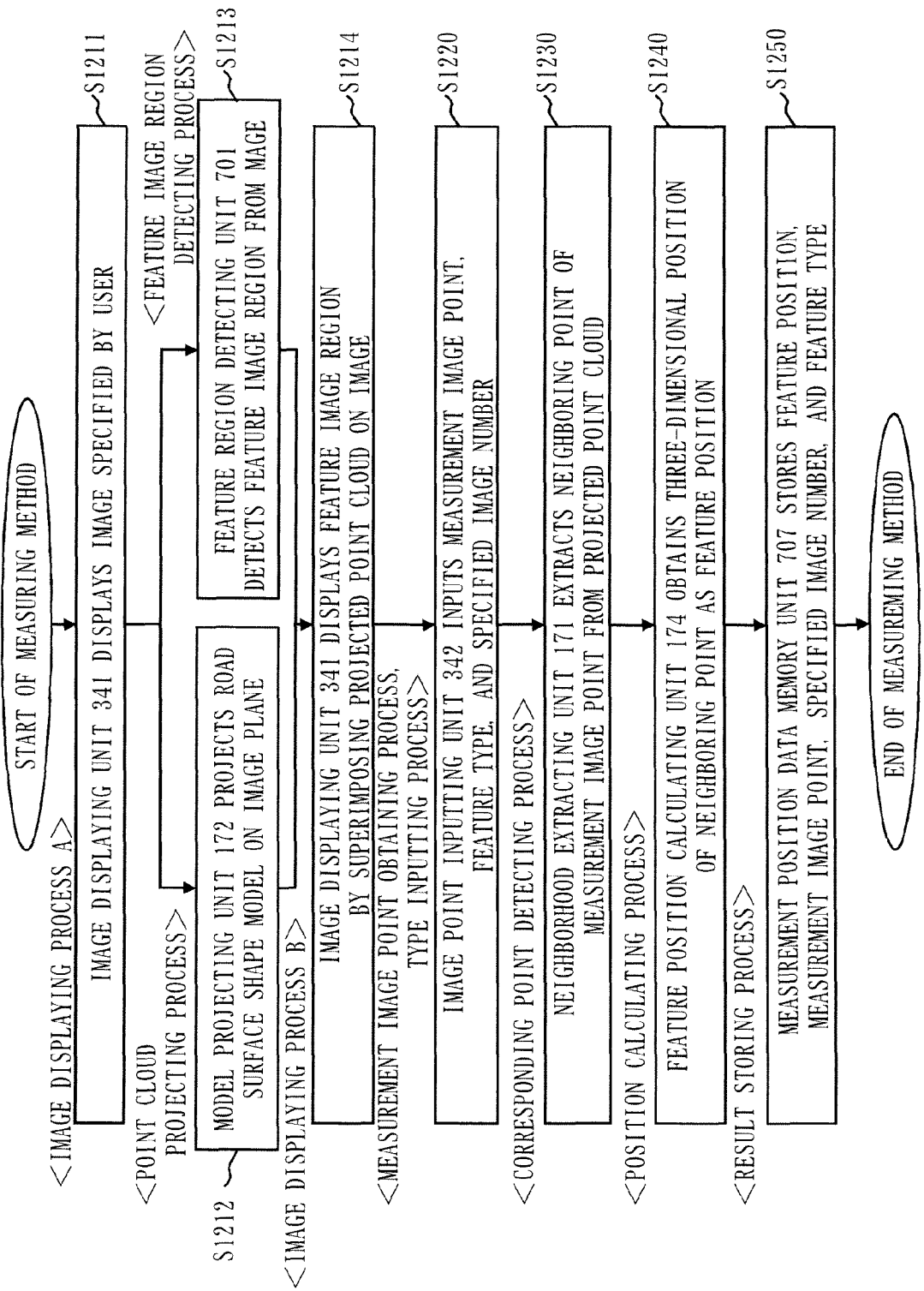
FIG. 39 is a flowchart showing a measuring method according to the sixth embodiment.
Figure 40:
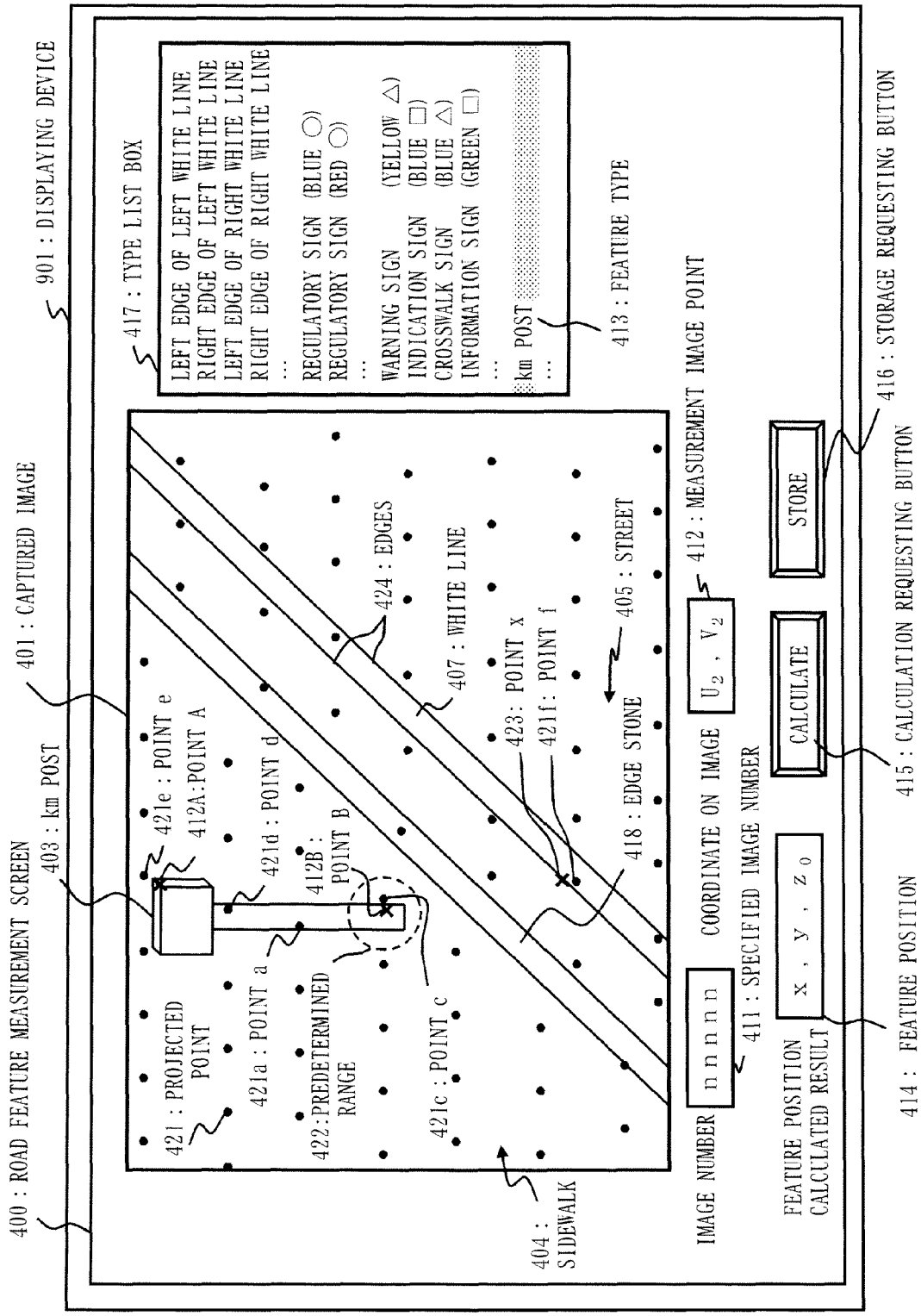
FIG. 40 shows a road feature measurement screen 400 according to the sixth embodiment.
Figure 41:
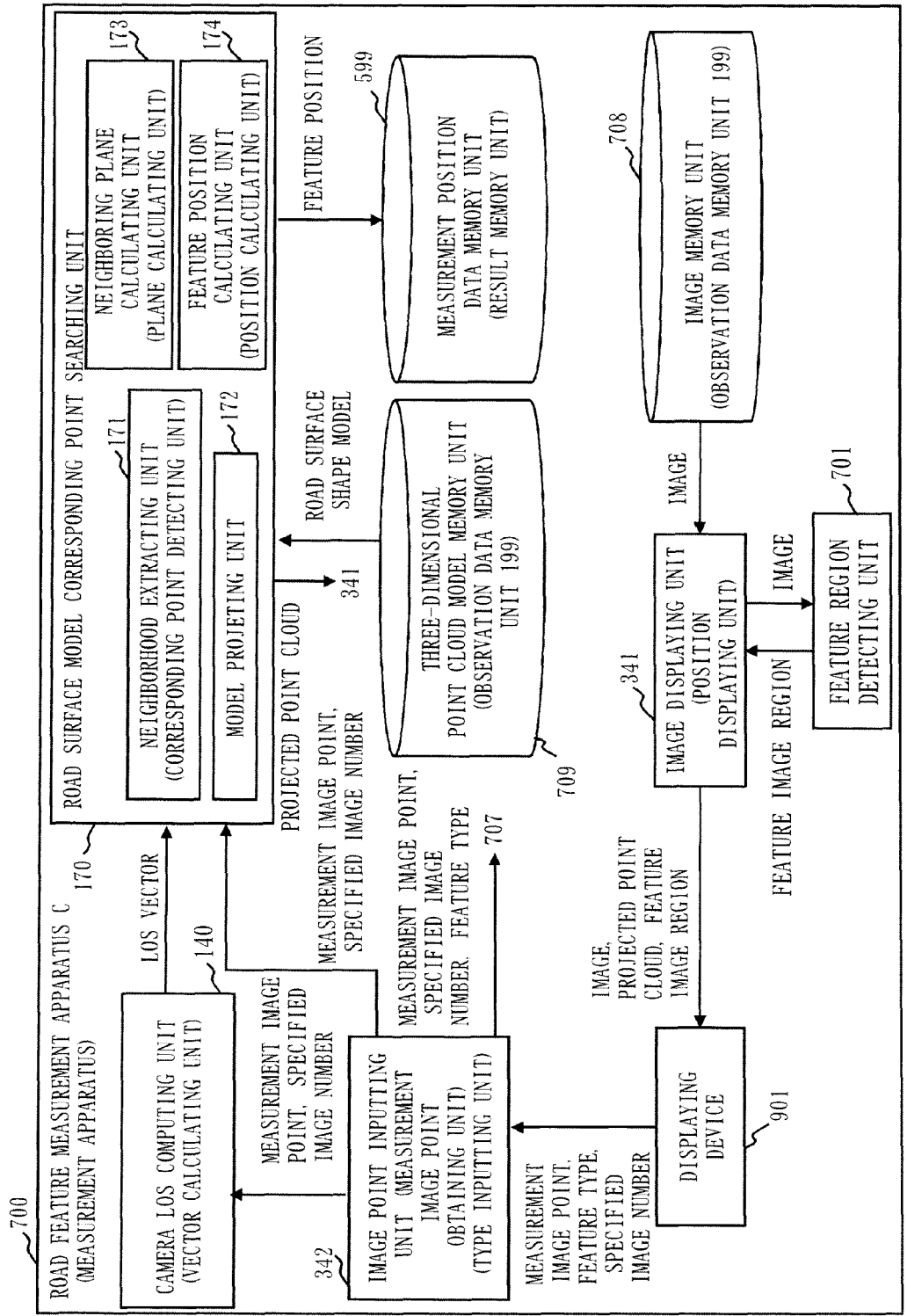
FIG. 41 shows a functional configuration of a road feature measurement apparatus C 700 according to the seventh embodiment.
Figure 42:
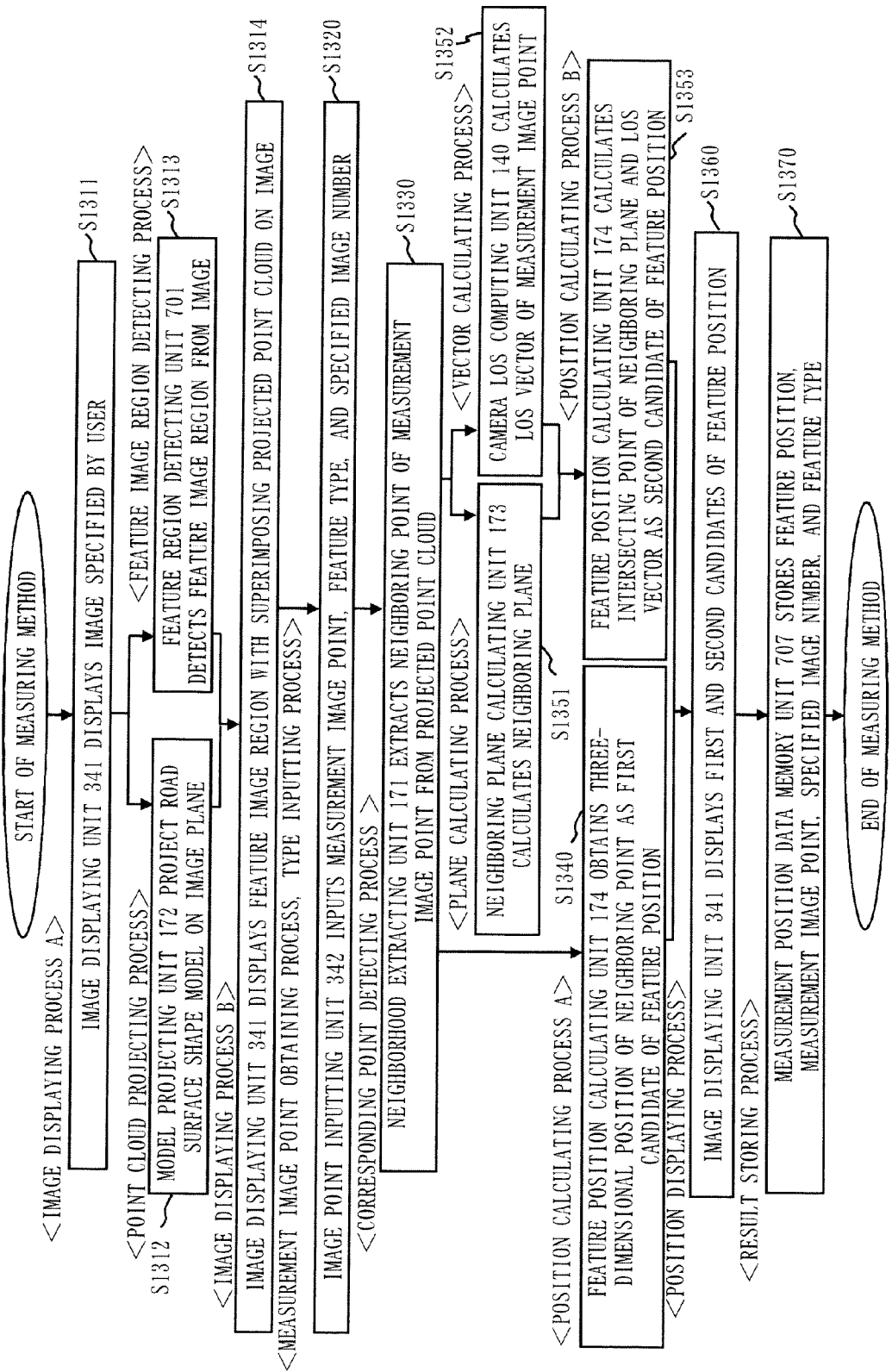
FIG. 42 is a flowchart showing a measuring method according to the seventh embodiment.
Figure 43:
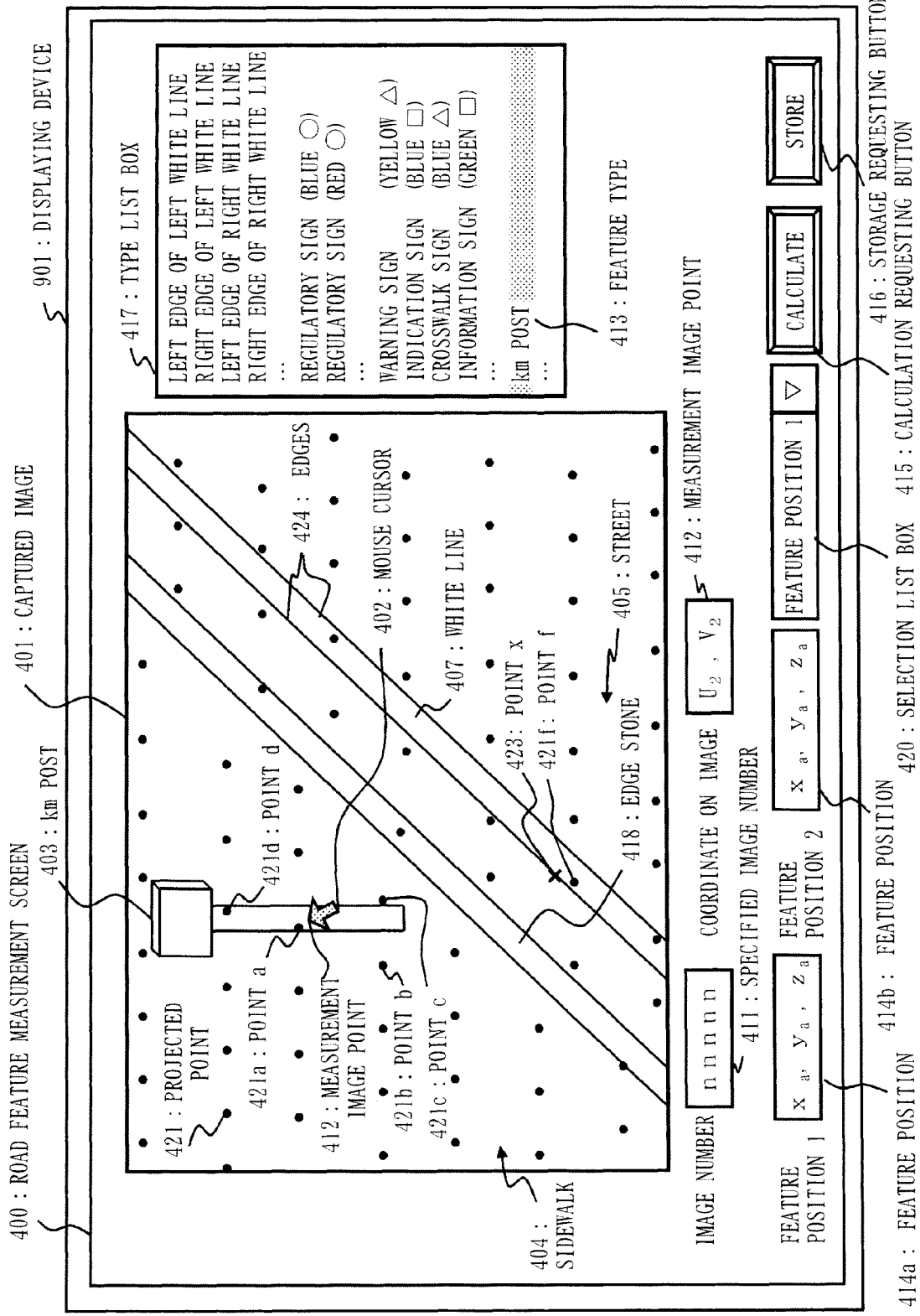
FIG. 43 shows a road feature measurement screen 400 according to the seventh embodiment.
Figure 44:
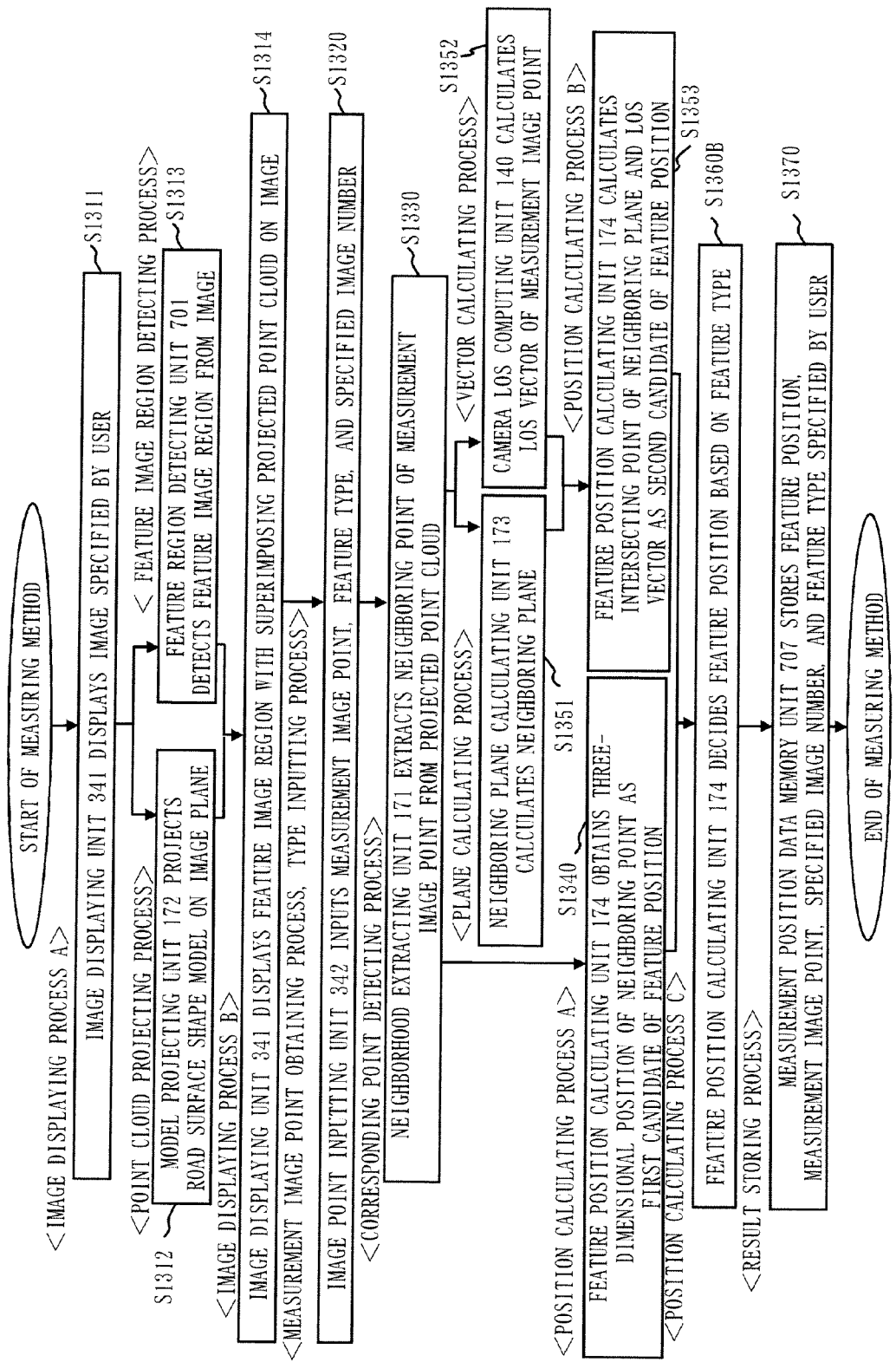
FIG. 44 is a flowchart showing a measuring method according to the eighth embodiment.
Figure 45:
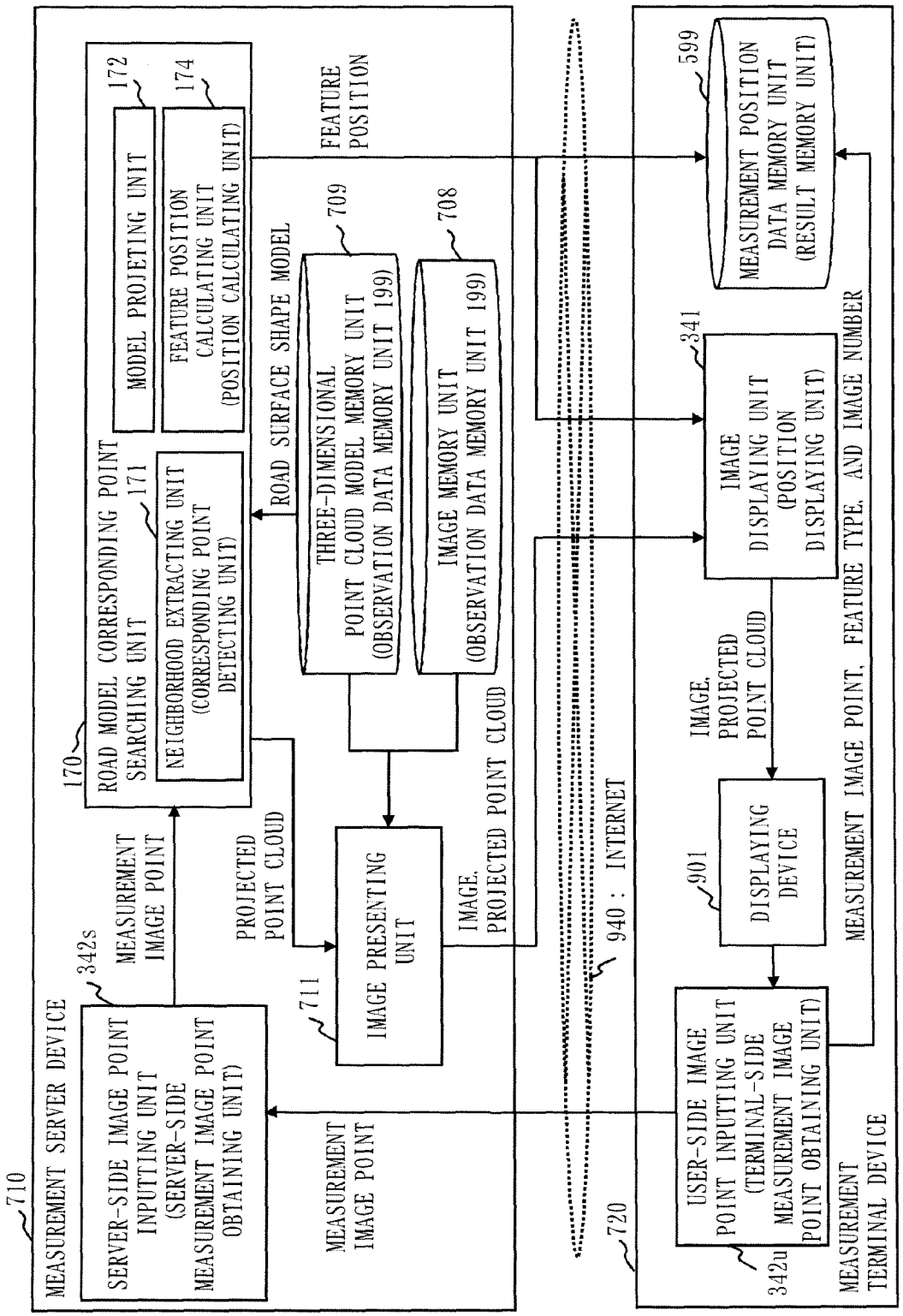
FIG. 45 shows functional configurations of a measurement server device 710 and a measurement terminal device 720 according to the ninth embodiment.
Figure 46:
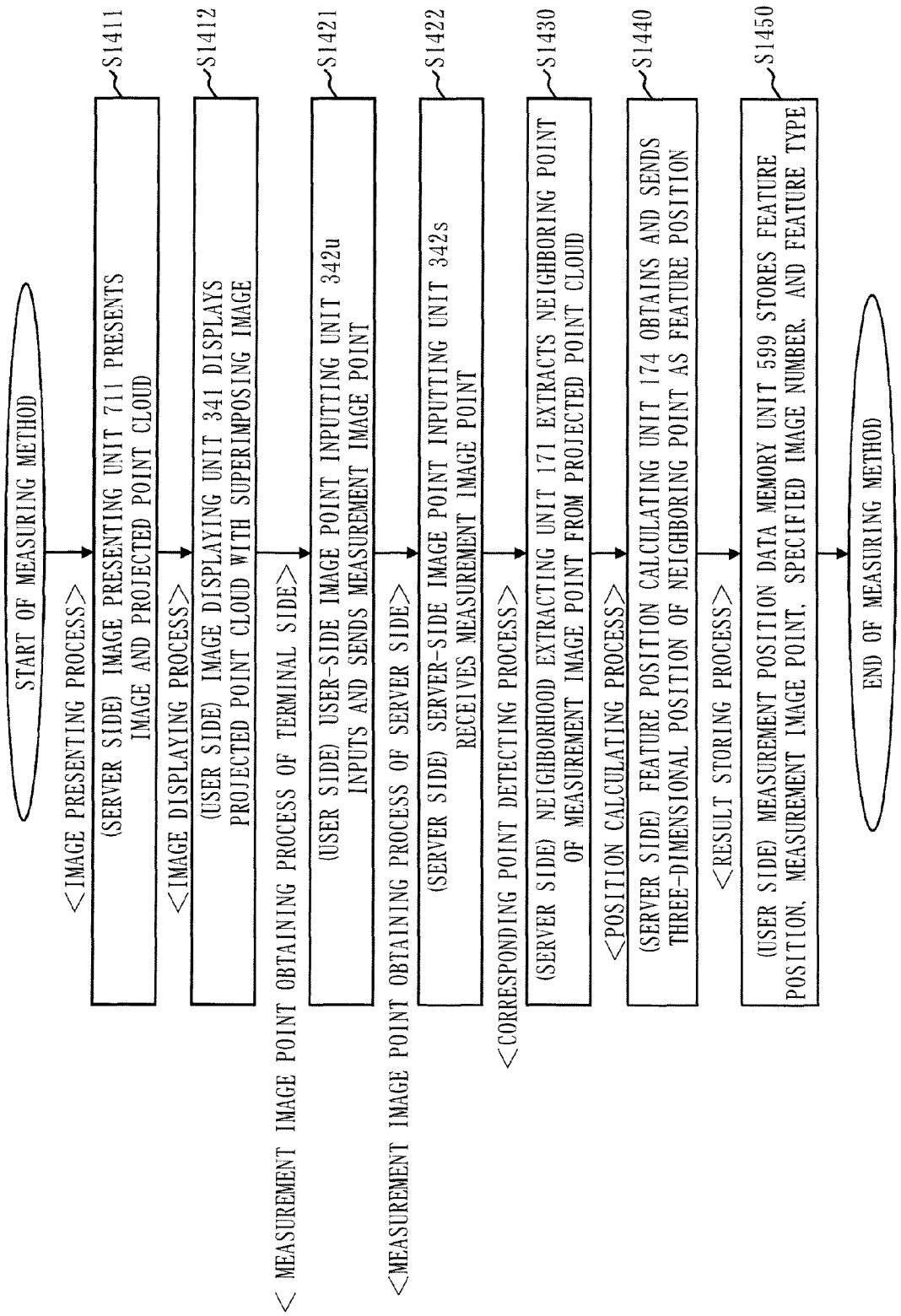
FIG. 46 is a flowchart showing a measuring method according to the ninth embodiment.

100: a road feature measurement apparatus; 101: a road feature measurement system; 102: a measuring carriage; 103: a top board; 110: a vehicle position and posture (3-axis) computing unit; 120: a white line recognition processing unit, 130: a camera position and posture computing unit; 140: a camera LOS computing unit; 150: a road surface shape model generating unit; 160: a laser radar position and posture computing unit; 170: a road surface model corresponding point searching unit; 171: a neighborhood extracting unit; 172: a model projecting unit; 173: a neighboring plane calculating unit; 174: a feature position calculating unit; 180: a white line position computing unit; 191: an observation data inputting unit: 199 an observation data memory unit; 200: an odometry apparatus; 210: a gyro; 220: GPS; 230: a camera; 240: a laser radar; 300: feature identification apparatus; 310: a motion stereo unit; 311: a stationary body discriminating unit; 312: a stationary body model generating unit; 320: a moving body removing unit; 321: a moving body discriminating unit; 322: moving body removed model generating unit; 330: a feature identifying unit; 331: a labeling unit; 332: an edge determining unit; 333: a feature determining unit; 340: a measurement image point obtaining unit; 341: an image displaying unit; 342: an image point inputting unit; 342s: a server-side image point inputting unit; 342u: a user-side image point inputting unit; 400: a road feature measurement screen; 401: a captured image; 402: a mouse cursor; 403: a km post; 404: a sidewalk; 405: a street; 406: a center line; 407: a white line; 408: a road sign; 409: an electric pole; 411: a specific image number; 412: a measurement image point; 412A: a point "A"; 412B: a point "B"; 413: a feature type; 414, 414a, and 414b: feature positions; 415: a calculation requesting button; 416: a storage requesting button; 417: a type list box; 418: an edge stone; 420: a selection list box; 421: a projected point; 421a: a point "a"; 421b: a point "b"; 421c: a point "c"; 421d: a point "d"; 421e: a point "e"; 421f: a point "f"; 422: a predetermined range; 423: a point "x"; 424: an edge; 500: a road feature measurement apparatus B; 598: an observation data memory unit B; 599: a measurement position data memory unit; 600: a CAD apparatus; 610: a drafting unit; 620: a CAD screen; 621: a figure toolbar; 622: a road map; 623: a measurement screen displaying button; 624: a storage requesting button; 625: a km post; 699: a CAD memory unit; 700: a road feature measurement apparatus C; 701: a feature region detecting unit; 708: an image memory unit; 709: a three-dimensional point cloud model memory unit; 710: a measurement server device; 711: an image presenting unit; 720: a measurement terminal device; 901: a displaying device; 902: a keyboard; 903: a mouse; 904: FDD; 905: CDD; 906: a printer device; 907: a scanner device; 908: a microphone; 909: a speaker; 911: CPU; 912: a bus; 913: ROM; 914: RAM; 915: a communication board; 920: a magnetic disk drive; 921: OS; 922: a window system; 923: a group of programs; 924: a group of files; and 940: the Internet.

The invention claimed is:

1. A measurement apparatus comprising: an image memory to store an image captured by a camera; a three-dimensional point cloud model memory to store a point cloud which is formed by a point cloud measured by a laser device and of which a three-dimensional position is known as a three-dimensional point cloud model;

a processor programmed to discriminate a three dimensional position of a measurement image point;

an image displaying unit to display and superimpose the image and a three-dimensional point cloud model, which corresponds to the image out of the three-dimensional point cloud model stored in the three-dimensional point cloud model memory, on a screen of a displaying device, and to prompt a user to specify a position within the image wherein the processor is further programmed to receive the position within the image specified by the user as the measurement image point from an inputting device, detect based on whether a point of the point cloud is displayed within the image, a corresponding point corresponding to the measurement image point from the point cloud of the three-dimensional point cloud model stored by the three-dimensional point cloud model memory; and discriminate a three-dimensional position of the measurement image point using a three-dimensional position of the detected corresponding point wherein the processor is further programmed to:

calculate a vector showing direction from a center of the camera to the imputed measurement image point and calculate a particular plane including the detected corresponding point, obtain a three-dimensional position of the detected corresponding point as a first candidate showing a three-dimensional position of the measurement image point, and calculate an intersecting point of the particular plane and the vector as a second candidate showing the three-dimensional position of the measurement image point, wherein the measurement apparatus further comprises: a position displaying unit to display the first candidate and the second candidate on the screen of the displaying device and to prompt the user to specify one of the first candidate and the second candidate; and a result memory unit to store one of the first candidate and the second candidate specified by the user as the three-dimensional position of the measurement image point.

2. The measurement apparatus of claim 1, wherein in response to a point of the point cloud displayed within the image existing at the position in the image shown by the measurement image point, the processor detects the point as the corresponding point corresponding to the measurement image point.

3. The measurement apparatus of claim 1, wherein in response to a point of the point cloud displayed within the image not existing at the position in the image shown by the measurement image point, the processor detects a point which is closest to the measurement image point as the corresponding point corresponding to the measurement image point.

4. The measurement apparatus of claim 1, further comprising:

a result memory to assume the discriminated three-dimensional position as a three-dimensional position of a feature for a measurement target, and storing the three-dimensional position by relating to a type of the feature for the measurement target.

5. The measurement apparatus of claim 1, wherein the processor is further programmed to calculate a vector showing direction from a center of the camera to the inputted measurement image point, calculate a particular plane including the detected corresponding point receive a type of a feature for a measurement target from the user and input the type of the feature, and, discriminate either of the detected corresponding point, and the intersecting point of the particular plane and the vector as a three-dimensional position of the measurement image point based on the type of the feature.

6. A measuring method comprising: storing in memory an image captured by a camera; storing in a three-dimensional point cloud memory a point cloud which is formed b7 a point cloud and of which a three-dimensional position is known as a three-dimensional point cloud model; discriminating via a processor, a three dimensional position of a measurement image point;

displaying and superimposing the image and a three-dimensional point cloud model which corresponds to the image out of the three-dimensional point cloud model stored in the three-dimensional point cloud memory and of which the three-dimensional position is known, on a screen of a displaying device;

prompting a user to specify a position within the image;

receiving and inputting the position within the image specified by the user as the measurement image point;

detecting, via a processor and based on whether a point of the point cloud is displayed within the image, a corresponding point corresponding to the measurement image point from the point cloud of the three-dimensional point cloud model stored by the three-dimensional point cloud model memory;

discriminating, via a processor, a three-dimensional position of the measurement image point using a three-dimensional position of the corresponding point; and generating, via the processor, measurement position data showing the three-dimensional position of the discriminated measurement image point, wherein the processor is further programmed to:

calculating a vector showing direction from a center of the camera to the imputed measurement image point; calculating a particular plane including the detected corresponding point, obtaining a three-dimensional position of the detected corresponding point as a first candidate showing a three-dimensional position of the measurement image point, and calculating an intersecting point of the particular plane and the vector as a second candidate showing the three-dimensional position of the measurement image point;

displaying the first candidate and the second candidate on the screen of the displaying device and prompting the user to specify one of the first candidate and the second candidate; and storing one of the first candidate and the second candidate specified by the user as the measurement position data showing the three-dimensional position of the measurement image point.

7. The measuring method of claim 6, further comprising:

calculating a vector showing direction from a center of the camera to the measurement image point;

calculating a particular plane including the detected corresponding point;

prompting the user to specify a type of a feature for a measurement target and to input the type of the feature specified by the user;

discriminating, via the processor, either of the detected corresponding point, and an intersecting point of the particular plane and the vector as a three-dimensional position of the measurement image point based on the type of the feature; and generating measurement position data showing the three-dimensional position of the measurement image point discriminated.

* * * * *